US012596436B2

(12) United States Patent
Ide et al.

(10) Patent No.: US 12,596,436 B2
(45) Date of Patent: Apr. 7, 2026

(54) TACTILE PRESENTATION DEVICE

(71) Applicant: Mitsubishi Electric Corporation, Tokyo (JP)

(72) Inventors: Chigusa Ide, Tokyo (JP); Tae Orita, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 19/099,477

(22) PCT Filed: Aug. 3, 2022

(86) PCT No.: PCT/JP2022/029733
§ 371 (c)(1),
(2) Date: Jan. 29, 2025

(87) PCT Pub. No.: WO2024/028998
PCT Pub. Date: Feb. 8, 2024

(65) Prior Publication Data
US 2026/0044214 A1 Feb. 12, 2026

(51) Int. Cl.
*G06F 3/038* (2013.01)
*G06F 3/01* (2006.01)
*G06F 3/041* (2006.01)

(52) U.S. Cl.
CPC .............. G06F 3/016 (2013.01); G06F 3/038 (2013.01); G06F 3/041 (2013.01)

(58) Field of Classification Search
CPC ................................ G06F 3/016; G06F 3/0362
See application file for complete search history.

(56) References Cited

U.S. PATENT DOCUMENTS 11,747,907 B2 * 9/2023 Orita ...................... G06F 3/0488
345/174
11,789,538 B2 * 10/2023 Orita ...................... G06F 3/0445
345/173
(Continued)

FOREIGN PATENT DOCUMENTS

JP 2015-097076 A 5/2015
JP 2017-168104 A 9/2017
(Continued)

OTHER PUBLICATIONS

International Search Report and Written Opinion mailed on Oct. 11, 2022, received for PCT Application PCT/JP2022/029733, filed on Aug. 3, 2022, 10 pages including English Translation.

*Primary Examiner* — Kevin M Nguyen
(74) *Attorney, Agent, or Firm* — XSENSUS LLP

(57) ABSTRACT

The present disclosure relates to a tactile presentation device that includes a tactile presentation knob placed on an operation screen and for presenting a tactile sense to a user via the tactile presentation knob. The tactile presentation knob includes a conductive elastic portion that includes a surface layer facing the operation screen and an inner layer located on the side opposite to the operation screen, and an operation part that fixes the conductive elastic portion. The surface layer is set to be subjected to greater shear deformation than the inner layer by an operation of the tactile presentation knob, to generate vibrations by a change in the frictional force, and to be subjected to greater compressive deformation than the inner layer by a press of the tactile presentation knob. The inner layer is set to have higher vibration transmissibility than the surface layer.

13 Claims, 40 Drawing Sheets

(56) References Cited

U.S. PATENT DOCUMENTS

| 12,287,919 | B2 * | 4/2025 | Orita .................... G06F 3/0412 |
| 2014/0077911 | A1 * | 3/2014 | Raisch ................... G06F 3/017 |
| | | | 29/469 |
| 2015/0103024 | A1 | 4/2015 | Haga et al. |
| 2017/0269686 | A1 | 9/2017 | Khoshkava et al. |
| 2018/0348874 | A1 * | 12/2018 | Khoshkava ............. G06F 3/016 |
| 2023/0010984 | A1 | 1/2023 | Hayashi et al. |
| 2023/0409117 | A1 | 12/2023 | Orita et al. |

FOREIGN PATENT DOCUMENTS

| JP | 2021-077056 | A | 5/2021 |
| JP | 6890742 | B1 | 6/2021 |
| WO | 2021/130971 | A1 | 7/2021 |

* cited by examiner

F I G. 3
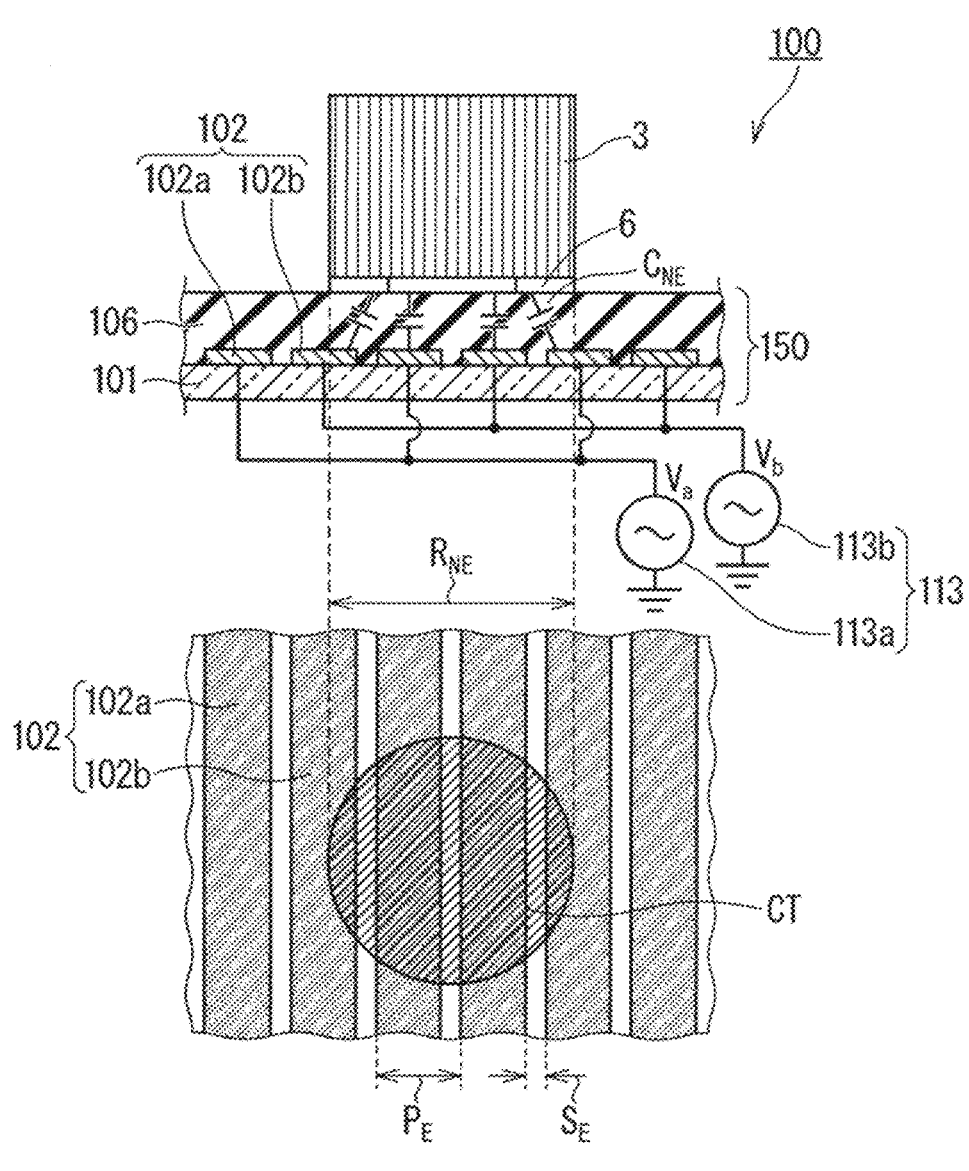

F I G. 4
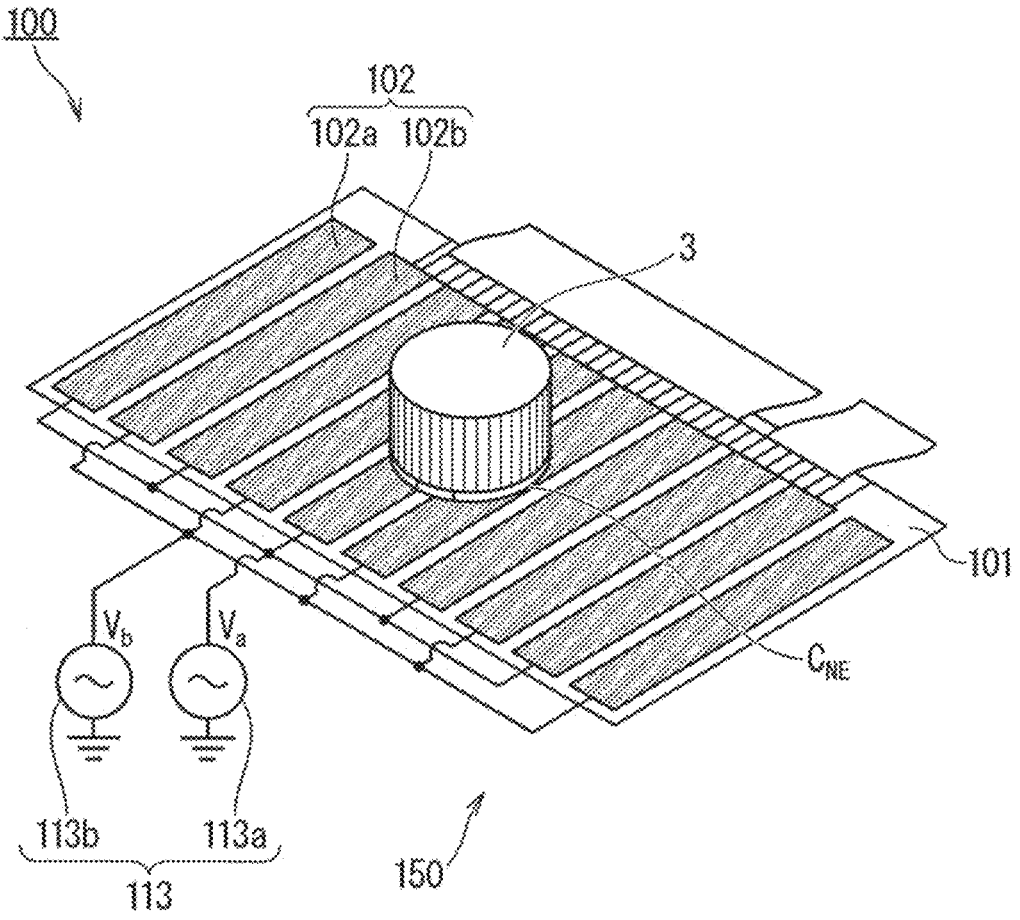
F I G. 5
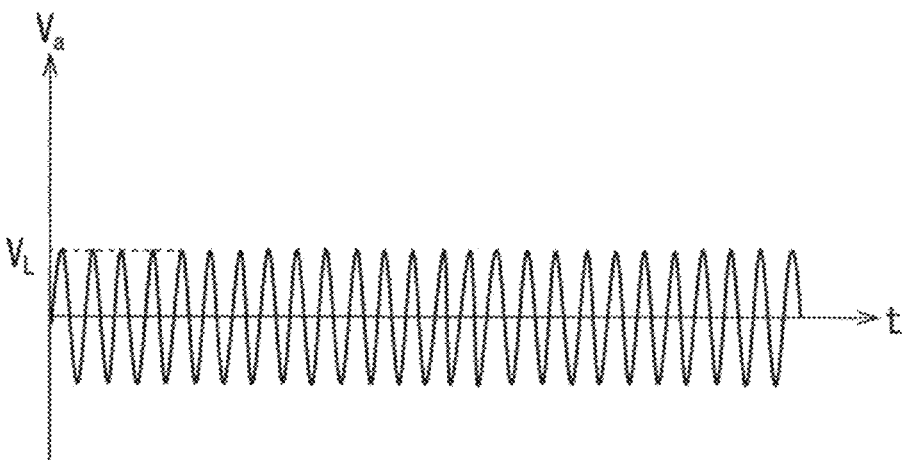

F I G. 17
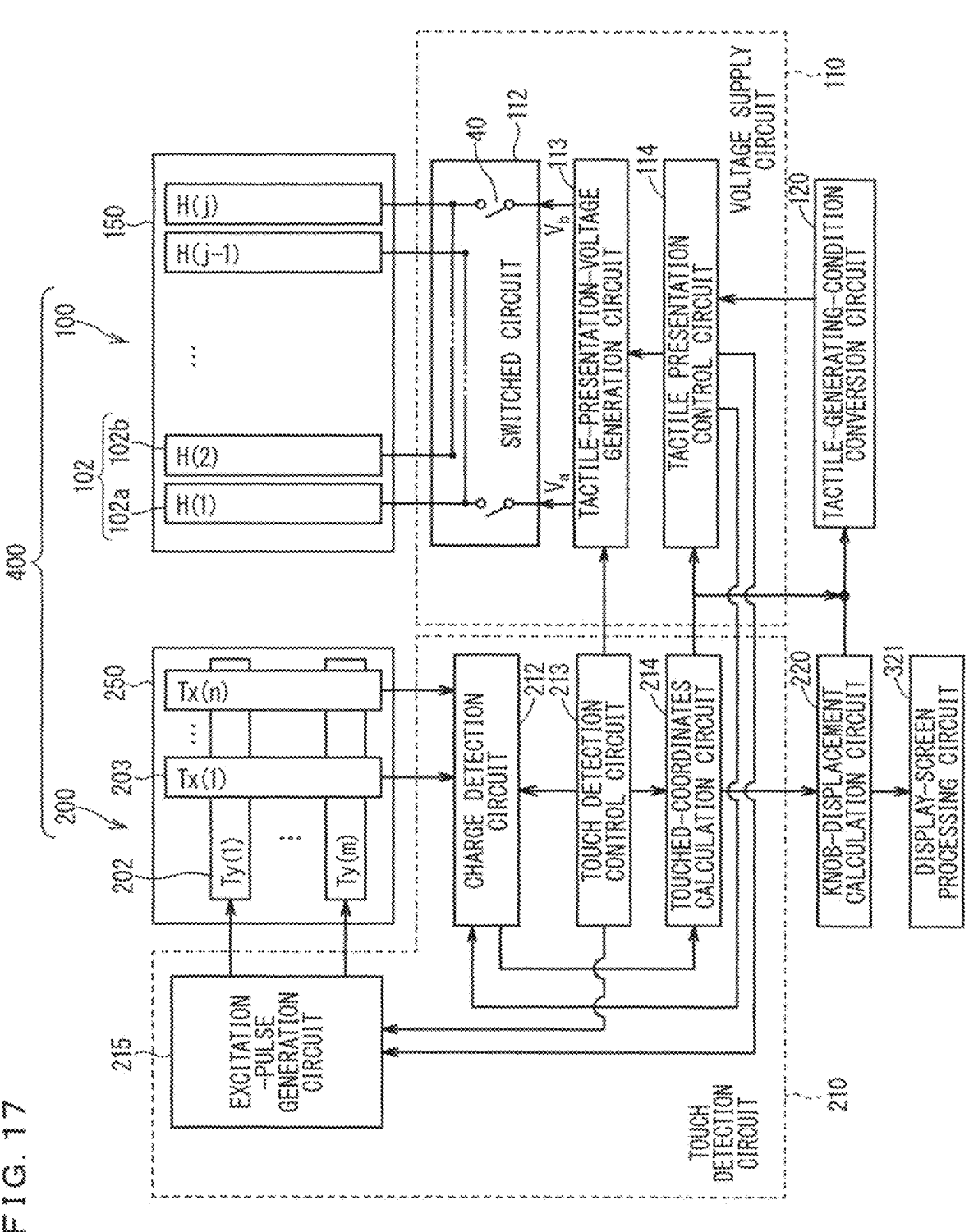

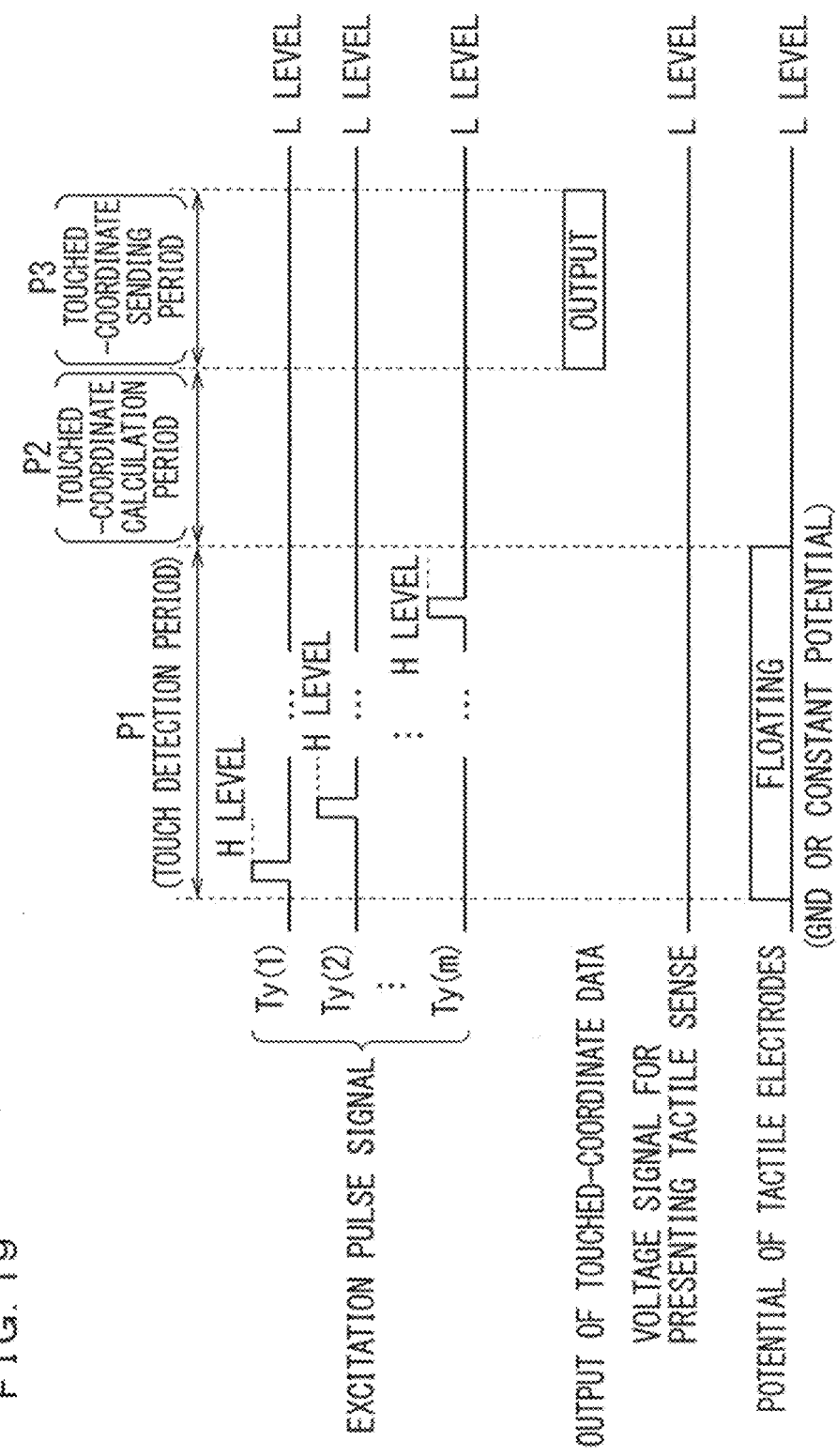
F I G . 1 9

F I G. 2 1

F I G. 2 5
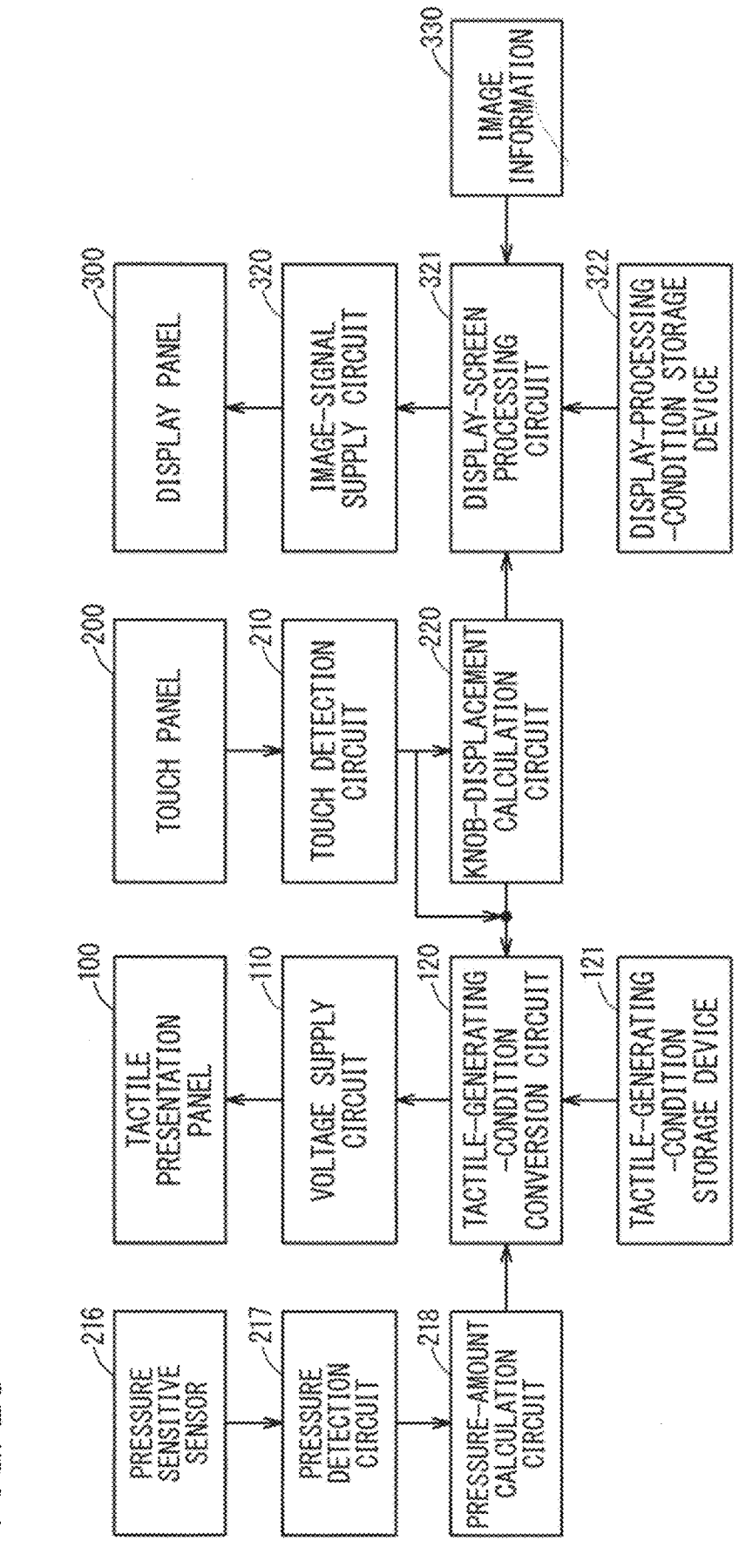

F I G. 2 6
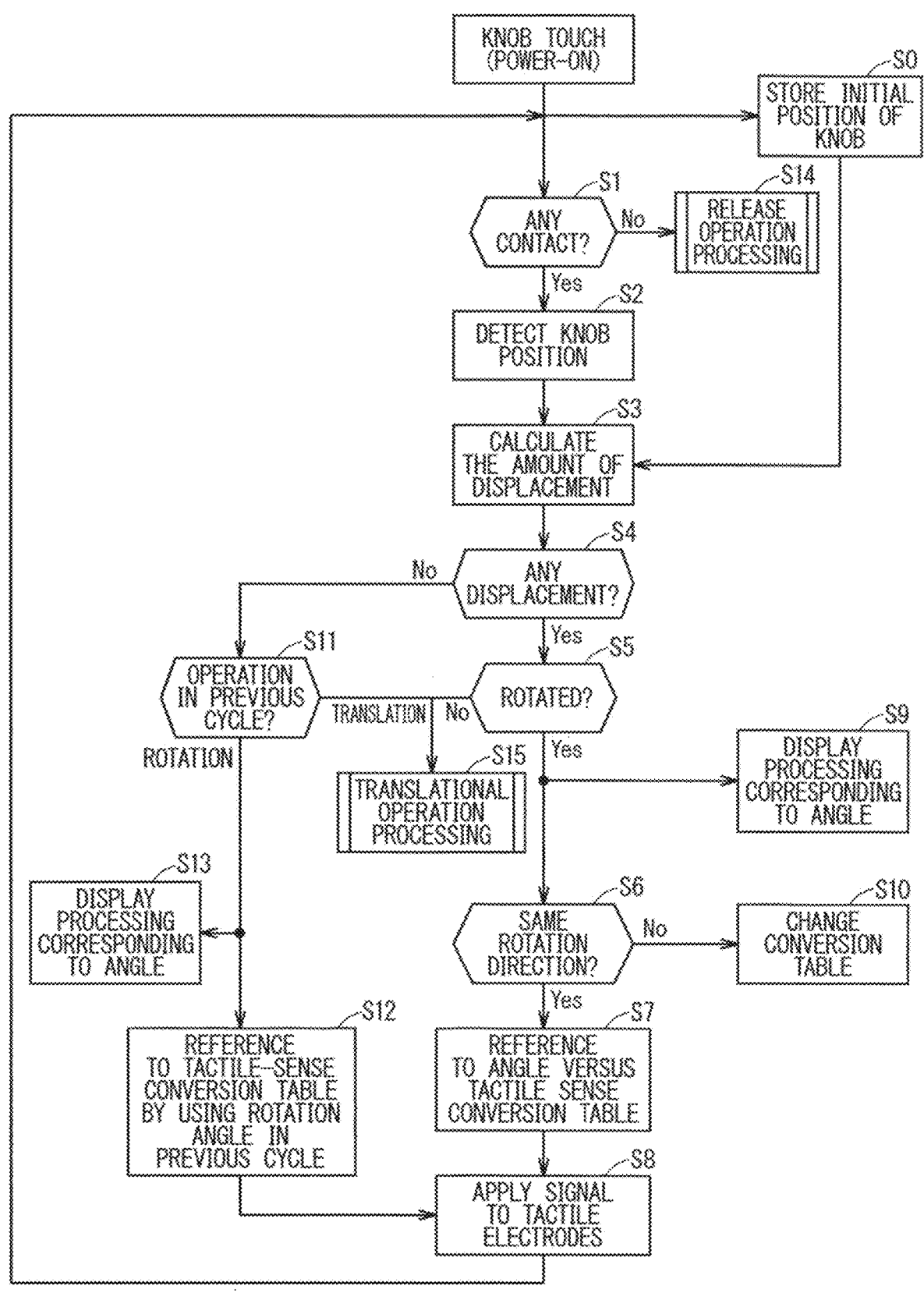

F I G. 3 2
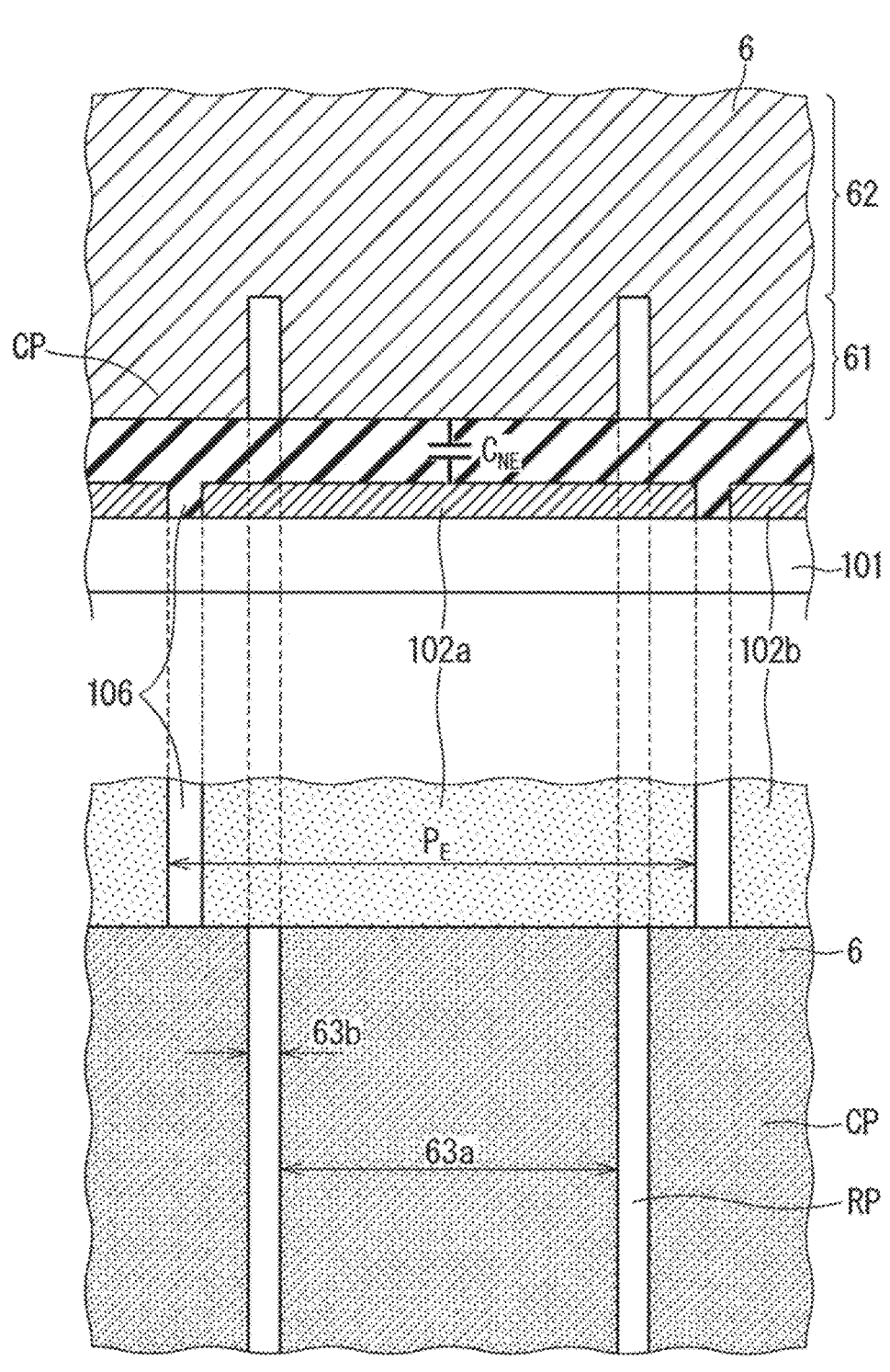

F I G. 34
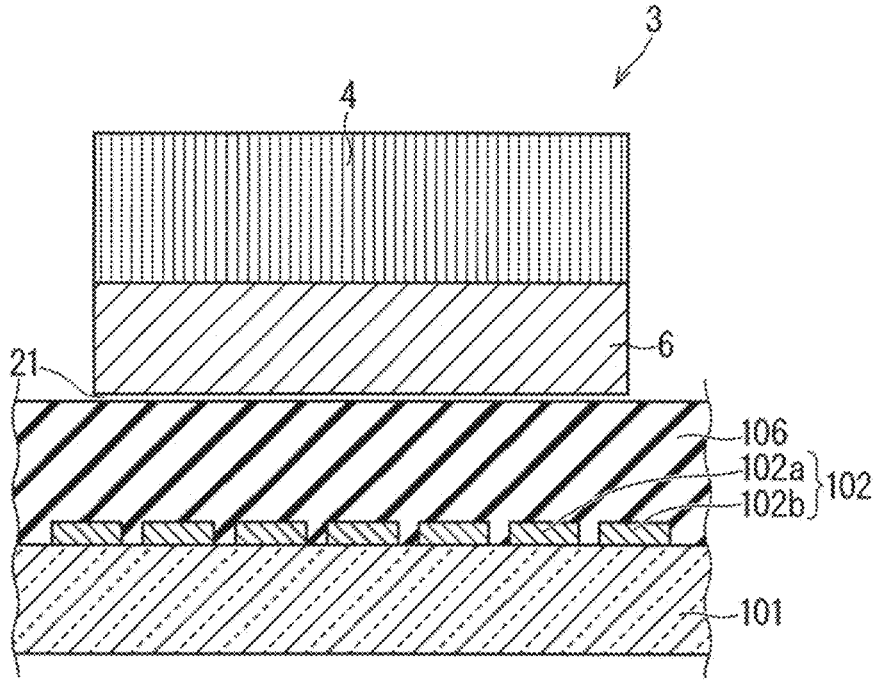
F I G. 35
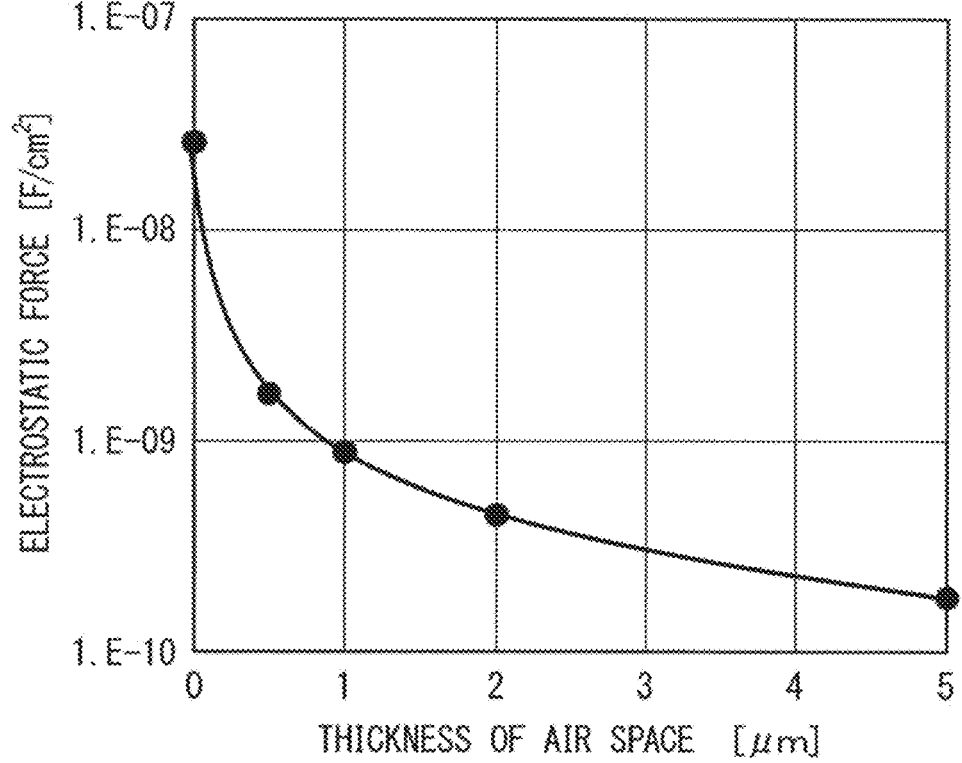

F I G. 4 8
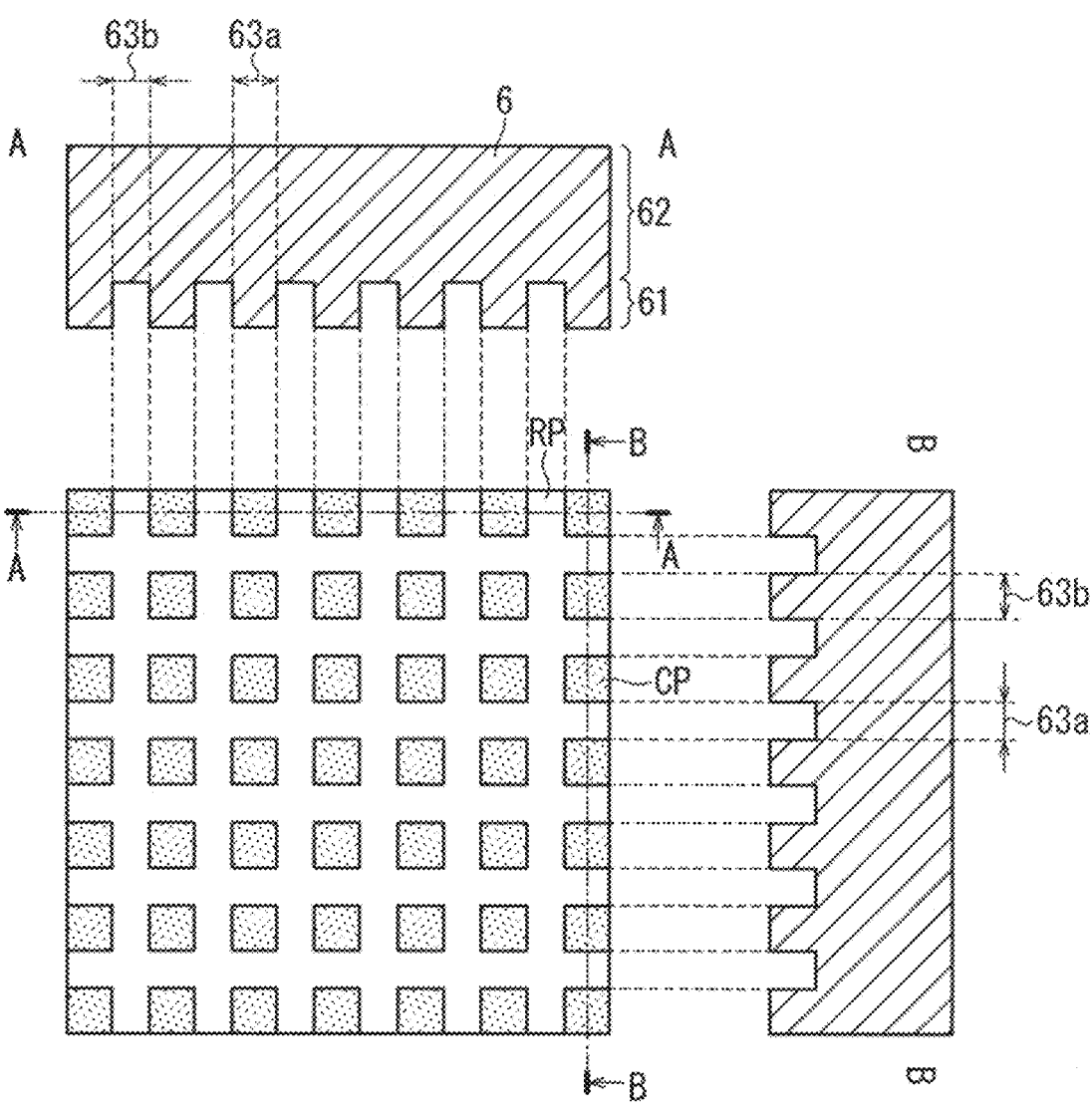

F I G. 4 9
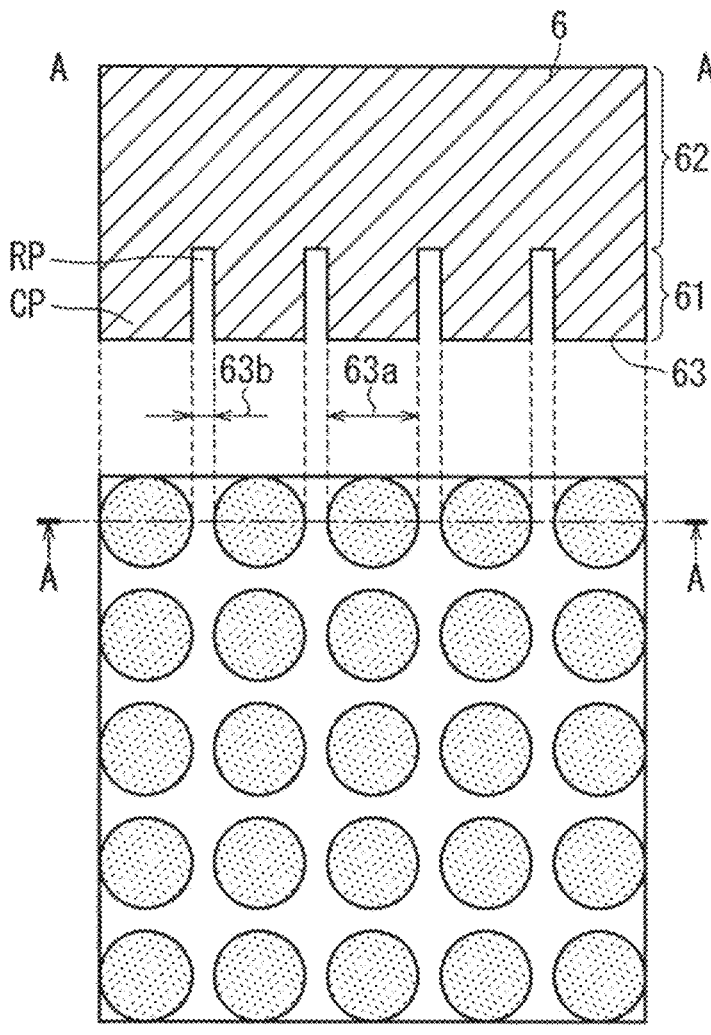

F I G. 5 0
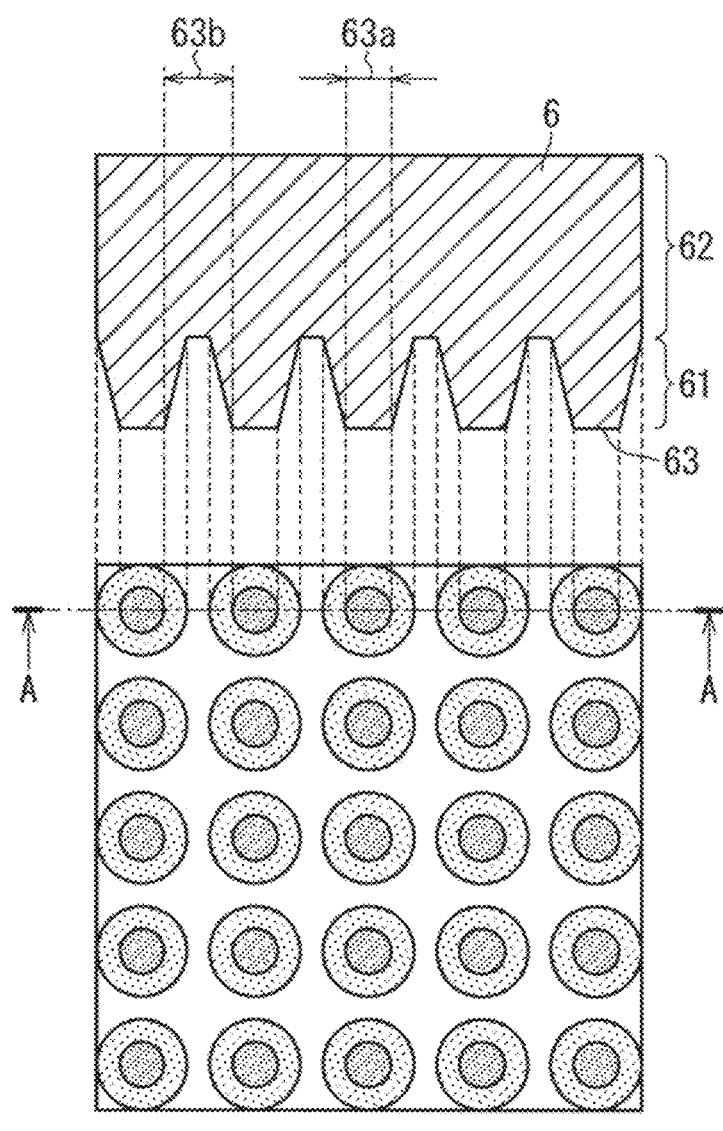

TACTILE PRESENTATION DEVICE

CROSS-REFERENCE TO RELATED APPLICATION

This application is a national stage application, pursuant to 35 U.S.C. § 371, of International Patent Application No. PCT/JP2022/029733, filed Aug. 3, 2022, the entire contents of which are incorporated herein by reference.

TECHNICAL FIELD

The present disclosure relates to a tactile presentation panel that presents a tactile sense to a user via a tactile presentation knob.

BACKGROUND ART

Touch panels are widely known as devices that detect and output a position indicated on a touch screen by an indicator such as a pen or a user's finger (hereinafter, also referred to as the "touched position"). On example of touch panels using an electrostatic capacitive system is a projected capacitive touch panel (PCAP). The PCAP is capable of detecting a touched position even if the surface of the touch panel on the user's side (hereinafter, also referred to as the "front surface") is covered with a protection plate such as a glass plate having a thickness of approximately several millimeters. The PCAP also has advantages such as its excellent robustness achieved by the protection plate arranged on the front surface and its longevity due to the absence of a moving part.

The touch screen of the PCAP includes longitudinal wiring layers for detection that detect the coordinates of a touched position in the longitudinal direction, and transverse wiring layers for detection that detects the coordinates of a touched position in the transverse direction. In the following description, the longitudinal wiring layers for detection and the transverse wiring layers for detection may be collectively referred to as the "detection wiring layers."

A member on which the detection wiring layers are arranged is referred to as the "touch screen," and a device configured by connecting a detection circuit to the touch screen is referred to as the "touch panel." An area of the touch screen where a touched position is detectable is referred to as the "detectable area."

As detection wiring layers for detecting electrostatic capacitance (hereinafter, also simply referred to as the "capacitance"), a first series of conductor elements and a second series of conductor elements are included, the first series of conductor elements being formed on a thin dielectric film, the second series of conductor elements being formed on the first series of conductor elements with an insulator film therebetween. There is no electrical contact between those series of conductor elements. As viewed in the direction of the normal to the front surface, either of the first series of conductor elements and the second series of conductor elements is overlaid on the other series in plan view, and these series of conductor elements sterically intersect with each other without electrical contact.

The coordinates of a touched position of the indicator are identified by a detection circuit detecting capacitance (hereinafter, also referred to as "touch capacitance") formed between the indicator and the conductor elements serving as detection wiring. A touched position between conductor elements can be interpolated using a relative value of detected capacitance formed by one or more conductor elements.

In recent years, touch panels that serve as operation panels including switches and other components are becoming used in various familiar pieces of equipment, instead of mechanical switches. The touch panels do not have asperities as seen in mechanical switches and provide a smooth texture, and their surface shapes do not become deformed by operations. Thus, the whole process from when the positions of switches displayed on the touch panel are confirmed to when operations using the switches are completed has to be performed by relying on vision. Accordingly, some operations are difficult, such as those performed by visually handicapped persons and those performed in parallel with other operations such as operating an audio system or the like during automobile driving.

For example, on-vehicle devices are beginning to widely use touch panels from the viewpoint of design. Since it is difficult to operate on-vehicle devices while driving without looking at the screen, functionalized touch panels that can be operated by touch-typing are attracting increasing attention from the perspective of ensuring security. The touch panels are also becoming used as operation panels in consumer devices including many home appliances and electronic devices. Moreover, the number of devices equipped with a PCAP whose surface is protected by a glass cover is increasing from a design perspective. There is also an increasing number of equipment that install PCAPs whose surfaces are protected by cover glass from the viewpoint of design. However, since the touch panels have smooth surfaces, switch positions cannot be checked by feel, and therefore it is difficult to make the touch panels compatible with universal design. In the case of PCAPs, the glass surface must be smooth in terms of design, so that it is difficult to accommodate universal design by, for example, applying unevenness to areas of the glass surface that correspond to switch positions.

As a countermeasure to the above, there are methods for using a voice communication to instruct the user acceptance and completion of operations, but these methods do not have the same functionality and versatility as machine switches due to reasons such as that voice functions can be used only in limited environments due to privacy and noise issues. If the touch panels have a function of showing switch positions and a function of providing tactile feedback on acceptance and completion of operations to the user, touch-typing operations and universal compatibility can be achieved.

Mobile phones and smartphones may have a tactile feedback function using vibrations in order to supplement operational reliability and operability without relying on sight. It is thus expected that feedback functions using vibrations linked to operations become rapidly accessible to users, and demand for more advanced tactile feedback increases.

Systems for generating tactile sensation are roughly classified into three categories, namely vibration systems, ultrasound systems, and electric systems. The vibration systems are characterized in low cost and coexistence with PCAPs, but have difficulty in incorporating vibrators into a casing in order to allow the whole devices to vibrate sufficiently. Besides, it is difficult to increase the area due to limited outputs of the vibrators. The ultrasonic systems can generate tactile sensation such a sense of smoothness and slipperiness that cannot be generated by other systems, but for similar reasons to those in the vibration system, have difficulty in being incorporated into a casing as well as increasing the area. The electric systems include electrostatic friction systems for generating tactile senses from an electrostatic force, and electric stimulation systems for giving electric stimulation directly to a finger. These systems can generate tactile senses at any arbitrary location and can achieve an increase in area and multi-touch compatibility.

The electric systems are described below. In the following description, a member in which tactile electrodes are arranged on a transparent insulating substrate is referred to as a "tactile presentation screen," and a device in which a detection circuit is connected to the tactile presentation screen is referred to as a "tactile presentation panel." An area of the tactile presentation screen that can present a "tactile screen" is referred to as the "tactile presentable area."

As to a tactile output device for use in a rotary knob, for example, Patent Document 1 discloses that a tactile presentation knob provided with a plurality of conductive elastic portions is placed on a tactile presentation panel, and tactile senses are presented via the tactile presentation knob to the user. The tactile presentation knob includes the conductive elastic portions and generate a tactile sense resulting from a change in frictional force between the conductive elastic portions and the tactile presentation panel on which the tactile electrodes are arranged.

PRIOR ART DOCUMENTS

Patent Document

Patent Document 1: International Publication No. 2021/130971

SUMMARY

Problem to be Solved by the Invention

According to Patent Document 1, tactile senses are considered to be generated by vibrations resulting from deformation (hereinafter, expressed as "shear deformation") of the conductive elastic portions due to a change in frictional force and a horizontal displacement of the tactile presentation knob. In order to obtain a clear tactile sense, it is preferable to use a material that has small vibration attenuation and causes a amount of shear deformation of the conductive elastic portions. In order to attain stable tactile strength, it is preferable to use a material that causes a large amount of compressive deformation in order to maintain a constant contact area while preventing the conductive elastic portions from being in relief on the operation surface during operation, resulting from the flatness or surface roughness of the operation screen and the inclination of the tactile presentation knob. However, generally such a material that causes a large amount of shear and compressive deformation has large vibration attenuation. Thus, in the case where the conductive elastic portions are formed of a single material as in Patent Document 1, it may be difficult to achieve both clearness and stability in tactile strength.

The present disclosure has been made in order to solve issues as described above, and it is an object of the present disclosure to provide a tactile presentation device capable of presenting a clear and stable tactile sense while suppressing vibration attenuation and a reduction in contact area.

Means to Solve the Problem

A tactile presentation device according to the present disclosure includes a tactile presentation knob placed on an operation screen and presents a tactile sense to a user via the tactile presentation knob. The tactile presentation device includes a tactile electrode that includes a plurality of first electrodes and a plurality of second electrodes provided inside the operation screen of the tactile presentation device, a dielectric layer that covers the tactile electrode and has one surface serving as the operation screen, and a voltage generation circuit that generates a first voltage signal of a first frequency and a second voltage signal of a second frequency different from the first frequency, the first voltage signal being applied to at least one of the first electrodes that is located in a region of at least part of the operation screen of the tactile presentation device, the second voltage signal being applied to at least one of the second electrodes that is located in a region of at least part of the operation screen. The tactile sense is presented by supplying the first voltage signal and the second voltage signal to generate a frictional force between the operation screen and the tactile presentation knob. The tactile presentation knob includes a conductive elastic portion that includes a surface layer facing the operation screen and an inner layer located on a side opposite to the operation screen, and an operation part that fixes the conductive elastic portion. The surface layer is set to be subjected to greater shear deformation than the inner layer by an operation of the tactile presentation knob, to generate a vibration by a change in the frictional force, and to be subjected to greater compressive deformation than the inner layer by a press of the tactile presentation knob. The inner layer is set to have higher vibration transmissibility than the surface layer.

Effects of the Invention

According to the tactile presentation device of the present disclosure, the surface layer is vibrated by a change in the frictional force and the shear deformation caused by the operation of the tactile presentation knob, and the vibration of the surface layer is propagated to the operation part by the inner layer and presented as a tactile sense to a user via the tactile presentation knob. Accordingly, a clear tactile sense is obtained by a small change in voltage. The surface layer is also compressed when the user depresses the tactile presentation knob. Thus, stable tactile strength is attained without being affected by the degree of flatness of the operation surface, surface roughness, and the area of contact between the operation screen and the conductive elastic portion made by an inclination of the tactile presentation knob during operation.

BRIEF DESCRIPTION OF DRAWINGS

FIG. 3 is a schematic diagram for describing electrostatic capacitance formed between tactile electrodes and a tactile presentation knob of a tactile presentation panel shown in FIG. 2.

FIG. 4 is a perspective view for describing the electrostatic capacitance formed between the tactile electrodes and the tactile presentation knob of the tactile presentation panel shown in FIG. 2.

FIG. 5 is a graph showing one example of a voltage signal of a first frequency applied to first electrodes shown in FIG. 2.

FIG. 17 is a block diagram diagrammatically showing a configuration of a tactile presentation touch panel shown in FIG. 1.

FIG. 19 is a timing chart diagrammatically showing the timing of operations of the tactile presentation touch panel shown in FIG. 1 when the indicator is not in contact with the tactile presentation knob.

FIG. 21 is a timing chart diagrammatically showing the timing of operations of the tactile presentation touch panel shown in FIG. 1 when the indicator is in contact with the tactile presentation knob.

FIG. 25 is a block diagram showing an overview of the relationship of a display panel, a touch panel, and the tactile presentation panel according to Embodiment 1.

FIG. 26 is a flowchart showing processing for presenting a tactile sense according to Embodiment 1.

FIG. 32 is a diagram for describing a pitch of projections and depressions of the conductive elastic portion of the tactile presentation knob according to the variation of Embodiment 1.

FIG. 34 is a diagram schematically showing a state in which an air space is formed between the tactile presentation knob and the tactile presentation panel.

FIG. 35 is a diagram showing the relationship between the thickness of the air space formed between the tactile presentation knob and the tactile presentation panel and an electrostatic force generated between the tactile electrodes and the conductive elastic portion.

FIG. 48 is a diagram showing one example of the uneven shape of the conductive elastic portion of a tactile presentation knob according to Embodiment 2.

FIG. 49 is a diagram showing one example of the uneven shape of the conductive elastic portion of the tactile presentation knob according to Embodiment 2.

FIG. 50 is a diagram showing one example of the uneven shape of the conductive elastic portion of the tactile presentation knob according to Embodiment 2.

DESCRIPTION OF EMBODIMENTS

Embodiment 1

<Tactile Presentation Touch Display>

Figure 1:
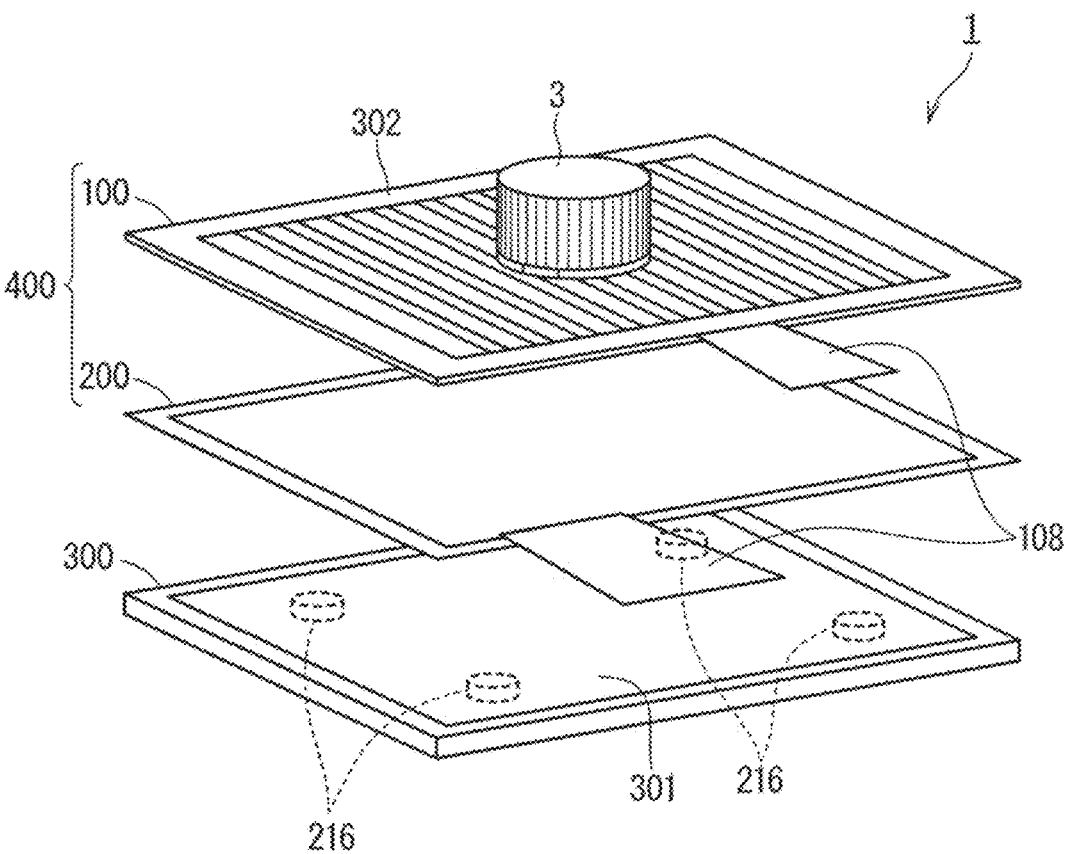
FIG. 1 is an exploded perspective view diagrammatically showing a configuration of a tactile presentation touch display according to Embodiment 1.
Figure 2:
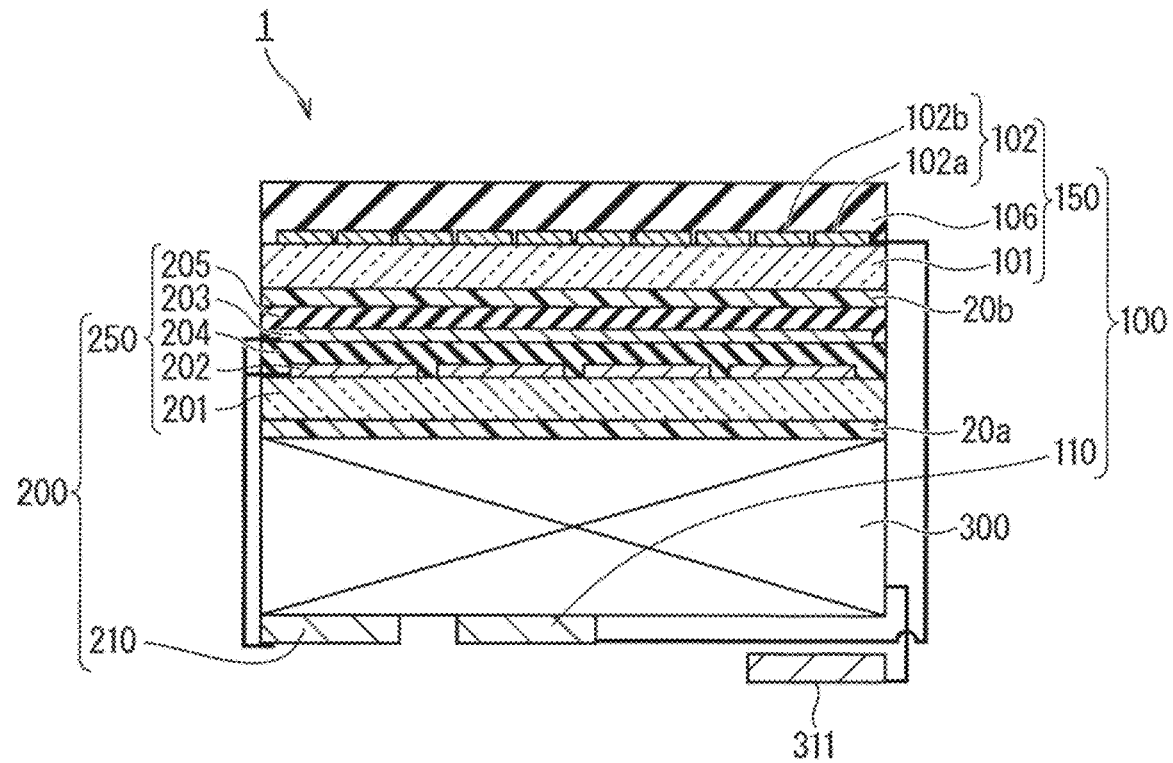
FIG. 2 is a sectional view diagrammatically showing the configuration of the tactile presentation touch display shown in FIG. 1.

FIG. 1 is an exploded perspective view diagrammatically showing a configuration of a tactile presentation device that places a tactile presentation knob 3 on a tactile presentation touch display 1 according to Embodiment 1 of the present disclosure so as to present a tactile sense of an operating feel and an operation amount. FIG. 2 is a sectional view diagrammatically showing a configuration of the tactile presentation touch display 1.

The tactile presentation touch display 1 includes a tactile presentation touch panel 400 and a display panel 300 with the tactile presentation touch panel 400 mounted thereon. The display panel 300 includes pressure sensitive sensors 216. The tactile presentation touch panel 400 includes a tactile presentation panel 100 and a touch panel 200. The tactile presentation panel 100 includes a tactile presentation screen 150 and a voltage supply circuit 110. The touch panel 200 includes a touch screen 250 and a touch detection circuit 210. Note that the tactile presentation panel 100 may also be referred to as a tactile presentation device.

According to Embodiment 1 of the present disclosure, the tactile presentation screen 150 is arranged on a side of the tactile presentation touch display 1 that faces a user (on the front side) and fixedly attached with an adhesive 20b on a surface of the touch screen 250 that faces the user (on the front surface). The touch screen 250 is fixedly attached with an adhesive 20a on a surface of the display panel 300 that faces the user (on the front surface).

The tactile presentation screen 150 includes a transparent insulating substrate 101, tactile electrodes 102, and a dielectric layer 106. The tactile electrodes 102 include a plurality of first electrodes 102a and a plurality of second electrodes 102b that are arranged alternatively with intervals on the transparent insulating substrate 101. The dielectric layer 106 covers the plurality of first electrodes 102a and the plurality of second electrodes 102b. The tactile presentation screen 150 is electrically connected to the voltage supply circuit 110 by a flexible print circuit (FPC) 108. The display panel 300 also includes a liquid-crystal driving circuit 311 on the back side.

The touch screen 250 includes a substrate 201 that is transparent and has insulating properties, excitation electrodes 202, detection electrodes 203, an interlayer insulating layer 204, and an insulating layer 205. The touch screen 250 is electrically connected to the touch detection circuit 210 by the FPC 108. The touch detection circuit 210 detects a touched position on the transparent insulating substrate 101 of the tactile presentation screen 150. In this way, not only the presentation of a tactile sense but also the detection of a touched position are possible on the transparent insulating substrate 101. For example, the touch detection circuit 210 may include a microcomputer and a detection integrated circuit (IC) for detecting a change of electrostatic capacitance caused by a touch. Details about the configuration of the touch screen 250 will be described later while citing a specific example.

The display panel 300 includes two opposite transparent insulating substrates and a display functional layer having a display function and sandwiched between the two transparent insulating substrates. The display panel 300 is typically a liquid crystal panel. The display panel 300 may also be an organic electro-luminescence (EL) panel, a micro light emitting diode (LED) panel, or an electronic paper panel. The touch panel 200 is typically a PCAP. In the case where the pressure sensitive sensor 216 has a function of detecting a touched position, the touch panel 200 may be omitted. The pressure sensitive sensors 216 may use any of the following systems as long as the pressure sensitive sensors are capable of detecting pressure, the following systems including an electrostatic capacitive system in which a member that configures the tactile presentation touch display 1 detects deformation caused by pressure as a change in capacitance, and a piezoelectric system for detecting pressure as a change in the resistance of a semiconductor deformation gauge.

<Overview of Tactile Presentation Panel>

FIG. 3 is a diagram for schematically describing electrostatic capacitance $C_{NE}$ formed between the tactile electrodes 102 and the tactile presentation knob 3 of the tactile presentation panel 100. FIG. 4 is a perspective view of FIG. 3. When the tactile presentation knob 3 touches a contact surface CT that is part of the front surface of the tactile presentation screen 150, the electrostatic capacitance $C_{NE}$ is formed via the dielectric layer 106 between the tactile electrodes 102 and the tactile presentation knob 3 on the contact surface CT. To facilitate viewing of the drawings, only a tactile-presentation-voltage generation circuit 113 included in the voltage supply circuit 110 (see FIG. 2) is shown, and the other configuration included in the voltage supply circuit 110 is not shown. A more specific configuration of the voltage supply circuit 110 will be described later.

The tactile-presentation-voltage generation circuit 113 included in the voltage supply circuit 110 includes a first voltage generation circuit 113a and a second voltage generation circuit 113b. The first voltage generation circuit 113a is configured to apply a voltage signal $V_a$ to first electrodes 102a that are located on a region of at least part of the transparent insulating substrate 101 among the plurality of first electrodes 102a. According to Embodiment 1 of the present disclosure, the voltage signal $V_a$ is assumed to be applied to all first electrodes 102a that are located on the region of at least part of the transparent insulating substrate 101. The second voltage generation circuit 113b is configured to apply a voltage signal $V_b$ to second electrodes 102b that are located in a region of at least part of the transparent insulating substrate 101 among the plurality of second electrodes 102b. According to Embodiment 1 of the present disclosure, the voltage signal $V_b$ is assumed to be applied to all second electrodes 102b that are located on the region of at least part of the transparent insulating substrate 101.

Figure 6:
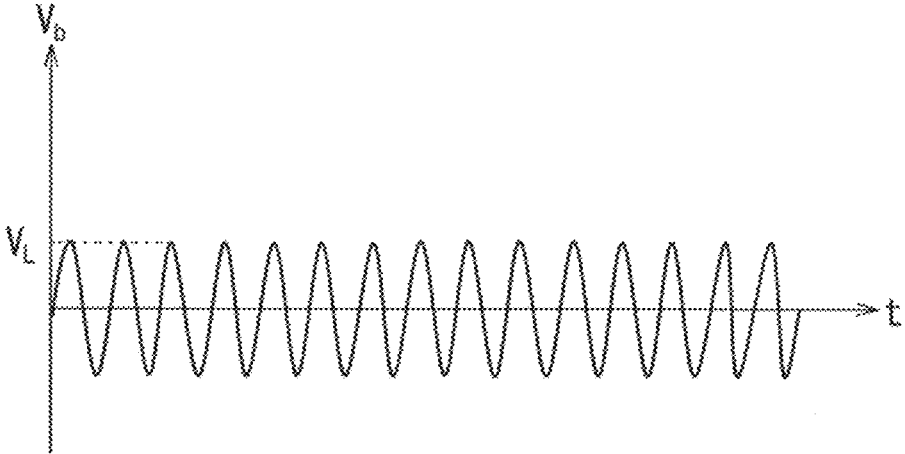
FIG. 6 is a graph showing one example of a voltage signal of a second frequency applied to second electrodes shown in FIG. 2.

FIGS. 5 and 6 are graphs showing one example of the voltage signal $V_a$ and the voltage signal $V_b$, respectively. The voltage signal $V_a$ (first voltage signal) of the first voltage generation circuit 113a has a first frequency. The voltage signal $V_b$ (second voltage signal) of the second voltage generation circuit 113b has a second frequency different from the first frequency. The amplitude of the voltage signal $V_a$ and the amplitude of the voltage signal $V_b$ may be the same amplitude $V_L$. In the examples shown in FIGS. 5 and 6, sinusoidal waves of different frequencies are used as the voltage signal $V_a$ and the voltage signal $V_b$. Instead of the sinusoidal waves, pulse waves or waves of any other shape may be used. In order to generate a sufficiently strong tactile sense, the amplitude $V_L$ may preferably be approximately several tens of volts.

Figure 7:
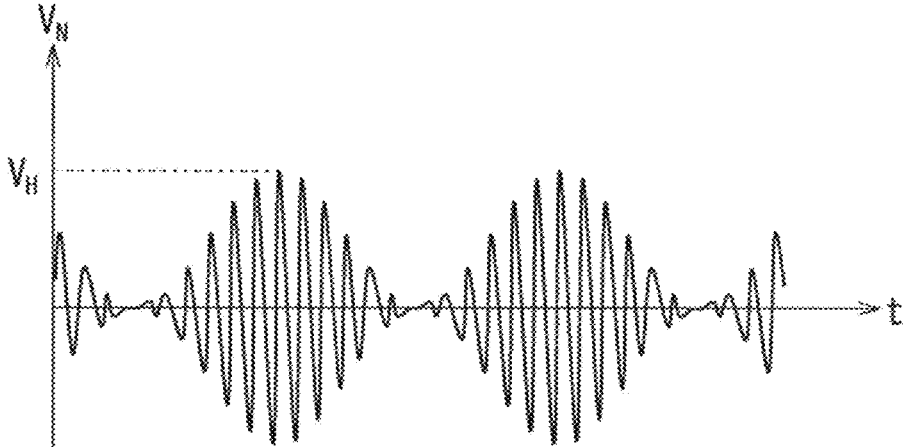
FIG. 7 is a graph showing an amplitude modulation signal generated by a combination of the voltage signals shown in FIGS. 5 and 6.

FIG. 7 is a graph showing an amplitude modulation signal $V_N$ generated by a combination of the voltage signal $V_a$ (see FIG. 5) and the voltage signal $V_b$ (see FIG. 6). The voltage signal $V_a$ is applied to the first electrodes 102a, and the voltage signal $V_b$ is applied to the second electrodes 102b. As a result, in the region where the electrostatic capacitance $C_{NE}$ (see FIG. 4) is formed between the tactile presentation knob 3 and each of the first electrodes 102a and the second electrodes 102b, charging and discharging are repeated in accordance with the amplitude modulation signal $V_N$ with a maximum amplitude $V_H$ that is approximately twice of the amplitude $V_L$. As a result, an electrostatic force that corresponds to the amplitude modulation signal $V_N$ with the maximum amplitude $V_H$ is applied to the tactile presentation knob 3 that is in contact with over the first electrodes 102a and the second electrodes 102b via the dielectric layer 106. The amplitude modulation signal $V_N$ has a beat frequency in correspondence with the aforementioned difference between the first frequency and the second frequency. Thus, when the tactile presentation knob 3 rotates on the tactile presentation screen 150, a frictional force acting on the tactile presentation knob 3 changes at the aforementioned beat frequency. As a result, the tactile presentation knob 3 vibrates at the beat frequency. The vibrations of the tactile presentation knob 3 are perceived by the user as a tactile sense obtained from the tactile presentation screen 150. As described above, the tactile presentation screen 150 of the tactile presentation panel 100 is configured to generate a tactile sense by controlling the electrostatic force applied to the tactile presentation knob 3 to change the frictional force applied to the tactile presentation knob 3.

As described so above, the amplitude modulation signal $V_N$ is generated so as to have a voltage that is approximately twice of the voltage of each of the input voltage signal $V_a$ (see FIG. 5) and the voltage signal $V_b$ (see FIG. 6). Thus, the amplitude modulation signal $V_N$ that is necessary to cause a desired frictional force to act on the tactile presentation knob 3 can be generated by the voltage signal $V_a$ (see FIG. 5) and the voltage signal $V_b$ (see FIG. 6) whose voltages are approximately one half of the voltage of the amplitude modulation signal. Accordingly, an equivalent electrostatic force can be generated by a half of the voltage applied when the amplitude modulation signal is directly input to the first electrodes 102a and 102b. This allows a low-voltage drive.

In order to present a sufficiently strong tactile sense to the user, the maximum amplitude $V_H$ may be sufficiently high correspondingly, and the amplitude $V_L$ may be a small value correspondingly. Thus, the amplitude $V_L$ does not necessarily have to be such high that can generate a sufficiently strong tactile sense by itself. As a result of setting the amplitude $V_L$ in this way, when only either the first electrodes 102a or the second electrodes 102b are in contact with the tactile presentation knob 3, the user will hardly perceive any tactile sense, irrespective of what frequency is selected for the voltage signal $V_a$ and the voltage signal $V_b$.

In order to easily locate the tactile presentation knob 3 astride the first electrodes 102a and the second electrodes 102b, the tactile electrodes 102 may preferably be arranged at a pitch $P_E$ smaller than a diameter $R_{NE}$ of the contact surface CT as shown in FIG. 3.

<Touch Panel>

Figure 8:
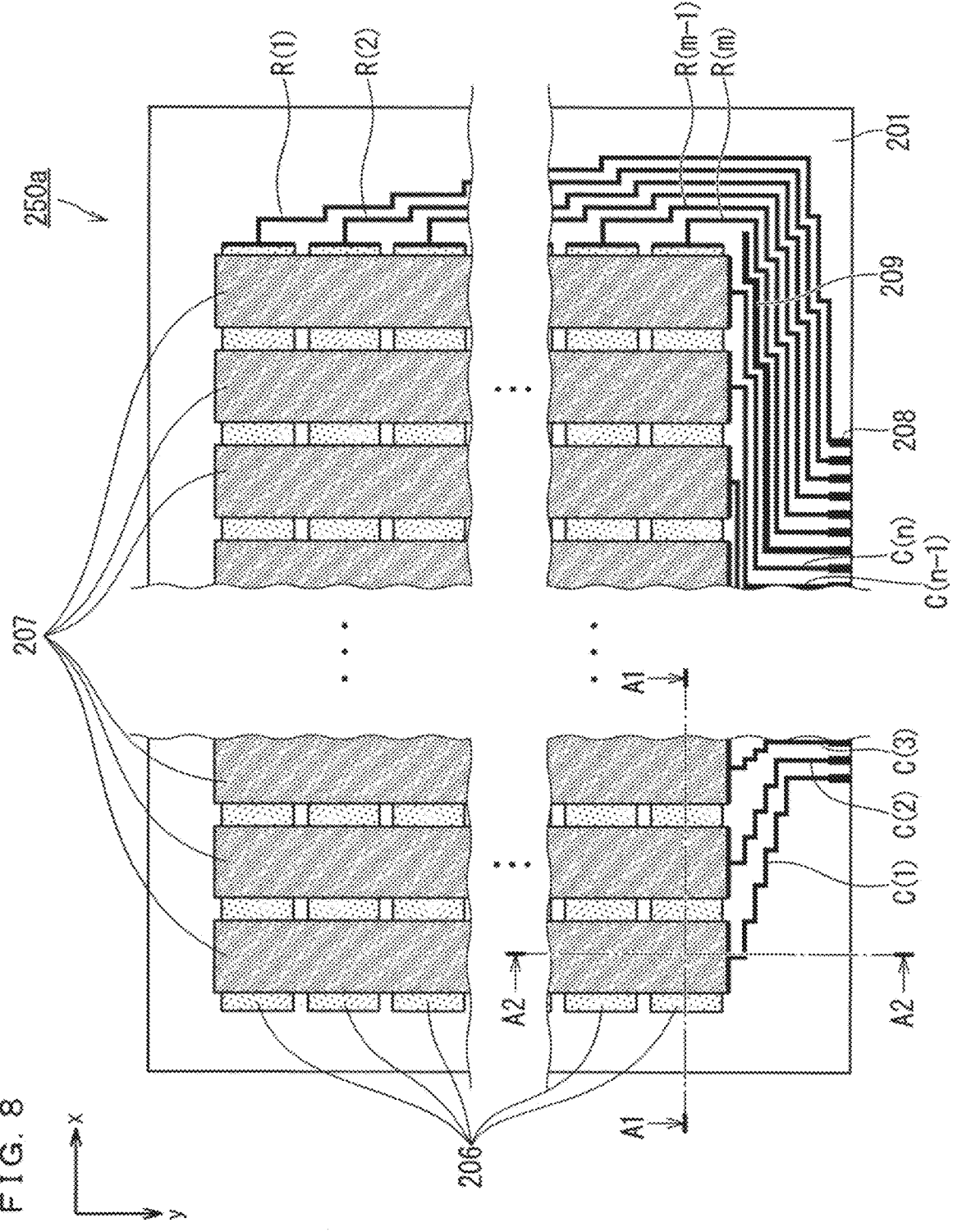
FIG. 8 is a plan view showing one example of a touch screen shown in FIG. 2.
Figure 9:
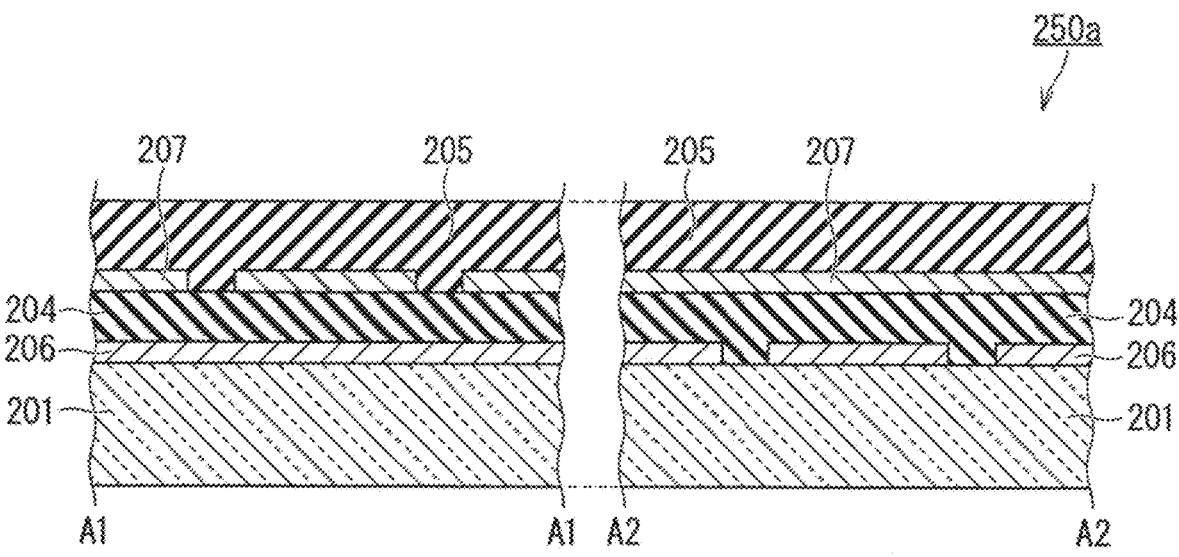
FIG. 9 shows partial sectional views taken along lines A1-A1 and A2-A2 in FIG. 8.

FIG. 8 is a plan view showing an electrostatic capacitive touch screen 250a as one example of the touch screen 250 (see FIG. 2). FIG. 9 shows partial sectional views taken along lines A1-A1 and A2-A2 in FIG. 8.

The touch screen 250a includes a plurality of longitudinal wiring layers 206 and a plurality of transverse wiring layers 207. Each of the longitudinal wiring layers 206 is configured by a plurality of excitation electrodes 202 (see FIG. 2) electrically connected to one another, and each of the transverse wiring layers 207 includes a plurality of detection electrodes 203 (see FIG. 2) electrically connected to one another. In FIGS. 8 and 9, the longitudinal wiring layers 206 and the transverse wiring layers 207 are shown while ignoring such a fine structure. The excitation electrodes 202 (see FIG. 2) have a multilayer structure including a single layer film of metal, a multilayer film of metal, or either of them and using also other conductive materials. For example, the metal may preferably be low-resistance metal such as aluminum or silver. The same applies to the detection electrodes 203 (see FIG. 2). Using the metal as the wiring material reduces wiring resistance. Meanwhile, metal wiring is opaque and is thus visually recognizable with ease. Thus, in order to lower visibility and improve transmissivity of the touch screen, a fine-line structure may be added to the metal wiring. A typical fine-line structure may have a mesh shape.

Each of the longitudinal wiring layers 206 extends in a row direction (the x direction in the drawing), and each of the transverse wiring layers 207 extends in a column direction (the y direction in the drawing). The plurality of longitudinal wiring layers 206 are aligned at intervals in the column direction, and the plurality of transverse wiring layers 207 are aligned at intervals in the row direction. As shown in FIG. 8, in plan view, each of the longitudinal wiring layers 206 intersects with the plurality of transverse wiring layers 207, and each of the transverse wiring layers 207 intersects with the plurality of longitudinal wiring layers 206. The longitudinal wiring layers 206 and the transverse wiring layers 207 are insulated from each other by the interlayer insulating layer 204.

The interlayer insulating layer 204 is formed of a single layer film of an organic insulator film, a single layer film of an inorganic insulator film, or a multilayer film. The inorganic insulator film is excellent at improving humidity resistance, and the organic insulator film is excellent at improving flatness. Examples of the inorganic insulator film include transparent silicon-based inorganic insulator films such as a silicon oxide film, a silicon nitride film, or a silicon oxy-nitride film and transparent inorganic insulator films formed of metal oxides such as alumina. As the material for the organic insulator film, a polymeric material may be used that has a main chain formed of a silicon oxide, a silicon nitride film, or a silicon oxy-nitride film and uses organic substances coupled to a side chain or a functional group, or a thermosetting resin may be used that has a main chain formed of carbon. Examples of the thermosetting resin include an acrylic resin, a polyimide resins, an epoxy resin, an novolac resin, and an olefin resin.

Each of the longitudinal wiring layers 206 on the touch screen 250*a* are connected to touch screen terminal areas 208 by lead wiring layers R(1) to R(m), respectively. Each of the transverse wiring layers 207 is connected to touch screen terminal areas 208 by lead wiring layers C(1) to C(n), respectively. The touch screen terminal area 208 is provided in the end portion of the substrate 201.

The lead wiring layers R(1) to R(m) are each arranged outside a detectable area and extend to the corresponding electrode so as to obtain almost the shortest distance in order from the one closer to the center in the alignment of the touch screen terminal areas 208. The lead wiring layers R(1) to R(m) are arranged as densely as possible while ensuring mutual insulation. The same applies to the lead wiring layers C(1) to C(n). Such an arrangement reduces the area of the portion of the substrate 201 that is located outside the detectable area.

A shield wiring layer 209 may be provided between a group of the lead wiring layers R(1) to R(m) and a group of the lead wiring layers C(1) to C(n). This suppresses the occurrence of noise in one group affected by the other group. The shield wiring layer can also reduce the influence of electromagnetic noise generated from the display panel 300 (see FIG. 2) on the lead wiring layers. The shield wiring layer 209 may be formed of the same material at the same time as the longitudinal wiring layers 206 and the transverse wiring layers 207.

The insulating layer 205 is provided on the substrate 201 so as to expose the touch screen terminal areas 208 and covers the longitudinal wiring layers 206, the transverse wiring layers 207, and the interlayer insulating layer 204. The insulating layer 205 may be formed of a material similar to the material for the interlayer insulating layer 204. In the case where the display panel 300 is a liquid crystal panel, a top deflecting plate that has undergone anti-glare treatment for liquid crystal panel may be affixed on the portion of the insulating layer 205 that passes light for display.

Figure 10:
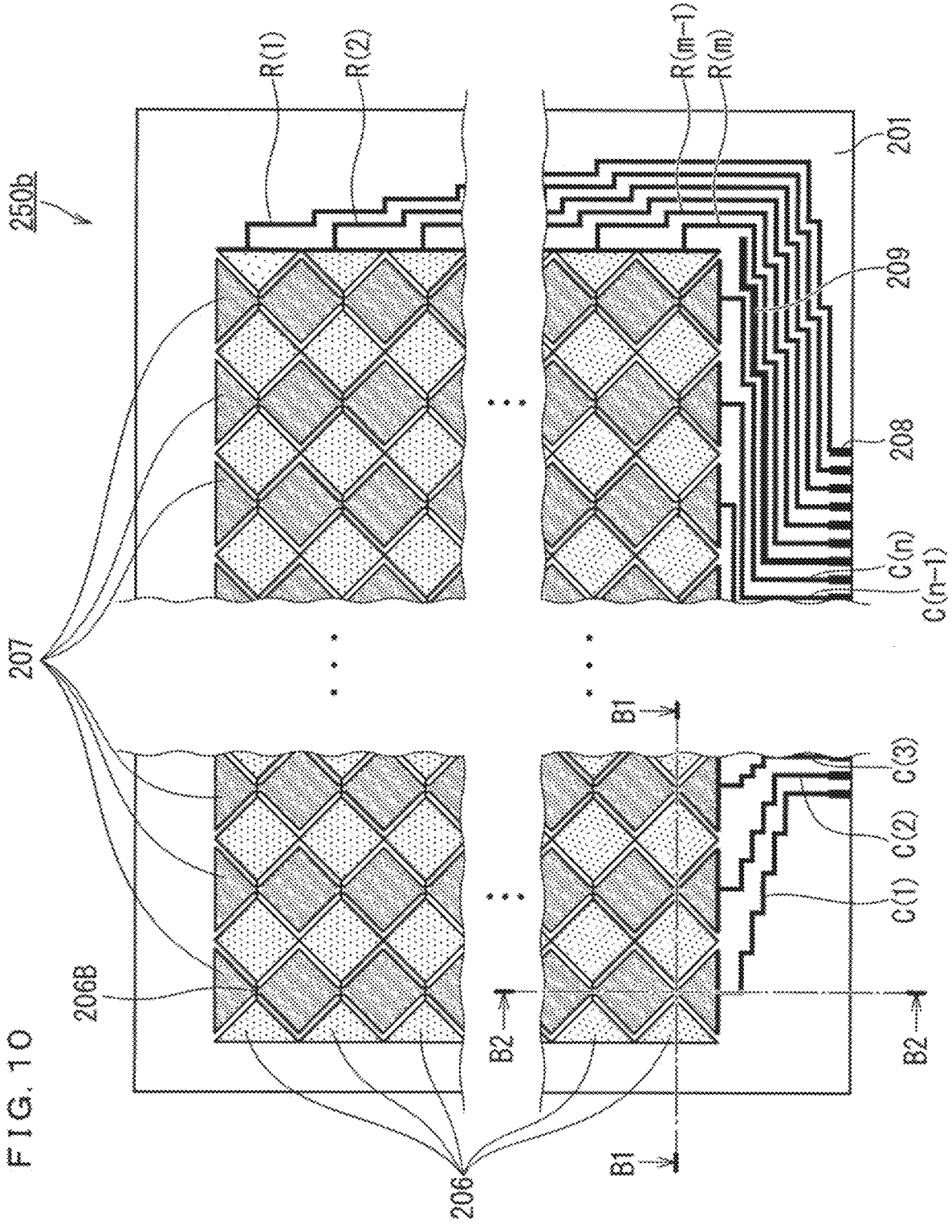
FIG. 10 is a plan view showing one example of the touch screen shown in FIG. 2.
Figure 11:
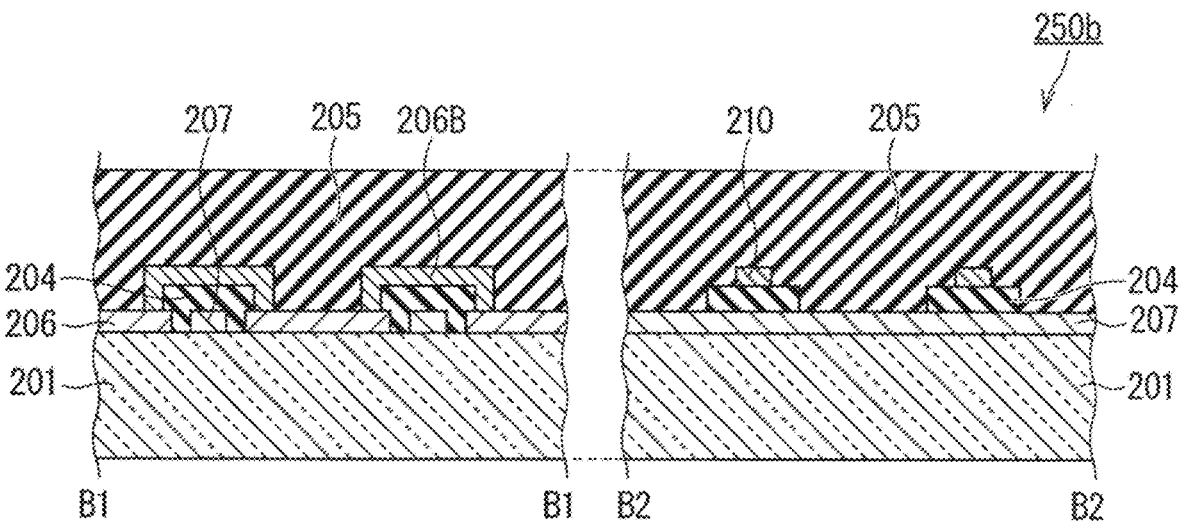
FIG. 11 shows partial sectional views taken along lines B1-B1 and B2-B2 in FIG. 10.

FIG. 10 is a plan view showing an electrostatic capacitive touch screen 250*b* as one example of the touch screen 250 (see FIG. 2). FIG. 11 shows partial sectional views taken along lines B1-B1 and B2-B2 in FIG. 10. In the examples shown in FIGS. 10 and 11, a so-called diamond structure is employed.

The longitudinal wiring layers 206 and the transverse wiring layers 207 are arranged in the same layer. Each of the transverse wiring layers 207 includes, as the detection electrodes 203, a plurality of diamond-shaped electrodes connected to one another. The longitudinal wiring layers 206 include a plurality of diamond-shaped electrodes spaced from one another as the excitation electrodes 202, and bridges 206B each providing electrical connection between adjacent diamond-shaped electrodes. The interlayer insulating layer 204 is arranged so as to provide insulation between the bridges 206B and the transverse wiring layers 207. Note that the bridge structure may be applied not to the longitudinal wiring layers but to the transverse wiring layers. The formation of the bridges tends to increase the electrical resistance of the wiring layers. Thus, the bridge structure may preferably be applied to shorter ones of the transverse wiring layers and the longitudinal wiring layers.

As the material for the longitudinal wiring layers 206 and the transverse wiring layers 207, for example, a transparent conducing film such as an indium tin oxide (ITO) may be used. The ITO that has translucency reduces the possibility that the wiring layers will be visually recognized by the user. The transparent conducting film such as an ITO has relatively high electrical resistance and is thus suitable for the application to a small-sized touch screen for which wiring resistance is not a problem. Besides, the transparent conducting film such as ITO is likely to disconnect wiring due to corrosion caused with other metal wiring, so that consideration for humidity resistance and water resistance may become necessary in order to prevent corrosion.

Note that a case has been described above in which the structure of the touch screen and the structure of the display panel are independent of each other, but these structures may be inseparably integrated together. For example, in the case of a so-called on-cell touch panel, the touch screen is directly formed on the substrate of the display panel 300 (typically, a color filter substrate) without using the substrate 201. In the case of a so-called in-cell touch panel, a touch screen is formed between the two transparent insulating substrates (not shown) of the display panel 300.

<Pressure Sensitive Sensor>

The pressure sensitive sensors 216 shown in FIG. 1 will be described. In general, the pressure sensitive sensors 216 may adopt a system such as a system for detecting pressure applied to a diaphragm of semiconductor silicon (Si) as film deformation, an electrostatic capacitive system for detecting deformation of, for example, a display panel or a touch panel caused in response to the pressure applied as a change in electrostatic capacitance, or a resistance system for detecting a change in the resistance of metal lines due to distortion caused in response to the pressure applied.

In the case of the electrostatic capacitive system, for example, the pressure sensitive sensors 216 may be provided at four positions symmetrical with respect to diagonal lines on the surface of the display panel 300 opposite to the display surface. In this case, when the operation screen of the tactile presentation touch display 1 is depressed by the tactile presentation knob 3, the pressure applied may cause the tactile presentation touch display 1 to become deformed in a direction opposite to the operation screen or to slightly move in a direction opposite to the operation screen. The pressure sensitive sensors 216 sense the pressure applied, by detecting a change in capacitance that is caused by a reduction in the intervals of capacitance detection electrodes arranged in the pressure sensitive sensors 216. The capacitance detection electrodes in the pressure sensitive sensors 216 are located parallel to the operation screen of the tactile presentation touch display 1 and are arranged at arbitrary intervals.

In the case of the electrostatic capacitive system as well, the pressure applied is sensed by detecting a change in the shape of any member of the tactile presentation touch display 1 caused by the pressure applied.

While the pressure sensitive sensors 216 are arranged on the back side of the display panel 300 (on the side opposite to the display surface) in FIG. 1, the configuration is not limited to this example. In the structure of the tactile presentation touch display 1, the pressure sensitive sensors 216 may be arranged at such positions at which the reproducibility of the relationship between a change in shape and the pressure applied is enhanced, a considerable change is made in shape by the pressure applied, and the pressure sensitive sensors 216 have highest sensitivity. Instead of the pressure sensitive sensors 216, for example, sheet-like pressure sensors may be arranged in a matrix on the back side of the display panel 300. The configuration is not limited to these examples, and pressure sensors adopting a system optimum for detection may be arranged.

The number of pressure sensitive sensors 216 and the positions in the arrangement of the pressure sensitive sensors 216 are not limited to the above examples, and a configuration is also possible in which a larger number of pressure sensitive sensors 216 are equally arranged in the display area, and the amount of pressure is detected with higher sensitivity and higher precision so as to calculate the distribution of the amounts of pressure in a display area 301. In this case, it is also possible to detect loads on the tactile presentation knob 3 to calculate the position of the tactile presentation knob 3.

The places where the pressure sensitive sensors 216 are arranged are not limited to the back side of the display panel 300. For example, in the case where the outer periphery of the tactile presentation touch display 1 is fixedly attached to a casing, the pressure sensitive sensors may be arranged below a black-framed printing portion 302, which is the outer periphery of the back side of the tactile presentation panel 100, so as to detect deformation of the tactile presentation touch display 1. In the case where pressure sensitive elements are configured by a transparent conducting film, it is also possible to arrange the pressure sensitive elements in a matrix into an integrated structure in any structure of the tactile presentation panel 100, the touch panel 200, and the display panel 300.

<Tactile Presentation Panel>

Figure 12:
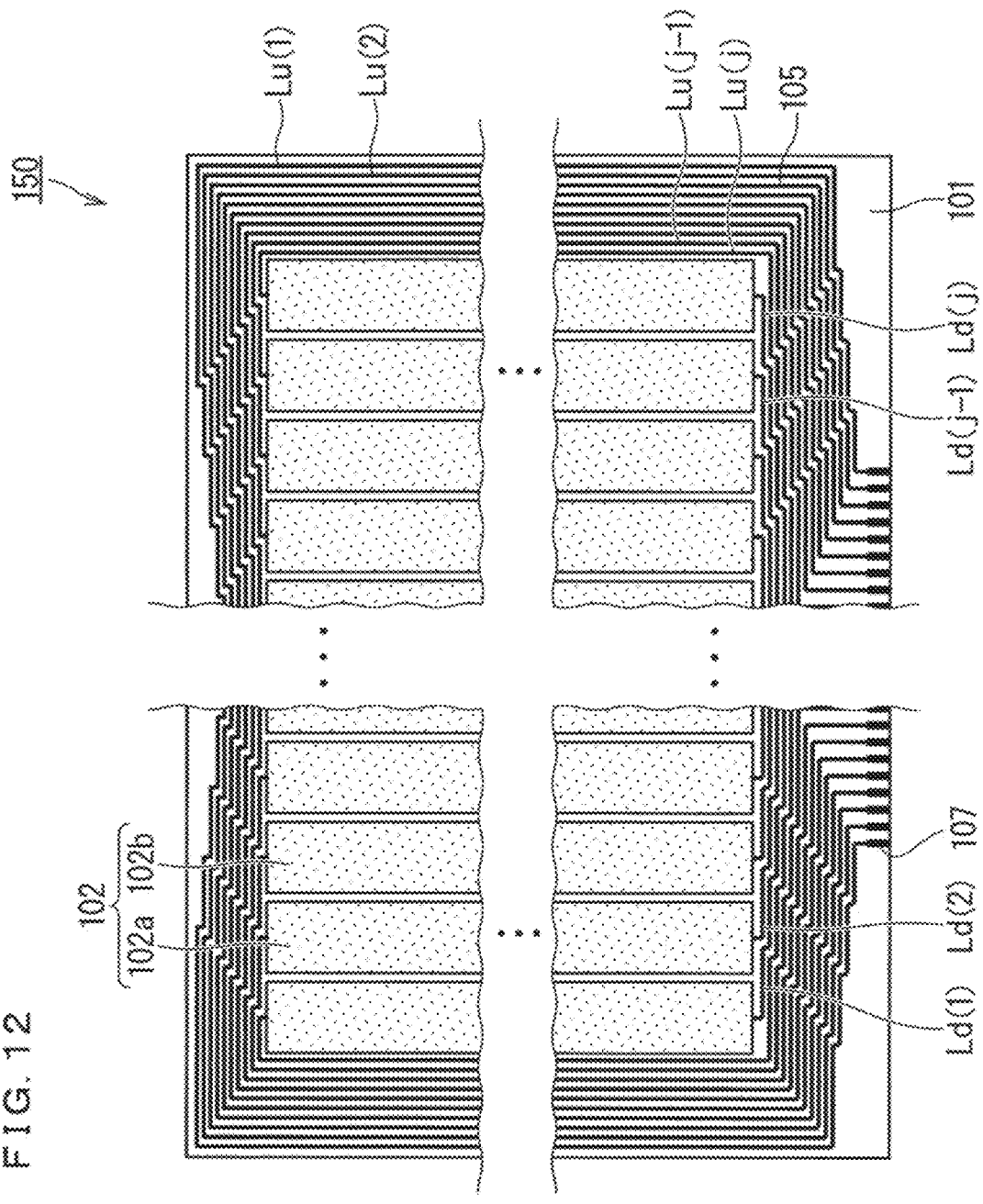
FIG. 12 is a plan view diagrammatically showing a configuration of a tactile presentation screen shown in FIG. 2.
Figure 13:
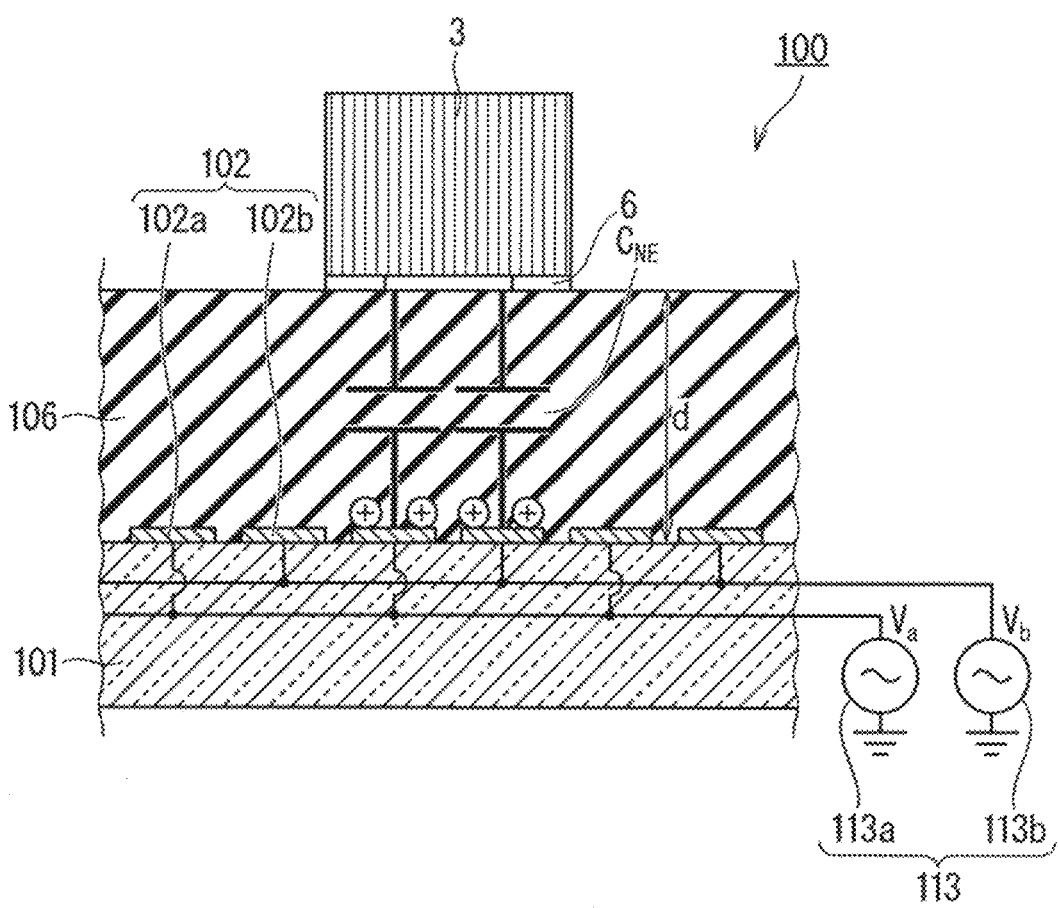
FIG. 13 is a schematic diagram for describing electrostatic capacitance formed between an indicator and the tactile electrodes of the tactile presentation panel shown in FIG. 2.

FIG. 12 is a plan view diagrammatically showing a configuration of the tactile presentation screen 150. FIG. 13 is a schematic diagram for describing the formation of the electrostatic capacitance $C_{NE}$ between the tactile electrodes 102 and the tactile presentation knob 3.

As described above, the tactile presentation screen 150 includes the transparent insulating substrate 101, the tactile electrodes 102, and the dielectric layer 106. Tactile-presentation-panel terminal areas 107 are further provided in the end portion of the transparent insulating substrate 101, and a plurality of lead wiring layers 105 are arranged on the transparent insulating substrate 101. The dielectric layer 106 is provided so as to expose the tactile-presentation-panel terminal areas 107. The tactile electrodes 102 are connected to the tactile-presentation-panel terminal areas 107 via the lead wiring layers 105. The tactile-presentation-panel terminal areas 107 are connected to the voltage supply circuit 110 (see FIG. 2) via the FPC 108 (see FIG. 1). Note that details about the lead wiring layers 105 will be described later.

Each of the tactile electrodes 102 extends in the direction of extension (in the longitudinal direction in FIG. 12). The plurality of tactile electrodes 102 are aligned at intervals in the direction of alignment (in the lateral direction in FIG. 12). In the example shown in FIG. 12, the transparent insulating substrate 101 has a rectangular shape having long sides and short sides. Thus, the tactile presentation screen 150 also has long sides and short sides corresponding to the transparent insulating substrate 101.

A stronger tactile sense can be presented as the electrostatic capacitance $C_{NE}$ formed between the tactile electrodes 102 and the tactile presentation knob 3 increases. From this viewpoint, the area of the tactile electrodes 102 may preferably be large. In the case where priority is given to the dimension of the area of the tactile electrodes 102, it is difficult to make the tactile electrodes 102 less visually recognizable by adding a fine structure to the tactile electrodes 102. In order to make the tactile electrodes 102 less visually recognizable while increasing the area of the tactile electrodes 102, the tactile electrodes 102 may be formed of a transparent conducting film. A typical material for the transparent conducting film is ITO. The transparent conducting film such as ITO has relatively higher electrical resistance than metal and is thus suitable for the application to a small-sized touch screen for which wiring resistance is not a problem. In the case where the application to a large-sized touch screen for which wiring resistance poses a problem is necessary, either the film thickness of ITO is increased or the content of a dopant is increased to reduce resistivity. In this case, the touch screen may look colored due to a change in light absorptance of ITO, so that it may become necessary to, for example, adjust toning of the display. The transparent conducting film such as ITO is also likely to disconnect wiring due to on corrosion with other metal wiring. Thus, in the case where the electrodes are made to have low wiring resistance by using a laminated structure with other metal, wiring consideration for humidity resistance and water resistance becomes necessary in order to prevent corrosion.

Instead of using the transparent conducting film as described above, the tactile electrodes 102 may be such electrodes that have a multilayer structure including a single layer film of metal, a multilayer film of metal, or either of them and using also other conductive materials (the electrodes are hereinafter also referred to as the "metal film-containing electrodes"). For example, the metal may preferably be low-resistance metal such as aluminum or silver. Using the metal film-containing electrodes reduces wiring resistance. Meanwhile, the metal film is opaque and is thus visually recognizable with ease. Thus, in order to make the metal film less visually recognizable, a fine-line structure may be added to the metal film-containing electrodes. A typical fine-line structure may have a mesh shape.

The dielectric layer 106 is formed of a single layer film of an organic insulator film, a single layer film of an inorganic insulator film, or a multilayer film. In the case of a multilayer film, organic insulator films of different types may be laminated one above another, or inorganic insulator films of different types may be laminated one above another, or an organic insulator film and an inorganic insulator film may be laminated one above another. The inorganic insulator film has high moisture impermeability, high hardness, and high wear resistance. Since the tactile presentation knob 3 rotates on the dielectric layer 106, the dielectric layer 106 is required to have high wear resistance. The organic insulator film is preferably for attaining a high degree of flatness, but has low hardness and low wear resistance. Thus, in order to attain both of the high degree of flatness and high wear resistance, it is preferable to form the inorganic insulator film on the organic insulator film. Examples of the inorganic insulator film include transparent silicon-based inorganic insulator films such as a silicon oxide film, a silicon nitride film, or a silicon oxy-nitride film and transparent inorganic insulator films formed of metal oxides such as alumina. As the material for the organic insulator film, a polymeric material may be used that has a main chain formed of a silicon oxide, a silicon nitride film, or a silicon oxy-nitride film and uses organic substances coupled to a side chain or a functional group, or a thermosetting resin may be used that has a main chain formed of carbon. Examples of the thermosetting resin include an acrylic resin, a polyimide resins, an epoxy resin, an novolac resin, and an olefin resin.

The electrostatic capacitance $C_{NE}$ is expressed by Expression (1) below.

$$C_{NE} = Q/V = \varepsilon S/d \qquad (1)$$

Here, Q represents the amount of charge stored in the conductive elastic portion 6 and each of the tactile electrodes 102, V represents the voltage between the tactile presentation knob 3 and the tactile electrodes 102, ε represents the dielectric constant of the dielectric layer 106, S represents the area of contact between the conductive elastic portion 6 and the tactile electrodes 102 via the dielectric layer 106, and d represents the thickness of the dielectric layer 106. The electrostatic capacitance $C_{NE}$ is proportional to the dielectric constant ε and inversely proportional to the thickness d.

It is found from Expression (1) above that the dielectric constant ε may preferably be higher in order to increase the electrostatic capacitance $C_{NE}$. Specifically, the dielectric layer 106 may preferably include a film having a relative dielectric constant of 10 or higher (the film is hereinafter also referred to as the "high dielectric-constant insulator film"). In the high dielectric-constant insulator film, a situation occurs in which positive and negative charges are displaced within the material due to an electric field applied from the outside (this situation is generally called "dielectric polarization"). The dielectric polarization is such that charges induced by polarization (generally called "polarization charges") are maintained while the voltage is held; when the voltage drops, the polarization charges decreases and the dielectric polarization is lessened; and when the applied voltage becomes zero volts, the dielectric polarization disappears. The direction of the dielectric polarization can be changed by the electric field. The high dielectric-constant insulator film may be used as a single layer, or may be used as a multilayer film by stacking using an inorganic or organic insulator film with a different low dielectric constant, or any other high dielectric-constant insulator film. In general, the refractive index increases as the dielectric constant increases. Thus, a laminated structure of a high refractive-index film and a low refractive-index film may be obtained by stacking the high dielectric-constant insulator film and the low dielectric constant insulator film one above the other. The dielectric layer 106 with this laminated structure can also function as an anti-reflection film.

It is also found from Expression (1) above that the thickness d may preferably be small in order to increase the electrostatic capacitance $C_{NE}$. By stacking the high dielectric-constant insulator film and the organic insulator film one above the other, it is possible to reduce the film thickness of the organic insulator film while ensuring sufficient insulation. This makes it possible to reduce the thickness d of the dielectric layer 106.

If the tactile electrodes have a matrix structure (i.e., a structure that includes X electrodes and Y electrodes that intersect with each other) (see, for example, Japanese Patent Application Laid-Open No. 2015-097076), step heights, i.e., projections and depressions, are formed at the intersections of the X electrodes and the Y electrodes. These projections and depressions are flattened if the insulating layer covering them has a large thickness, there is a limit to increasing the thickness of the insulating layer in order to avoid an excessive reduction in the electrostatic capacitance $C_{NE}$. Thus, projections and depressions may be formed on the front surface of the tactile presentation screen. If a sense of texture of these projections and depressions is mixed with a sense of texture generated by the electrostatic force from the tactile electrodes, it becomes difficult to give an intended sense of texture to the user. In the case where an organic insulator film having an effect of flattening a surface shape is used as the dielectric layer 106, the aforementioned formation of the projections and depressions may be avoided, but a reduction in the electrostatic capacitance $C_{NE}$ is unavoidable because a certain degree of thickness is required to flatten the surface.

In contrast, according to Embodiment 1 of the present disclosure, the tactile electrodes 102 have no intersections. Thus, the size of the projections and depressions can be reduced to approximately the thickness of the tactile electrodes 102. This allows a reduction in the thickness of the organic film having an flattening effect or the application of the high dielectric-constant insulator film having a low flattening effect. Accordingly, it is possible to increase the electrostatic capacitance $C_{NE}$ as compared with the case of using a matrix structure. Since there are a small number of projections and depressions on the surface of contact between the tactile presentation screen 150 and the tactile presentation knob 3, a tactile sense arising from the projections and depressions on the tactile presentation screen 150 is not given to the tactile presentation knob 3 when no voltage signals are applied. Therefore, a tactile sense of the tactile presentation knob 3 becomes more clear when the voltage signals are applied.

Even in the case where the electrostatic capacitance $C_{NE}$ is the same, if the tactile presentation knob 3 is easy to slide on the dielectric layer 106, a change in the electrostatic force between the tactile presentation knob 3 and the tactile electrodes 102 is more likely to be perceived as a change in frictional force by the user. Accordingly, it is possible to give a stronger tactile sense to the user. In order to make the tactile presentation knob 3 easy to slide on the dielectric layer 106, it is necessary to reduce adhesion between the dielectric layer 106 and the tactile presentation knob 3. Thus, for example, a film that has higher water repellency than the inside of the dielectric layer 106 may be provided on the outermost surface of the dielectric layer 106, on the surface of contact of the conductive elastic portion 6 with the dielectric layer 106, or on both of the aforementioned surfaces.

<Structure of Tactile Presentation Knob>

Figure 14:
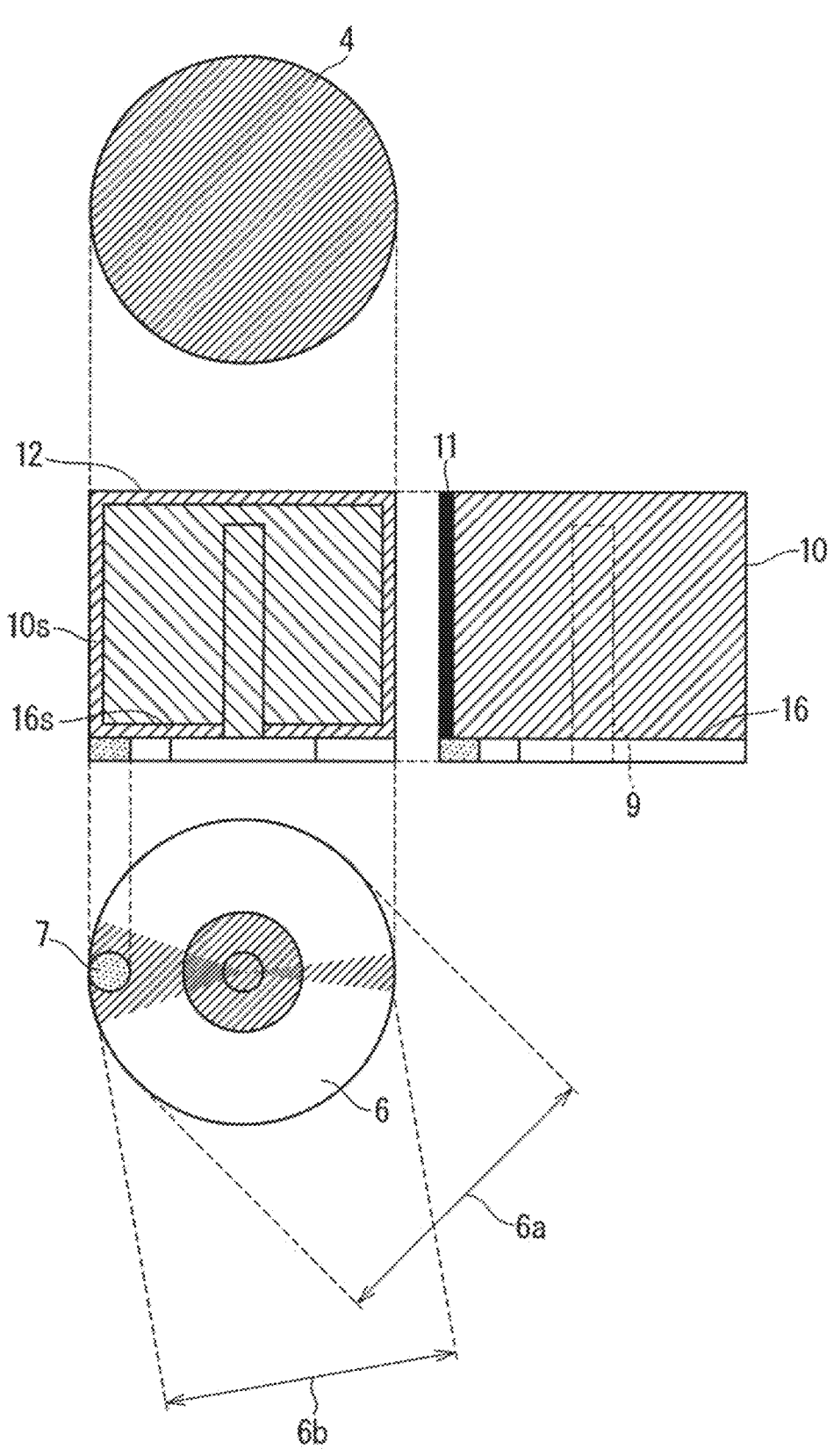
FIG. 14 is a schematic diagram showing a configuration of a rotator of the tactile presentation knob according to Embodiment 1.
Figure 15:
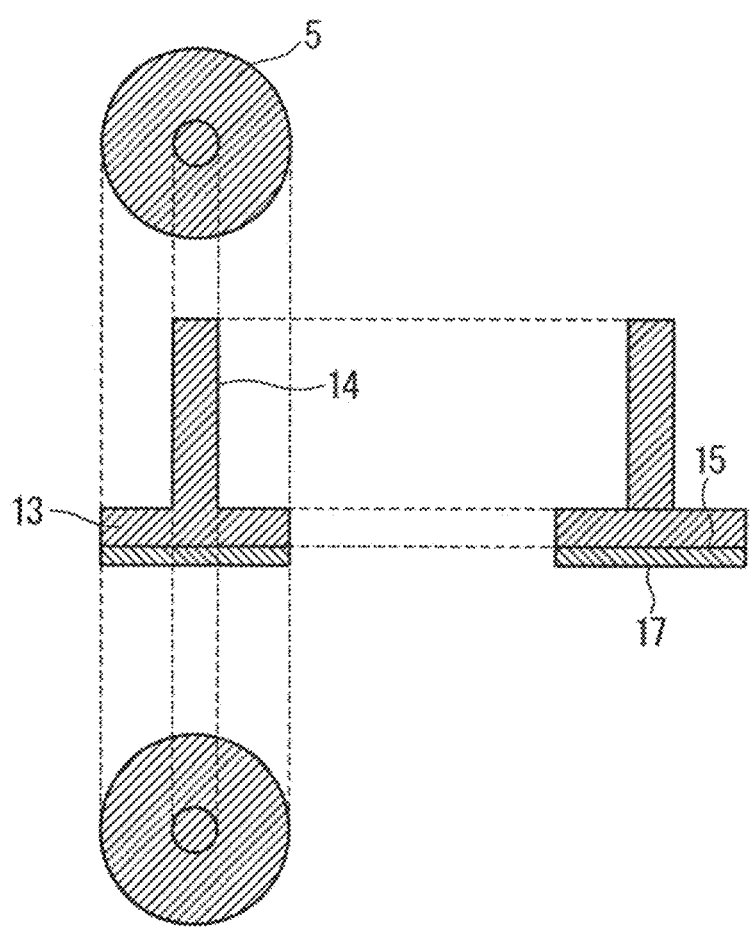
FIG. 15 is a schematic diagram showing a configuration of a fixed portion when the tactile presentation knob is fixedly placed at one position according to Embodiment 1.
Figure 16:
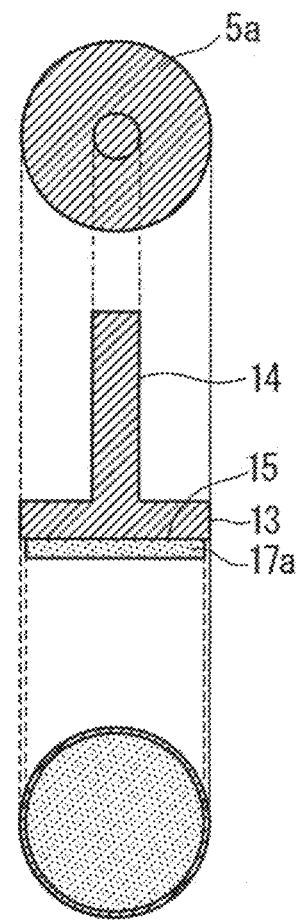
FIG. 16 is a schematic diagram showing a configuration of a rotating shaft structure when the position for placing the tactile presentation knob is displaced according to Embodiment 1.

FIG. 14 is a schematic diagram showing one example of the structure of an operation part 4 of the tactile presentation knob 3. FIG. 15 is a schematic diagram of a fixed portion 5 when the operation part 4 is placed and rotated on the contact surface of the tactile presentation panel 100 in the case where the position for placing the tactile presentation knob 3 is fixed at one position. FIG. 16 is a schematic diagram of a rotational shaft 5a that suppresses horizontal displacement when the operation part 4 of the tactile presentation knob 3 is placed and rotated on the contact surface of the tactile presentation panel 100. The operation part 4 and the fixed portion 5 (or the rotational shaft 5a) are both formed of metal and resin, examples of the metal including aluminum, SUS, and copper, examples of the resin including polyvinyl chloride, polystyrene, ABS resins, AS resins, acrylic resins, polyethylene, polypropylene, polyvinyl alcohol, polyvinylidene chloride, polyethylene terephthalate, polycarbonate, denatured polyphenylene ether, polyamide, polybutylene terephthalate, polyacetals, ultrahigh-molecular-weight polyethylene, polyalylate, polysulfone, polyether sulfone, polyamide-imide, polyether imide, thermoplasticitic polyimide, polyphenylene sulfide, liquid crystalline polymer, polyetheretherketone, and fluororesin. Since an operating feel and a tactile sense change depending on the weight of the tactile presentation knob 3, the material is selected according to, for example, user preferences, service conditions of the tactile presentation knob 3, and intended use. A rotator side face 10 needs to be electrically connected to the conductive elastic portion 6 and an indicator 2 (see FIG. 20). Thus, a surface portion 10s and a boundary conductor 16s of the rotator side face 10 that come in contact with the indicator 2 of the rotator side face 10 is formed of metal or a conductive resin material (desirably having a resistance of $10^3\Omega$ or less). It is desirable that the resistance values of the surface portion 10s and the boundary conductor 16s are set to be such values at which capacitance C formed between the tactile electrodes 2 and the conductive elastic portion 6 becomes the largest in an RC circuit formed among the wiring resistance of the tactile electrodes 102, the resistance of the conductive elastic portion 6, and the dielectric layer 106.

The tactile presentation knob 3 has a cylindrical shape that is the same as the shape of a shaft 14 and the shape of a hole portion of a fixed hole 9. The tactile presentation knob 3 is formed in one piece by inserting the shaft 14 of the fixed portion 5 (or the rotational shaft 5a) into the fixed hole 9 of the rotator. For example, as shown in FIGS. 14 and 15, the operation part 4 and the shaft 14 can be formed not to be separated from each other by fitting the shaft 14 formed with projections and depressions in the fixed hole 9. The interstices between the shaft 14 and the fixed hole 9 are desirably as narrow as possible within such a range that allows the operation part 4 to rotate smoothly. The narrow interstices between the shaft 14 and the fixed hole 9 reduce movement of the rotary shaft when the tactile presentation knob 3 is rotated, reduce the possibility that the indicator 2 is given different tactile senses, such as swinging and vibrations of the operation part 4 caused by movement of the rotational shaft, that are not supposed to be originally given to the tactile presentation knob 3, and allows a more clear tactile sense to be given to the user. In order to allow the operation part 4 to rotate smoothly, it is desirable that the surface of the shaft 14 and the surface of the inner portion of the fixed hole 9 have as small projections and depressions as possible and both have surface roughness Ra of 0.5 μm or less. An inner diameter tolerance of the fixed hole 9 is desirably in the range of 0 mm to +0.5 mm, and an outer diameter tolerance of the shaft 14 is desirably −0.0005 mm.

The fixed portion 5 (or the rotational shaft 5a) is a portion that serves as a rotation axis (central axis) when the operation part 4 rotates, and serves to hold the operation screen of the tactile presentation panel 100 and the rotary shaft of the operation part 4 in a vertical position. Thus, the center of the shaft 14 of the fixed portion 5 (or the rotational shaft 5a) is orthogonal to a bottom surface portion 15 and an adhesive portion 17 (or a shaft-structure holder 17a), the adhesive portion 17 (or the shaft structure holder 17a) has a flat bottom surface, and the adhesive portion 17 (or the shaft structure holder 17a) and the surface of contact of the conductive elastic portion 6 with the tactile presentation panel 100 are located in the same plane. While FIG. 15 shows a case in which the adhesive portion 17 and a fixed way 13 have the same diameter, the shaft structure holder 17a and the fixed way 13 may have different diameters as shown in FIG. 16. The presence of the fixed portion 5 stabilizes the rotary shaft during operation of the tactile presentation knob 3 and allows the generation of a more clear tactile sense.

The boundary conductor 16s and the surface portion 10s of the rotator side face 10 and the that come in contact with the indicator 2 when the operation part 4 is rotated are formed of a conductive material and also electrically connected to the conductive elastic portion 6 and a position detector 7. The presence or absence of contact with the surface of the operation part 4 by the user is sensed so as to suppress accumulation of charge in the conductive elastic portion 6. The surface portion 10s and the boundary conductor 16s are formed of a material similar to the material for the conductive elastic portion 6. In particular, the material may desirably be low-resistance metal. The surface portion 10s and the boundary conductor 16s may be formed by coating with metal plating or the like after the operation part 4 is formed of resin or the like. Details thereon will be described later.

The conductive elastic portion 6 is a conductor that forms electrostatic capacitance with the tactile electrodes 102. The conductive elastic portion 6 is divided into two or more portions and prevents a reduction in tactile strength. Details about this effect will be described later. Elasticity of the conductive elastic portion 6 brings about the effect of suppressing a reduction in tactile strength due to deterioration of adhesion. If the adhesion between the conductive elastic portion 6 and the surface of the tactile presentation panel decreases due to, for example, a reduction in the degree of flatness of the surface of the tactile presentation panel 100 and microscopic asperities on the surface of the tactile presentation panel 100, which may come from the accuracy of finishing of the operation part 4 and the fixed portion 5 (or the rotational shaft Sa) and the accuracy of assembly of the tactile presentation screen 150, the tactile electrodes 2 and the conductive elastic portion 6 will form electrostatic capacitance not only via the dielectric layer 106 but also via air with a small dielectric constant. This reduces the electrostatic capacitance formed between the tactile electrodes 102 and the conductive elastic portion 6 and results in a reduction in tactile strength. The elasticity of the conductive elastic portion 6 fills the interstices between the dielectric layer 106 and the conductive elastic portion 6, which are produced by the asperities on the surface of the tactile presentation panel 100, and thereby prevents a reduction in tactile strength due to deterioration of the adhesion between the conductive elastic portion 6 and the tactile presentation panel 100.

The material used for the conductive elastic portion 6 may be an elastic resin material called conductive rubber that uses a thermosetting elastomer or a thermoplastic elastomer as a base material and mixes the base material with a conductive substance such as conductive carbon black or metal powder, examples of the thermosetting elastomer including natural rubber (NR), isoprene rubber (IR), styrene-butadiene rubber (SBR), chloroprene rubber (CR), acrylonitrile rubber (NBR), hydrogenated nitrile rubber (HNBR), butyl rubber (IIR), ethylene propylene rubber (EPDM), chlorosulfonic polyethylene rubber (CSM), silicone rubber (VMQ), fluor rubber (FKM), fluor silicone rubber (FVMQ), acrylic rubber (ACM), and urethane rubber (U), examples of the thermoplastic elastomer including polyurethane series (TPU), polystyrene series (TPS), olefin/alkene series (TPO), polyvinyl chloride series (T polyvinyl chloride), polyester series (TPEE), and polyamide series (TPAE). As the conductive substance, carbon nanotube (CNT) may also be used.

The volume specific resistance may be less than or equal to $10^6$ Ωcm, and the accumulation of charge in the conductive elastic portion 6 becomes more difficult with smaller volume specific resistance. Details about the accumulation of charge in the conductive elastic portion 6 will be described later. Since the tactile electrodes 102 and the electrostatic capacitance are formed, compressive resistance may desirably be as high as possible in terms of improving the longevity and reliability of the conductive elastic portion 6. The position detector 7 forms the electrostatic capacitance with the detection electrodes 203 of the touch screen 250 and uses the electrostatic capacitance for detection of the position of the tactile presentation knob 3 and the amount of rotation thereof.

The material for forming the position detector 7 may be a conductor that is capable of forming the electrostatic capacitance with the detection electrodes 203, has elasticity similar to th elasticity of the conductive elastic portion 6, and uses, as a base material, the same material as the base material for the conductive elastic portion 6. Higher adhesion to the tactile presentation panel 100 causes less differences between the design value and the actual electrostatic capacitance value and achieves stable position detection accuracy.

When the conductive elastic portion 6 and the position detector 7 are made to have the same thickness in order to have intimate contact with the surface of the tactile presentation panel 100 without any interstices, strong tactile strength and highly accurate position detection are achieved. Flatness of the surface of contact between the tactile presentation panel 100 and each of the conductive elastic portion 6 and the position detector 7 (a difference between maximum and minimum measured values of a distance from a certain reference surface) may desirably be less than or equal to 0.5 mm. It is said that the diameter of the contact area of a person's finger with the touch surface during operation of the touch panel is 3 mm in the case of children and a maximum of approximately 7 mm to 10 mm in the case of adults, and it is also said that the contact areas of fingers during various touch operations are generally in the range of 20 mm² to 400 mm². Therefore, the area of the position detector 7 can be considered to be within the range of greater than or equal to 7 mm² and less than or equal to 400 mm².

<Detailed Configuration of Tactile Presentation Touch Panel>

FIG. 17 is a block diagram diagrammatically showing a configuration of the tactile presentation touch panel 400. It is assumed here that excitation electrodes Ty(1) to Ty(m) are provided as the plurality of excitation electrodes 202, detection electrodes Tx(1) to Tx(n) are provided as the plurality of detection electrodes 203, and tactile electrodes H(1) to H(j) are provided as the plurality of tactile electrodes 102. The tactile electrodes H(1) to H(j) are aligned in order of number inside the parentheses, the odd-numbered tactile electrodes 102 corresponding to the first electrodes 102a, the even-numbered tactile electrodes 102 corresponding to the second electrodes 102b. To simplify description, it is assumed that one longitudinal wiring layer 206 (see FIG. 8 or 10) is configured by one excitation electrode 202, and one transverse wiring layer 207 (see FIG. 8 or 10) is configured by one detection electrode 203.

As described above, the tactile presentation touch panel 400 includes the touch panel 200 and the tactile presentation panel 100. The touch panel 200 includes the touch screen 250 and the touch detection circuit 210. The tactile presentation panel 100 includes the tactile presentation screen 150 and the voltage supply circuit 110.

The touch detection circuit 210 includes an excitation-pulse generation circuit 215, a charge detection circuit 212, a touched-coordinate calculation circuit 214, and a touch detection control circuit 213. The touch detection control circuit 213 controls operations of the excitation-pulse generation circuit 215, the charge detection circuit 212, and the touched-coordinate calculation circuit 214. The excitation-pulse generation circuit 215 sequentially applies excitation pulse signals to the excitation electrodes Ty(1) to Ty(m). The charge detection circuit 212 measures signals obtained from the detection electrodes Tx(1) to Tx(n). In this way, the charge detection circuit 212 detects the amount of charge for each of the detection electrodes Tx(1) to Tx(n). Information on the result of charge detection indicates a value that corresponds to mutual capacitance between an excitation electrode Ty(k) and each of the detection electrodes Tx(1) to Tx(n) when the excitation pulse signal is applied to the excitation electrode Ty(k), where k is an integral number greater than or equal to 1 and less than or equal to m. Note that the charge detection circuit 212 is capable of recognizing to which of the excitation electrodes Ty(1) to Ty(m) the excitation pulse signal is applied, in accordance with the control signal received from the touch detection control circuit 213. The touched-coordinate calculation circuit 214 obtains, on the basis of the above result of charge detection, data on the coordinates touched by the indicator 2 (hereinafter, also referred to as the "touched-coordinate data").

The touched-coordinate data is output to a knob-displacement calculation circuit 220 and is also output to a tactile-generating-condition conversion circuit 120 and a tactile presentation control circuit 114 (tactile presentation circuit) as touch-operation information. The knob-displacement calculation circuit 220 outputs, as the amount of displacement of the knob, information on a rotation angle, a rotation speed, and a horizontal displacement distance to the tactile-generating-condition conversion circuit 120 (tactile-strength calculation circuit) and a display-screen processing circuit 321. The tactile-generating-condition conversion circuit 120 outputs electrical signal conditions that achieve tactile strength (strength of an operating feel) calculated based on the input information to the tactile presentation control circuit 114.

The voltage supply circuit 110 includes a switched circuit 112, a tactile-presentation-voltage generation circuit 113, and a tactile presentation control circuit 114. The tactile-presentation-voltage generation circuit 113 applies the voltage signal $V_a$ to the first electrodes 102a and the voltage signal $V_b$ to the second electrodes 102b among the tactile electrodes H(1) to H(j) via the switched circuit 112. In other words, the voltage signal $V_a$ and the voltage signal $V_b$ are alternately applied to the tactile electrodes H(1) to H(j) aligned in one direction (in the lateral direction in the drawing). The switched circuit 112 switches between the ON-state and the OFF-state in accordance with an instruction received from the tactile-presentation-voltage generation circuit 113. In the ON-state, the switched circuit 112 connects the tactile electrodes 102 to the tactile-presentation-voltage generation circuit 113. In the OFF-state, the switched circuit 112 places the tactile electrodes 102 in a floating state. According to Embodiment 1 of the present disclosure, the switched circuit 112 includes two switches 40. One of the switches performs switching of electrical paths to all of the first electrodes 102*a*, and the other switch 40 performs switching of electrical paths to all of the second electrodes 102*b*. These two switches 40 may be controlled in synchronization with each other. Note that the switches 40 correspond to switching parts.

The tactile presentation control circuit 114 references to the information on tactile strength calculated by the tactile-generating-condition conversion circuit 120. The tactile presentation control circuit 114 may be capable of controlling operations of the tactile-presentation-voltage generation circuit 113 in accordance with this information. That is, the touch detection circuit 210 also functions as a contact detector that detects contact with the tactile presentation knob 3 by the user.

<Operations of Tactile Presentation Touch Panel>

Figure 18:
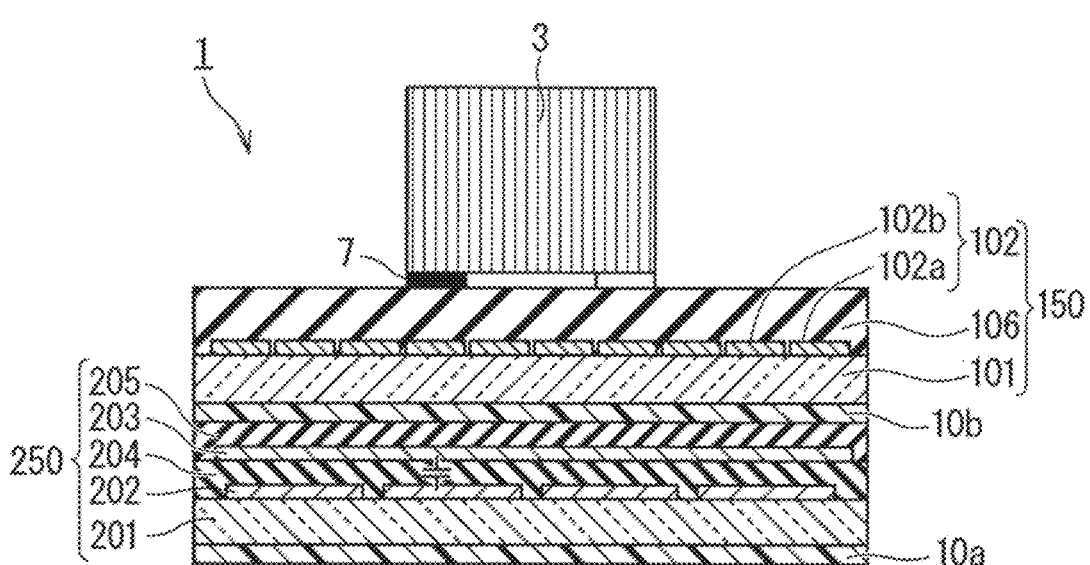
FIG. 18 is a schematic diagram for describing electrostatic capacitance formed in the tactile presentation touch panel when the indicator is not in contact with the tactile presentation knob on the tactile presentation touch panel shown in FIG. 1.

FIG. 18 is a schematic diagram showing an image of the electrostatic capacitance formed between the excitation electrodes 202 and the detection electrodes 203 when the indicator 2 is not in contact with the tactile presentation knob 3. FIG. 19 is a timing chart diagrammatically showing the timing of operations performed by the tactile presentation touch panel 400 (see FIG. 17) when the indicator 2 is not in contact with the tactile presentation knob 3.

When the indicator 2 is not in contact with the tactile presentation knob 3, the conductive elastic portion 6 and the tactile electrodes 102 are both in a floating state and at the same potential as the detection electrodes 203, and the charge detection circuit 212 detects the amount of charge that is mainly the electrostatic capacitance formed between the detection electrodes 203 and the excitation electrodes 202. The touch detection control circuit 213 outputs a control signal of the excitation electrodes 202 also to the tactile-presentation-voltage generation circuit 113.

The tactile-presentation-voltage generation circuit 113 is capable of recognizing a touch detection period P1 on the basis of this control signal. In the touch detection period P1, the tactile-presentation-voltage generation circuit 113 shuts off the switches 40 of the switched circuit 112. This cuts off electrical connection between the tactile-presentation-voltage generation circuit 113 and all of the tactile electrodes 102. As a result, the potentials of all of the tactile electrodes 102 enter a floating state.

In the case where there is a great interelectrode distance between the tactile electrodes 102 and electrostatic capacitance is formed between the detection electrodes 203 and the position detector 7 of the tactile presentation knob 3 via clearance between the tactile electrodes 102, there is no need to bring the tactile electrodes 102 into a floating state, and the tactile electrodes 102 may be fixed at a detected GND or at an arbitrary fixed potential. The potential of the tactile electrodes 102 is selected so as to most facilitate the detection of the amount of charge, which is mainly the electrostatic capacitance formed between the detection electrodes 203 and the excitation electrodes 202.

Next, in a touched-coordinate calculation period P2, the touched-coordinate calculation circuit 214 determines whether the knob is touched by the indicator 2, on the basis of the result of detecting the charge of the mutual capacitance corresponding to each of the excitation electrodes Ty(1) to Ty(m) or, in other words, the result of detecting the charge of the capacitance at every intersection of the excitation electrodes Ty(1) to Ty(m) and the detection electrodes Tx(1) to Tx(n), the result having being input from the charge detection circuit 212 and then held. As a result of the coupling of electric fields between the excitation electrodes 202 and the detection electrodes 203 being alleviated by approach of or contact with the indicator 2 such as a finger, the charged charge of the mutual capacitance decreases. The touched-coordinate calculation circuit 214 is capable of detecting the presence or absence of a touch on the basis of the above degree of decrease. If the touched-coordinate calculation circuit 214 has determined the presence of a touch, the calculation of the touched-coordinate data is started based on the aforementioned result of charge detection. Specifically, the touched-coordinate calculation circuit 214 is capable of calculating the touched-coordinate data by performing computational processing such as barycentric computation on the detection results obtained for the intersection at which the degree of decrease of the charged charge is the largest and for intersections around this intersection. If the touched-coordinate calculation circuit 214 has determined the absence of a touch, the processing returns to the touch detection period P1 without the calculation of the touched-coordinate data. In order to enable such processing, the touched-coordinate calculation circuit 214 gives, to the touch detection control circuit 213, a signal that indicates the result of determining the presence or absence of contact of the indicator 2 with the touch panel surface and the presence or absence of contact with the tactile presentation knob 3. If there is no output of the result of determining the presence of contact of the indicator 2 with the tactile presentation knob 3, the operations in the periods P1 to P3 are repeated.

Here, operations that are performed in the case where there is no output of the result of determining the presence of contact of the indicator 2 with the tactile presentation knob 3 are described below.

Figure 20:
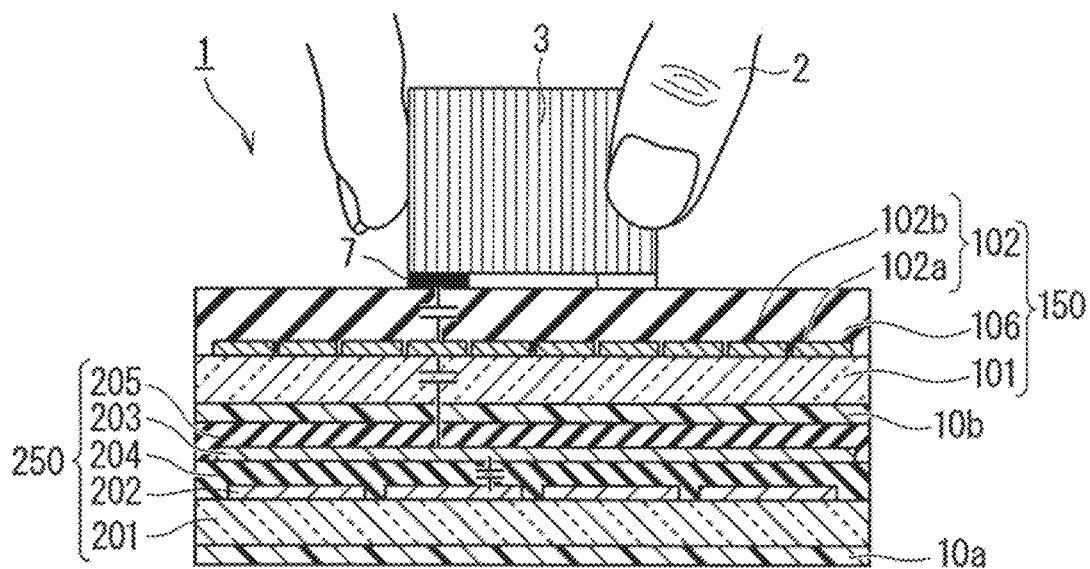
FIG. 20 is a schematic diagram for describing the electrostatic capacitance formed in the tactile presentation touch panel when the indicator is in contact with the tactile presentation knob on the tactile presentation touch panel shown in FIG. 1.

FIG. 20 is a schematic diagram showing an image of the electrostatic capacitance formed between the excitation electrodes 202 and the position detector 7 when the indicator 2 is in contact with the tactile presentation knob 3. FIG. 21 is a timing chart diagrammatically showing the timing of operations performed by the tactile presentation touch panel 400 (see FIG. 17) when the indicator 2 is in contact with the tactile presentation knob 3.

When the indicator 2 is in contact with the tactile presentation knob 3, the conductive elastic portion 6 is connected to the ground via the tactile presentation knob 3 and the indicator 2, and the detection electrodes 203 form electrostatic capacitance with the conductive elastic portion 6 via the tactile electrodes 102, so that the electrostatic capacitance formed between the detection electrodes 203 and the excitation electrodes 202 decrease. As a result, the amount of charge detected by the charge detection circuit 212 decreases, and the contact of the indicator 2 with the tactile presentation knob 3 is sensed.

In the touch detection period P1, the touch detection control circuit 213 outputs a control signal indicating first conversion timing to the excitation-pulse generation circuit 215. Upon receipt of this control signal, the receiver excitation-pulse generation circuit 215 applies an excitation pulse signal (charging pulse signal) to the excitation electrode Ty(1). This results in charging of the interelectrode capacitance (mutual capacitance) between the excitation electrode Ty(1) and each of the detection electrodes Tx(1) to Tx(n) that intersect with the excitation electrode Ty(1) in plan view. The charge detection circuit 212 detects the amount of charge accumulated by the above charging with use of the detection electrodes Tx(1) to Tx(n). Then, the charge detection circuit 212 subjects the detection results to analog/digital conversion (A/D conversion) and outputs digital information obtained by the conversion to the touched-coordinate calculation circuit 214 as the result of detecting the charge of the mutual capacitance corresponding to the excitation electrode Ty(1). Similarly, the touch detection control circuit 213 sequentially outputs, to the excitation-pulse generation circuit 215, control signals that indicate second to m-th conversion timing. With each of the second to m-th conversion timing, the result of detecting the charge of the mutual capacitance corresponding to each of the excitation electrodes Ty(2) to Ty(m) is output to the touched-coordinate calculation circuit 214.

The touch detection control circuit 213 outputs the above-described control signals also to the tactile-presentation-voltage generation circuit 113. In accordance with these control signals, the tactile-presentation-voltage generation circuit 113 can recognize the touch detection period P1. In the touch detection period P1, the tactile-presentation-voltage generation circuit 113 shuts off the switches 40 of the switched circuit 112. This cuts off electrical connection between the tactile-presentation-voltage generation circuit 113 and all of the tactile electrodes 102. As a result, the potentials of all of the tactile electrodes 102 enter a floating state.

Next, in the touched-coordinate calculation period P2, the touched-coordinate calculation circuit 214 determines whether the indicator 2 touches the knob, on the basis of the result of detecting the charge of the mutual capacitance corresponding to each of the excitation electrodes Ty(1) to Ty(m) or, in other words, the result of detecting the charge at every intersection of the excitation electrodes Ty(1) to Ty(m) and the detection electrodes Tx(1) to Tx(n), the result having being input from the charge detection circuit 212 and then held. As a result that the coupling of electric fields between the excitation electrodes 202 and the detection electrodes 203 is alleviated by approach to or contact with the indicator 2 such as a finger, the charged charge of the mutual capacitance decreases. The touched-coordinate calculation circuit 214 is capable of detecting the presence or absence of a touch on the basis of the above degree of decrease. If the touched-coordinate calculation circuit 214 has determined the presence of a touch, the calculation of the touched-coordinate data is started based on the above charge detection result. Specifically, the touched-coordinate calculation circuit 214 is capable of calculating the touched-coordinate data by performing computational processing such as barycenter computation on the detection results obtained for the intersection at which the degree of decrease of the charged charge is the largest and for intersections around this intersection. If the touched-coordinate calculation circuit 214 has determined the absence of a touch, the processing returns to the touch detection period P1 without the calculation of the touched-coordinate data. In order to enable such processing, the touched-coordinate calculation circuit 214 gives a signal indicating the result of determining the presence or absence of a touch to the touch detection control circuit 213.

Next, in a touched-coordinate sending period P3, the touched-coordinate calculation circuit 214 outputs the touched-coordinate data to the knob-displacement calculation circuit 220 in accordance with the timing of sending the touched-coordinate data from the touch detection control circuit 213, and also outputs the touched-coordinate data as touch-operation information to the tactile-generating-condition conversion circuit 120 and the tactile presentation control circuit 114.

Next, in a determination period P4, the tactile presentation control circuit 114 determines the position of the tactile presentation knob 3 from the touched-coordinate data and determines an area for presenting a tactile sense.

The tactile presentation control circuit 114 selects a tactile-presentation signal waveform that corresponds to the coordinates of the display screen and the tactile presentation knob 3 on the basis of input received from the tactile-generating-condition conversion circuit 120. This "tactile-presentation signal waveform" defines the waveform of each of the voltage signal $V_a$ and the voltage signal $V_b$. Note that a difference in waveform between the voltage signal $V_a$ and the voltage signal $V_b$ is typically a difference in frequency. The tactile-presentation signal waveform is set inside or outside the tactile presentation control circuit 114. The tactile-presentation signal waveform may be of one type or may be of two or more types. In the case where there is only one type of tactile-presentation signal waveform, the processing for selecting the tactile-presentation signal waveform is unnecessary. In the case where there are two or more types of tactile-presentation signal waveform, the type of the tactile-presentation signal waveform is selected based on the input received from the tactile-generating-condition conversion circuit 120.

Next, in a tactile-presentation-signal application period P5, the tactile presentation control circuit 114 generates a tactile presentation signal with the above-described tactile-presentation signal waveform. The switch 40 of the switched circuit 112 that is connected to tactile electrodes 102 located in a region that receives input of the tactile presentation signal may be connected to the tactile-presentation-voltage generation circuit 113. The switch 40 that is connected to tactile electrodes 102 located in a region that does not receive input of the tactile presentation signal may be connected to the GND, or those tactile electrodes 102 may be brought into a floating state without turn on of the switch 40. Accordingly, a signal is applied to the tactile electrodes 102 to present a tactile sense. In the example shown in FIG. 21, an alternating-current signal having a high level (H level) and a low level (L level) is applied to the tactile electrodes 102. In the H-level period, the tactile electrodes 102 are charged with a high positive voltage that is typically plus several tens of volts. In the zero-level period, the tactile electrodes 102 are discharged. In the L-level period, the tactile electrodes 102 are charged with a high negative voltage that is typically minus several tens of volts. The cycle and period of generating a pulse signal may be set appropriately based on input received from the tactile-generating-condition conversion circuit 120.

After the tactile-presentation-signal application period P5 described above, the processing returns to the touch detection period P1. In this way, the aforementioned operations are repeated. Accordingly, the tactile presentation touch panel 400 is capable of detecting the position of the tactile presentation knob 3 and presenting a tactile sense corresponding to the display screen and the position of the tactile presentation knob 3.

Figure 22:
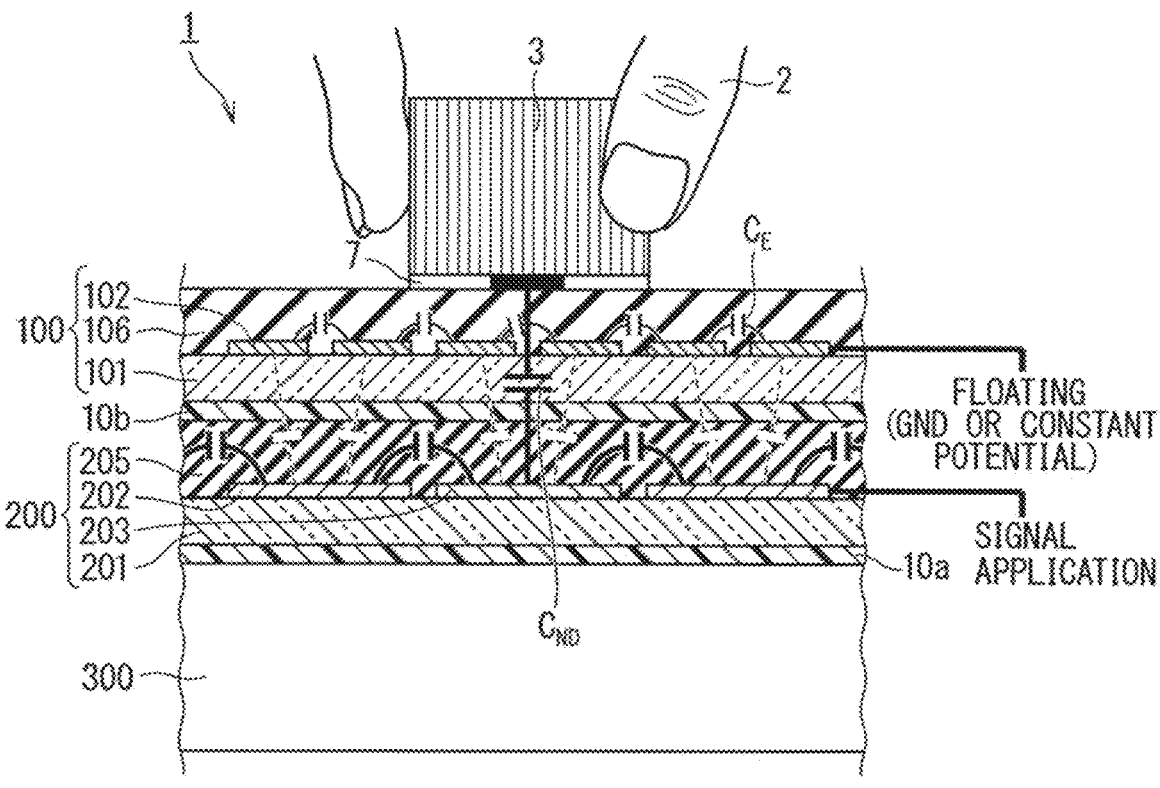
FIG. 22 is a schematic diagram for describing the electrostatic capacitance formed in the tactile presentation touch panel when the tactile presentation touch panel shown in FIG. 1 detects a touched position.

FIG. 22 is a schematic diagram showing the formation of the electrostatic capacitance within the tactile presentation touch display 1 in the touch detection period P1 (see FIG. 21). In the touch detection period P1, capacitance CND is formed between the indicator 2 and the detection electrodes 203. In this period, the potentials of all of the tactile electrodes 102 are brought into a floating state. This avoids a situation in which the tactile electrodes 102 function as shields. Accordingly, it is possible to improve the sensitivity of touch detection.

Figure 23:
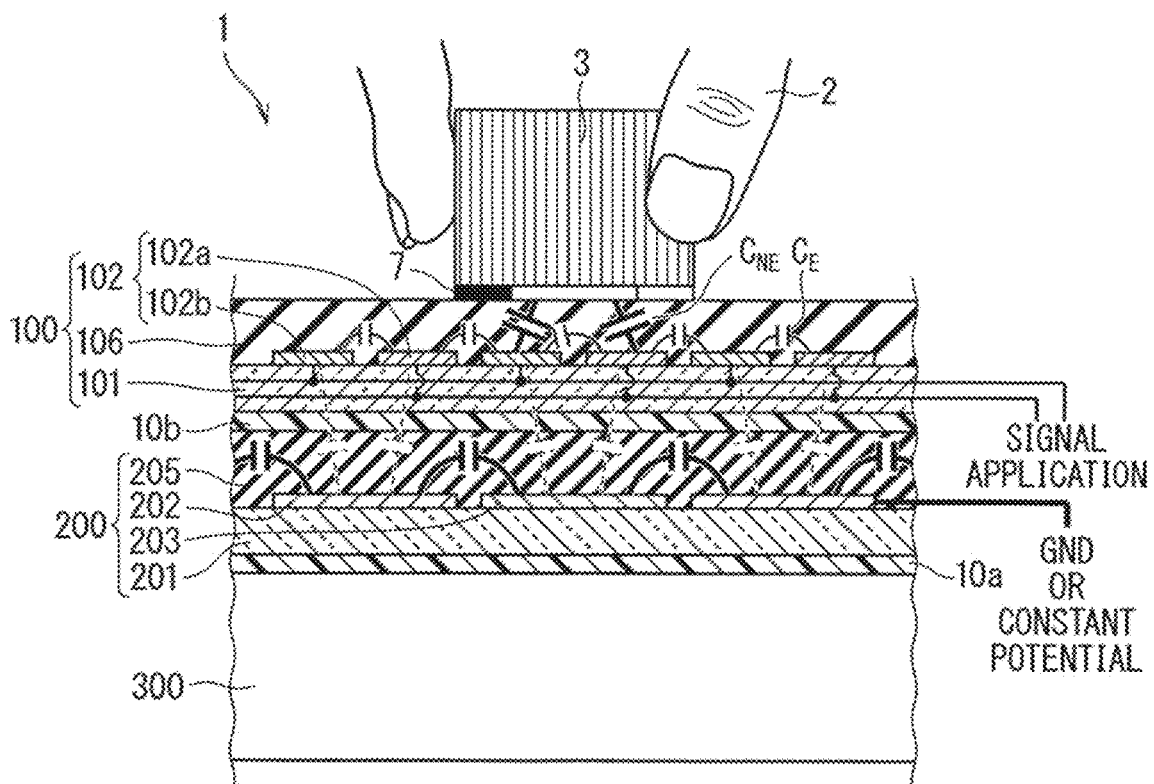
FIG. 23 is a schematic diagram for describing the electrostatic capacitance formed in the tactile presentation touch panel when the tactile presentation touch panel shown in FIG. 1 generates a tactile sense.

FIG. 23 is a schematic diagram showing the formation of the electrostatic capacitance within the tactile presentation touch display 1 in the tactile-presentation-signal application period P5 (see FIG. 21). In the tactile-presentation-signal application period P5, the potentials of the excitation electrodes 202 and the detection electrodes 203 of the touch panel 200 may be brought into a floating state. This reduces the influence of the capacitance formed between the excitation electrodes 202 and the detection electrodes 203 on the electrostatic capacitance $C_{NE}$. Instead of this, the potentials of the excitation electrodes 202 and the detection electrodes 203 of the touch panel 200 may be set substantially at a constant potential and for example, the excitation electrodes 202 and the detection electrodes 203 may be connected at low impedance to a ground potential. This allows the excitation electrodes 202 and the detection electrodes 203 to function as shields between the tactile electrodes 102 and the display panel 300. Accordingly, the generation of noise due to a high voltage signal applied to the tactile electrodes 102 is reduced in the display panel 300. This prevents poor display from occurring due to noise. Furthermore, conversely, it is possible to reduce the occurrence of noise in the tactile electrodes 102 due to the display panel 300. When the tactile presentation signal is applied to the tactile electrodes 102, the conductive elastic portion 6 forms electrostatic capacitance between the tactile electrodes 102 and itself, charge of a potential opposite to the voltage of the tactile electrodes 102 is accumulated on the surface of the conductive elastic portion 6 that is in contact with the dielectric layer 106, and an electrostatic force is produced between the conductive elastic portion 6 and the dielectric layer 106. As a result, a change occurs in the frictional force between the conductive elastic portion 6 and the dielectric layer 106. This change in the frictional force changes the torque of the knob during rotation of the tactile presentation knob 3, and this felt as a tactile sense at the time of rotating the tactile presentation knob 3.

In the case of using a floating state, both of the excitation electrodes 202 and the detection electrodes 203 may be brought into a floating state, or either of them may be brought into a floating state. In the case of using a constant potential, both of the excitation electrodes 202 and the detection electrodes 203 may be set at a constant potential, or either of them may be set at a constant potential. As another alternative, either of the excitation electrodes 202 and the detection electrodes 203 may be brought into a floating state, and the other may be set at a constant potential. In the case where the distance between the tactile electrodes 102 and each of the excitation electrodes 202 and the detection electrodes 203 varies, those of the excitation electrodes 202 and the detection electrodes 203 that are closer to the tactile electrodes 102 may be brought into a floating state, and the others that are farther from the tactile electrodes 102 may be set at a constant potential.

In the example shown in FIG. 17, the touched-coordinate data is transmitted from the touch detection circuit 210 to the voltage supply circuit 110, but as a variation, information about the result of charge detection may be transmitted from the charge detection circuit 212 to the voltage supply circuit 110. In this case, the tactile presentation control circuit 114 determines the presence or absence of a touch and calculates the touched coordinates by using the information about the result of charge detection.

In the case where the position for placing the tactile presentation knob 3 on the tactile presentation panel 100 is changed during or every operation, the bottom surface portion 15 may be fixed with proximate contact on the tactile presentation panel 100. In the case where the position for placing the tactile presentation knob 3 on the tactile presentation panel 100 remains unchanged during or every operation (in the case where the tactile presentation knob 3 is used at a fixed position), the bottom surface portion 15 may be fixedly attached with the adhesive portion 17 on the tactile presentation panel 100.

Figure 24:
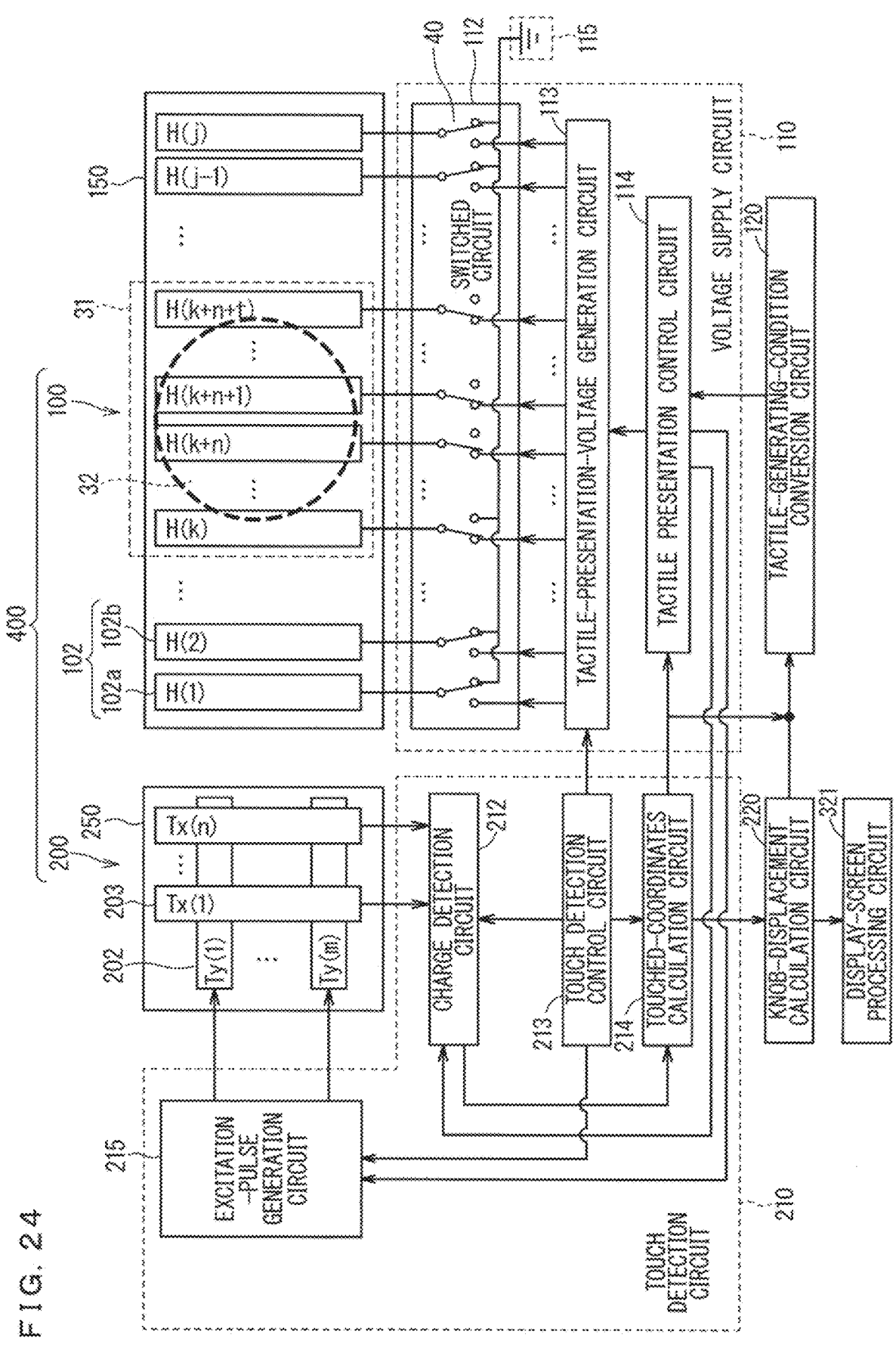
FIG. 24 is a block diagram diagrammatically showing a configuration of the tactile presentation touch panel when the tactile presentation knob connects, to the ground, some tactile electrodes that are in contact with the tactile presentation touch panel via a dielectric layer during the application of a signal voltage according to Embodiment 1.

FIG. 24 is a block diagram showing a configuration for the case where at least one of the two or more sub-portions that divide the conductive elastic portion 6 forms electrostatic capacitance with the tactile electrodes 102, and the tactile electrodes 102 are driven such that the at least one is connected via the dielectric layer 106 with the tactile electrodes 102 that are connected to the ground. In the determination period P4 (see FIG. 21), the tactile presentation control circuit 114 determines the position at which the tactile presentation knob 3 is placed from the touched-coordinate data, determines the area for presenting a tactile sense, divides the determined area into two or more areas, and determines a region for inputting the tactile presentation signal and a region connected to the GND.

The tactile presentation control circuit 114 selects the tactile-presentation signal waveform corresponding to the coordinates of the display screen and the tactile presentation knob 3 in accordance with input from the tactile-generating-condition conversion circuit 120. This "tactile-presentation signal waveform" defines the waveform of each of the voltage signal $V_a$ and the voltage signal $V_b$. Note that a difference in waveform between the voltage signal $V_a$ and the voltage signal $V_b$ is typically a difference in frequency. The tactile-presentation signal waveform is set inside or outside the tactile presentation control circuit 114. The tactile-presentation signal waveform may be of one type, or may be of two or more types. In the case where there is only one type of tactile-presentation signal waveform, the processing for selecting the tactile-presentation signal waveform is unnecessary. In the case where there are two or more types of tactile-presentation signal waveform, the type of the tactile-presentation signal waveform is selected based on input received from the tactile-generating-condition conversion circuit 120.

Next, in the tactile-presentation-signal application period P5 (see FIG. 21), the tactile presentation control circuit 114 generates a tactile presentation signal with the above-described tactile-presentation signal waveform. The switch 40 of the switched circuit 112 that is connected to tactile electrodes 102 located in a region that receives input of the tactile presentation signal is connected to the tactile-presentation-voltage generation circuit 113, and the switch 40 that is connected to tactile electrodes 102 located in a region connected to the GND is connected to the GND. The switch 40 that is connected to tactile electrodes 102 located in a region that does not receive input of the tactile presentation signal may be connected to the GND, or those tactile electrodes 102 may be brought into a floating state without turn-on of the switch 40. According, a signal is applied to the tactile electrodes 102 to present a tactile sense. In the example shown in FIG. 24, an alternating-current signal having a high level (H level) and a low level (L level) is applied to the tactile electrodes 102. In the H-level period, the tactile electrodes 102 are charged with a high positive voltage that is typically plus several tens of volts. In the zero-level period, the tactile electrodes 102 are discharged.

In the L-level period, the tactile electrodes 102 are charged with a high negative voltage that is typically minus several tens of volts. The cycle and period of generating a pulse signal may be set appropriately based on input received from the tactile-generating-condition conversion circuit 120.

After the tactile-presentation-signal application period P5 described above, the processing returns to the touch detection period P1. In this way, the aforementioned operations are repeated. Accordingly, the tactile presentation touch panel 400 is capable of detecting the position of the tactile presentation knob 3 and presenting a tactile sense corresponding to the display screen and the position of the tactile presentation knob 3.

Although Embodiment 1 describes a case in which the GND terminal is used as a charge discharger 115, any other configuration may be employed as long as it is possible to discharge the charge accumulated in the conductive elastic portion 6. For example, not the GND terminal but the positive or negative voltage with which charge can be discharged efficiently may be applied depending on the conductivity of the charge accumulated in the conductive elastic portion 6.

<Difference in Electrode Structure Between Tactile Presentation Screen and Touch Screen>

As preferable conditions for the tactile electrodes 102, firstly a configuration is desirable in which the indicator 2 is capable of coming into contact with the tactile electrodes 102 without any intervention of members other than the dielectric layer 106. Thus, it is preferable that the tactile electrodes 102 covered by the dielectric layer 106 are arranged on the outermost surface of the tactile presentation touch panel 400.

Secondly, a stronger tactile sense can be generated as the distance between the indicator 2 and the tactile electrodes 102 is shorter. From this viewpoint, it is preferable that the dielectric layer 106 has a small thickness and that the dielectric layer 106 has a high dielectric constant.

Thirdly, it is desirable that the tactile electrodes 102 are densely arranged in order to increase the electrostatic capacitance $C_{NE}$ (see FIG. 23) during generation of a tactile sense, whereas it is also preferable that electrostatic capacitance $C_E$ between the tactile electrodes 102, i.e., the inter-electrode capacitance, is small at the time of detecting the touched position (see FIG. 21) in order not to inhibit the formation of the electrostatic capacitance $C_{ND}$.

In the case where the tactile presentation touch panel 400 is larger in size than the tactile presentation knob 3 and the area where the tactile presentation knob 3 is not placed is used as a touch panel that does not present a tactile sense and when the indicator 2 is not in contact with the tactile presentation knob 3, the entire surface of the tactile presentation touch panel 400 is repeatedly operated with the timing of operations performed when the indicator 2 is not in contact with the tactile presentation knob 3 (see FIG. 18). When a touch is detected in the area used as the touch panel that does not present a tactile sense, the touched position is calculated and output. When the indicator 2 comes in contact with the tactile presentation knob 3, the touch detection for the area where the tactile presentation knob 3 is not placed is halted, and only the area where the tactile presentation knob 3 is placed is operated with the timing of operations performed when the indicator 2 is in contact with the tactile presentation knob 3 as described above (see FIG. 20).

In the case where the area where the presentation knob 3 is not placed is used as a touch panel that presents a tactile sense and when the indicator 2 is not in contact with the tactile presentation knob 3, the entire surface of the tactile presentation touch panel 400 is repeatedly operated with the timing of operations performed when the indicator 2 is not in contact with the tactile presentation knob 3 (see FIG. 18). When a touch is detected in the area used as the touch panel that presents a tactile sense, operations are performed with the timing of operations performed when the indicator 2 is in contact with the tactile presentation knob 3 as described above (see FIG. 20). When the indicator 2 comes in contact with the tactile presentation knob 3, the touch detection for the area where the tactile presentation knob 3 is not placed is halted, and only the area where the tactile presentation knob 3 is placed is operated with the timing of operations performed when the indicator 2 is in contact with the tactile presentation knob 3 as described above (see FIG. 20).

As preferable conditions for the excitation electrodes 202 and the detection electrodes 203, firstly, a matrix structure that enables accurate identification of a touched position is necessary in order to ensure the sensitivity and linearity of touched position detection. Secondly, a predetermined distance (which is greater than or equal to several hundreds of micrometers and less than or equal to several millimeters) needs to be provided between the excitation electrodes 202 and the detection electrodes 203 so as to expand an electric field in the lateral direction in order to sense a touched position by the electrostatic capacitance $C_{ND}$ formed between the indicator 2 and the detection electrodes 203 via the tactile presentation screen 150.

As described above, the preferable conditions for the tactile electrodes 102 and the preferable conditions for the detection electrodes 203 are different. In order to optimize both of the conditions, it is undesirable that similar structures are employed for the tactile electrodes and the detection electrodes.

<Details about Lead Wiring Layers>

The lead wiring layers 105 (FIG. 12) of the tactile presentation screen 150 specifically include lead wiring layers Ld(1) to Ld(j) and lead wiring layers Lu(1) to Lu(j). Each of the lead wiring layers Ld(k) and Lu(k) is connected to the k-th tactile electrode 102, where k is an integral number from 1 to j. The lead wiring layers Ld(k) and Lu(k) are connected respectively to one and the other ends of one tactile electrode 102 in the direction of extension.

The wiring resistance of each of the tactile electrodes 102 provided on the tactile presentation screen 150 is desirably high and may, for example, be higher than or equal to $10^4\Omega$ from the viewpoint of not inhibiting touch detection by the touch screen 250. In such a case with high wiring resistance, a delay is likely to occur in the propagation of voltage signals within the wiring layers. However, the occurrence of such a delay in propagation can be reduced by connecting the lead wiring layers 105 to one and the other ends of each tactile electrode 102 as described above.

The lead wiring layers Ld(1) to Ld(j) are each arranged outside a tactile presentable area and extend to the corresponding electrode so as to obtain almost the shortest distance from the tactile-presentation-panel terminal area 107 in order from the one closer to the center in the alignment of the tactile-presentation-panel terminal area 107. The tactile-presentation-panel terminal areas 107 are arranged along the long side of the transparent insulating substrate 101 and in the vicinity of the center of the long side. The lead wiring layers Ld(1) to Ld(j) are arranged as densely as possible while securing mutual insulation. The lead wiring layers Lu(1) to Lu(j) are arranged similarly outside the region occupied by the lead wiring layers Ld(1) to Ld(j). Such an arrangement reduces the area of the portion of the transparent insulating substrate 101 that is located outside the tactile presentable area.

The lead wiring layer 105, namely the lead wiring layers Ld(1) to Ld(j) and the lead wiring layers Lu(1) to Lu(j), may preferably be configured by either a single-layer metal film or a laminated film of a single metal layer and a single non-metal layer. In the case where the laminated film includes one lower layer and one upper layer that covers the lower layer, the upper layer may function as a protective layer for the lower layer. For example, in an etching process used in the manufacture of the tactile presentation screen 150, the upper layer serving as the protective layer may protect the lower layer from an etchant. As another alternative, the upper layer may function as a cap layer that prevents corrosion of the lower layer during manufacture or use of the tactile presentation screen 150. If the lower layer is formed of a material that is superior in adhesion to the transparent insulating substrate 101 to the material for the upper layer, it is possible to reduce the occurrence of delamination of the lead wiring layers 105.

<Tactile Presentation Touch Panel Including Display Panel>

FIG. 25 is a block diagram showing an overview of the relationship of the display panel, the touch panel, and the tactile presentation panel. The knob-displacement calculation circuit 220 (see FIGS. 17 and 25) outputs information on the amount of displacement (rotation angle) of the knob to the tactile-generating-condition conversion circuit 120 and the display-screen processing circuit 321 in accordance with the coordinates of the knob on the touch panel 200, obtained by the touch detection circuit 210.

The display-screen processing circuit 321 selects a display processing condition that corresponds to the amount of displacement of the knob in a pattern stored in advance in a display-processing-condition storage device 322 (display-condition storage device). Then, the display-screen processing circuit edits image information 330 based on the selected display processing condition and transfers image data to an image-signal supply circuit 320.

The tactile-generating-condition conversion circuit 120 selects a tactile generating condition, e.g., tactile strength, that corresponds to the amount of displacement of the knob in a pattern stored in advance in a tactile-generating-condition storage device 121 (tactile-condition storage device). Then, the voltage supply circuit 110 supplies a voltage signal to the tactile presentation panel 100 on the basis of the selected tactile-generating-condition. Accordingly, a change in the display of the display panel corresponding to the amount of rotation of the tactile presentation knob 3 is tuned to a tactile sense obtained from the knob.

FIG. 26 is a flowchart showing the aforementioned tuning processing. The tuning processing starts when the indicator 2 (see FIG. 20) comes in contact with the tactile presentation knob 3 (see FIG. 20) (i.e., a knob touch) or when the tactile presentation touch panel 400 is powered on (i.e., power-on). The coordinates of the position of the tactile presentation knob 3 on the touch panel 200 at the point in time when the tuning processing starts or when a signal for initializing the tactile presentation knob 3 is applied to the tactile presentation touch panel 400 is stored as the initial position (step S0).

The state of contact between the indicator 2 and the tactile presentation knob 3 is determined in a predetermined cycle (step S1). If it is determined that the indicator is not in contact with the knob (in the case of No), it is determined that a release operation has been performed(contact release), and the processing transitions to release operation processing (step S14). On the other hand, if it is determined that the indicator is in contact with the knob (in the case of Yes), the position of the tactile presentation knob 3 on the touch panel 200 is detected to acquire the current coordinates (step S2). Then, the amount of displacement (rotation angle) of the tactile presentation knob 3 is calculated from the initial coordinates the acquired current coordinates (step S3), and the presence or absence of displacement is determined from the amount of displacement (step S4).

If it is determined that there is no displacement of the tactile presentation knob 3 (in the case of No), it is determined whether the operation performed in the previous cycle is rotation or translation (step S11). If the operation in the previous cycle is translation, the processing transitions to translational operation processing (step S15). On the other hand, if the operation in the previous cycle is rotation, an angle versus tactile sense conversion table is referenced to using the rotation angle in the previous cycle (step S12), and a signal is applied to the tactile electrodes under conditions that the same tactile sense as in the previous cycle is generated (step S8).

If the operation in the previous cycle is rotation, display processing corresponding to the rotation angle in the previous cycle is also performed(step S13).

Meanwhile, if it is determined in step S4 that there is a displacement of the tactile presentation knob 3 (in the case of Yes), it is determined whether the displacement is a rotational operation (step S5). In the case of a rotational operation (in the case of Yes), it is determined whether the direction of the rotational operation is in the same direction as in the previous cycle (step S6). In the case of a rotational operation, display processing corresponding to the rotation angle calculated in step S3 is also performed (step S9).

If it is determined in step S6 that the rotation operation is in the same direction (in the case of Yes), the same angle versus tactile sense conversion table as used in the previous cycle is referenced to (step S7), and a signal is applied to the tactile electrodes 102 (step S8).

On the other hand, if it is determined in step S6 that the rotation operation is not in the same direction as in the previous cycle (in the case of No), it is determined that the knob is rotated in the reverse direction, and the conversion table is changed to the one for converting the rotation angle in the reverse direction into a tactile sense (step S10). Then, the changed angle versus tactile sense conversion table is referenced to (step S7), and a signal is applied to the tactile electrodes 102 (step S8).

After the application of voltage to the tactile electrodes 102, the processing transitions to the next cycle of checking the state of contact between the tactile presentation knob 3 and the indicator 2.

Referring back to the description of FIG. 25, the functions of a pressure detection circuit 217 and a pressure-amount calculation circuit 218 will be described. As shown in FIG. 1, the pressure sensitive sensors 216 are arranged on the back side of the display panel 300 to detect the pressure applied during operation of the tactile presentation knob 3 from the deformation of members configuring the tactile presentation touch display 1. The pressure detection circuit 217 receives input of the outputs of the pressure sensitive sensors 216, and the pressure-amount calculation circuit 218 calculates the amount of pressure applied from values detected by the pressure detection circuit 217.

The pressure sensitive sensors 216 may use either a capacitive system for detecting a change in capacitance resulting from a change in gaps between electrodes in the pressure sensitive sensors, caused by pressure applied, or a piezoelectric system for detecting distortion as an electrical signal, the distortion being the amount of deformation of a structure adhering to the pressure sensitive sensors 216, e.g., the undersurface of the display panel 300 in the case shown in FIG. 1, caused as a result of expansion or contraction in proportion to the pressure applied. The pressure sensitive sensors 216 may use any system as long as it is possible to detect the pressure applied. The plurality of pressure sensitive sensors 216 are arranged so that the pressure applied can be sensed at a uniform sensitivity even if the tactile presentation knob 3 is operated at any position within the display area 301. The pressure sensitive sensors may be arranged at such positions at which the reproducibility of the relationship between a change in shape and the pressure applied is enhanced, a considerable change is made in shape by the pressure applied, and the pressure sensitive sensors 216 have highest sensitivity. In the case of using the four pressure sensitive sensors 216, for example, these sensors may be arranged in portions that are close to the four corners within the display area 301 as shown in FIG. 1, so that the sensors are symmetrical with respect to a point or a line.

The pressure detection circuit 217 detects the pressure applied, from a change in capacitance or distortion of the four pressure sensitive sensors 216, and the pressure-amount calculation circuit 218 obtains a weighted average from the detected values output from the pressure detection circuit 217 so as to calculate the amount of pressure, and outputs the amount of pressure to the tactile-generating-condition conversion circuit 120. The waveform of the voltage signal output from the tactile-generating-condition storage device 121 is corrected into the waveform of a voltage signal corresponding to the amount of pressure in accordance with the tactile generating conditions determined by, for example, an operation amount or an operational position corresponding to the user interface (UI) displayed, and the corrected waveform is output to the voltage supply circuit 110.

The system, structure, detection positions, and so on of the pressure sensitive sensors 216 may be selected depending on the method for fixing the tactile presentation touch display 1 to a casing and the type of the display panel 300 (e.g., a liquid crystal display, an organic EL panel, or a μLED) on the basis of such conditions that allow high-sensitivity pressure detection and a large amount of deformation of the structure configuring the tactile presentation touch display 1. In the case where the pressure sensitive sensors 216 are arranged so as to be capable of calculating a pressure applied position with reference to the balance of values detected by the pressure sensitive sensors 216, the pressure sensitive sensors 216 are capable of not only pressure detection but also touched-position detection, and can also be used as the touch panel 200.

<Planar and Sectional Structures of Conductive Elastic Portion>

Figure 27:
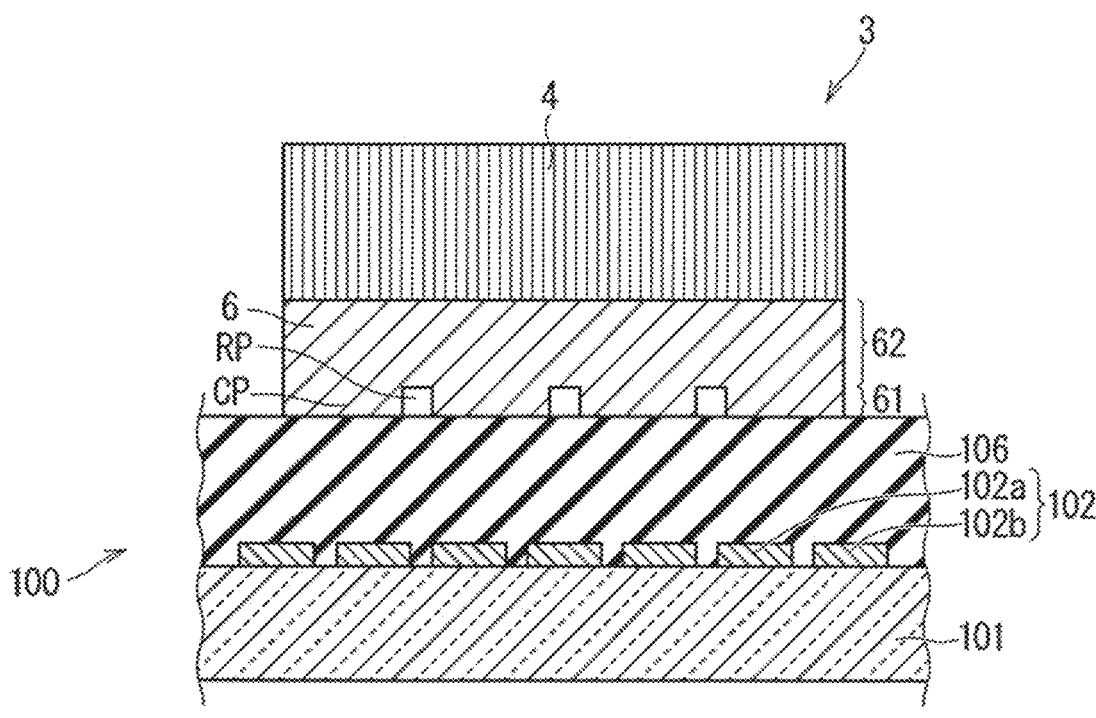
FIG. 27 is a sectional view showing a configuration of a tactile presentation knob according to a variation of Embodiment 1.

FIG. 27 is a sectional view showing a configuration of the tactile presentation knob 3 according to a variation of Embodiment 1. As shown in FIG. 27, the conductive elastic portion 6 of the tactile presentation knob 3 includes a surface layer 61 that comes in contact with the tactile presentation panel 100, and an inner layer 62 fixedly attached to the operation part 4. A surface of the surface layer 61 that comes in contact with the dielectric layer 106 of the tactile presentation panel 100 has an uneven shape in which projections CP and depressions RP are repeated alternately.

Figure 28:
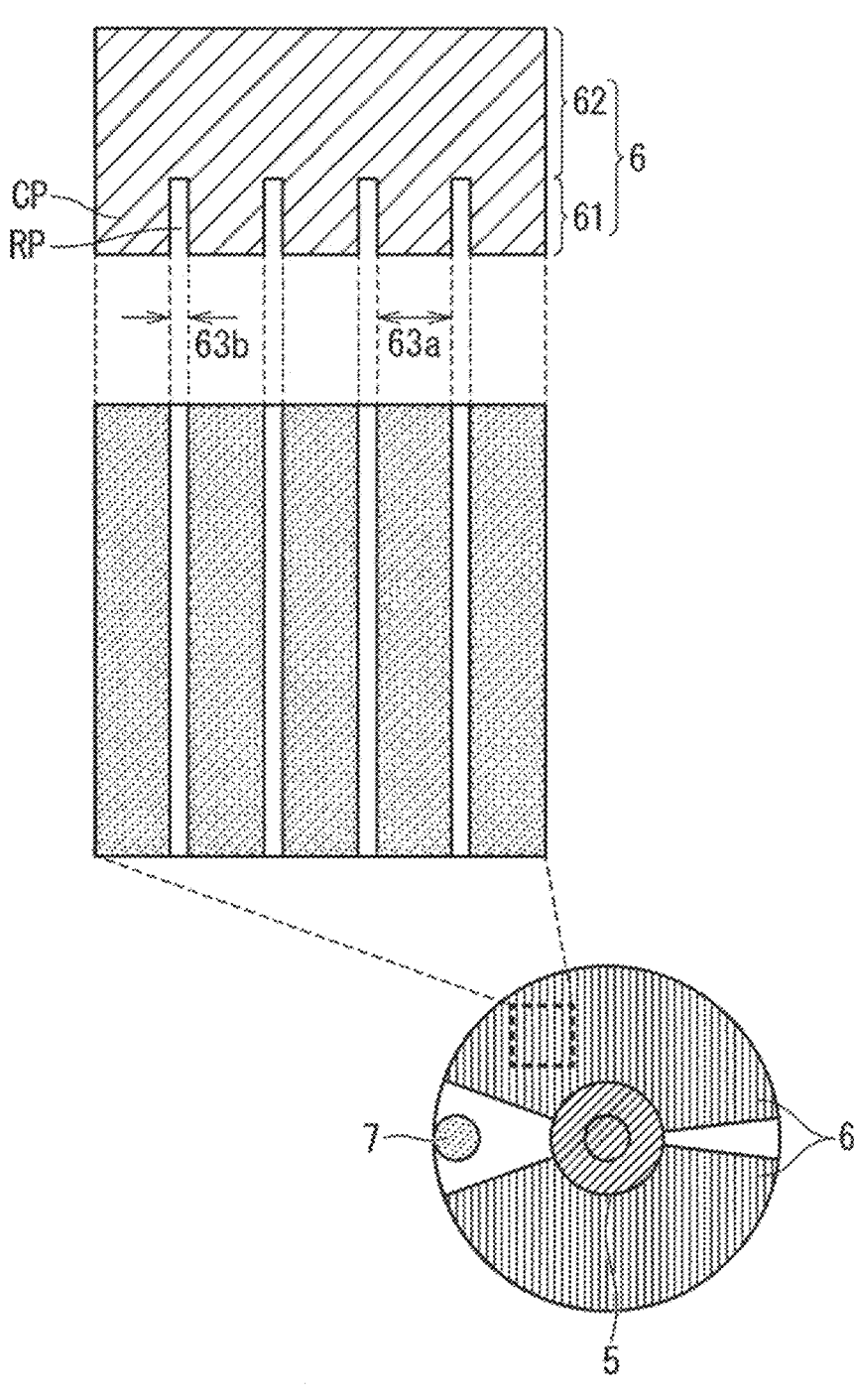
FIG. 28 shows a partial enlarged plan view and a sectional view showing a configuration of a tactile presentation knob according to the variation of Embodiment 1.

FIG. 28 shows a partial enlarged plan view of the conductive elastic portion 6 and a sectional view thereof on the back side of the tactile presentation knob 3, i.e., on the side that comes in contact with the surface of the dielectric layer 106. The basic configuration on the back side of the tactile presentation knob 3 is similar to the configuration of the tactile presentation knob 3 described with reference to FIG. 14, and includes the fixed portion 5 and the position detector 7. As shown in FIG. 28, the projections CP having a width 63a and the depressions RP having a width 63b are formed in the surface layer 61 of the conductive elastic portion 6.

Figure 29:
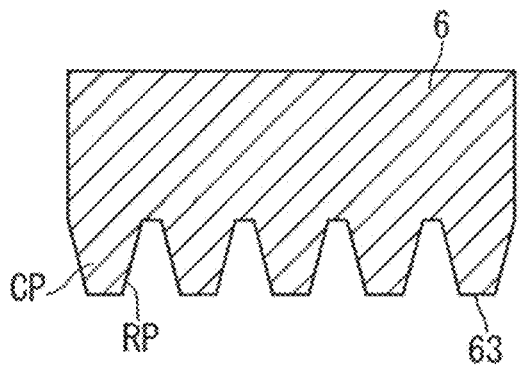
FIG. 29 is a sectional view showing one example of a conductive elastic portion of the tactile presentation knob according to the variation of Embodiment 1.
Figure 30:
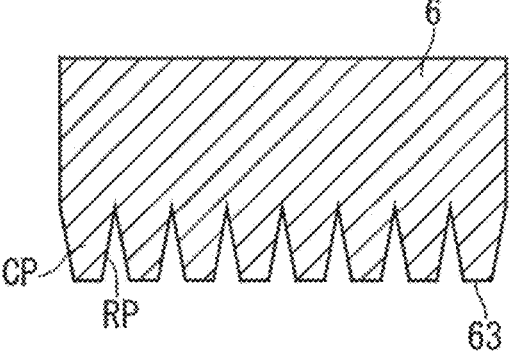
FIG. 30 is a sectional view showing one example of the conductive elastic portion of the tactile presentation knob according to the variation of Embodiment 1.
Figure 31:
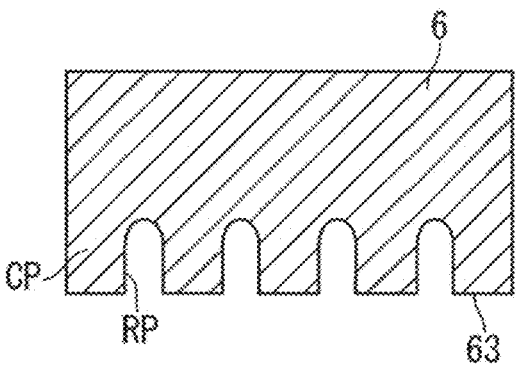
FIG. 31 is a sectional view showing one example of the conductive elastic portion of the tactile presentation knob according to the variation of Embodiment 1.

While the depressions RP shown in FIG. 28 have a rectangular sectional shape, the sectional shape of the depressions RP is not limited to this example. FIGS. 29, 30, and 31 show other examples of the sectional shape of the conductive elastic portion 6.

FIG. 29 shows the case where the depressions RP have a trapezoidal sectional shape, FIG. 30 shows the case where the depressions RP have a triangular sectional shape, and FIG. 31 shows the case where the depressions RP have an arched sectional shape.

In any case, it is preferable that a contact surface 63 of the conductive elastic portion with the tactile presentation panel 100 is a flat surface in order to prevent a change in area caused by forced pressure.

<Pitch of Projections and Depressions of Conductive Elastic Portion>

Figure 33:
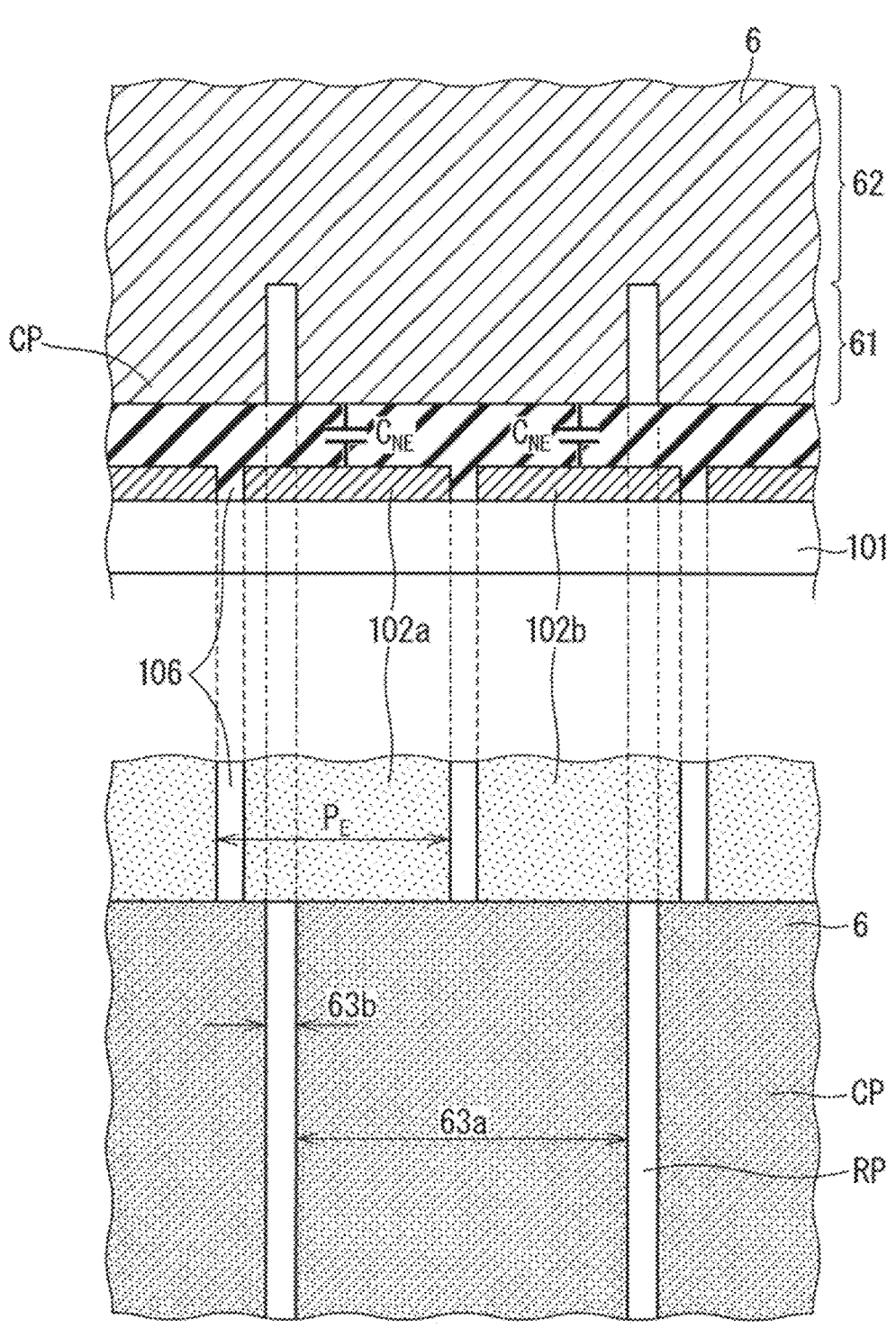
FIG. 33 is a diagram for describing the pitch of projections and depressions of the conductive elastic portion of the tactile presentation knob according to the variation of Embodiment 1.

Next, the pitch of the projections and depressions of the conductive elastic portion 6 will be described with reference to FIGS. 32 and 33. FIG. 32 is a diagram showing the case where the pitch $P_E$ of the tactile electrodes 102 is greater than the projection width 63a of the projections CP of the surface layer 61 of the conductive elastic portion 6 ($P_E$>63a), and schematically shows the electrostatic capacitance $C_{NE}$ formed between the tactile electrodes 102 and the projections CP of the surface layer 61 of the conductive elastic portion 6. FIG. 33 is a diagram showing the case where the pitch $P_E$ of the tactile electrodes 102 is smaller than the projection width 63a of the projections CP of the surface layer 61 of the conductive elastic portion 6 ($P_E$<63a), and schematically shows the electrostatic capacitance $C_{NE}$ formed between the tactile electrodes 102 and the projections CP of the surface layer 61 of the conductive elastic portion 6. Note that FIGS. 32 and 33 show, on the upper side, partial sectional views of the conductive elastic portion 6 and the tactile presentation panel 100 and also show, on the lower side, partial plan views showing the positional relationship of the tactile electrodes 102 and the conductive elastic portion 6 when the conductive elastic portion 6 is mounted on the tactile presentation panel 100.

According to Embodiment 1, as described previously, the voltage signal $V_a$ (see FIG. 5) and the voltage signal $V_b$ (see FIG. 6) of different frequencies are applied to each of the first electrodes 102a and the second electrodes 102b, which are adjacent to each other, so that the electrostatic force corresponding to the amplitude modulation signal $V_N$ is generated (see FIG. 7).

According to the variation of the present disclosure, a frictional force between the dielectric layer 106 and the projections CP of the surface layer 61 of the conductive elastic portion 6 changes corresponding to a beat frequency of the amplitude modulation signal $V_N$, and vibrations caused as a result of this change are perceived as a tactile sense by the user.

As shown in FIG. 32, in the state where $P_E$>63a, the electrostatic capacitance $C_{NE}$ is formed only between each first electrode 102a and one projection CP of the surface layer 61 of the conductive elastic portion 6. That is, only the voltage signal $V_a$ applied to the first electrodes 102a acts, and the voltage signal $V_b$ applied to the second electrodes 102$b$ does not act. Thus, the amplitude modulation signal $V_N$ is not generated and therefore a tactile sense is not generated.

On the other hand, a tactile sense is generated when one projection CP of the surface layer 61 of the conductive elastic portion 6 is located above the boundary between one first electrode 102$a$ and one second electrode 102$b$. Thus, depending on the positions of the projections CP of the surface layer 61 of the conductive elastic portion 6, the configuration shown in FIG. 32 may lead to positions at which a tactile sense is generated and positions at which a tactile sense is not generated.

In contrast, in the state where $P_E$<63$a$ as shown in FIG. 33, both of the voltage signal $V_a$ and the voltage signal $V_b$ act on all the projections CP of the surface layer 61 of the conductive elastic portion 6, irrespective of the positions of the projections CP, and accordingly the amplitude modulation signal $V_N$ is generated. Therefore, in the configuration shown in FIG. 33, a tactile sense can be perceived irrespective of the positions of the projections CP of the surface layer 61 of the conductive elastic portion 6, and the position of the tactile presentation knob 3 can be set arbitrarily.

That is, it is preferable that the projection width 63$a$ in the surface layer 61 of the conductive elastic portion 6 is greater than the pitch $P_E$ of the tactile electrodes 102 in order to easily locate the projections CP of the surface layer 61 of the conductive elastic portion 6 astride the first electrodes 102$a$ and the second electrodes 102$b$. It is also preferable that the distance 63$b$ between the projections of the surface layer 61 is narrow because in this case, a larger area is occupied by the conductive elastic portion 6, a large capacitance is formed with the tactile electrodes 102, and higher tactile strength is attained. For example, the uneven shape of the surface layer 61 can be set to the projection width 63$a$ and the depression width 63$b$, i.e., the distance between the projections, that simulate fingerprints.

<Thickness of Air Space>

In the rotation operation (in-plane rotation) of the tactile presentation knob 3 placed on the tactile presentation panel 100, the thickness of the air space to be formed between the tactile presentation panel 100 and the conductive elastic portion 6 varies depending on offset loads applied during the rotation operation or projections and depressions of the surface of the tactile presentation panel 100 and of the surface of the conductive elastic portion 6 provided on the underside of the tactile presentation knob 3. This accordingly changes the electrostatic capacitance to be formed between the conductive elastic portion 6 and the tactile electrodes 102 provided on the tactile presentation panel 100.

FIG. 34 schematically shows a state in which an air space 21 is formed between the tactile presentation panel 100 and the tactile presentation knob 3 mounted on the tactile presentation panel 100 when the surface layer 61 of the conductive elastic portion 6 of the tactile presentation knob 3 does not have an uneven shape.

FIG. 35 is a diagram using the state shown in FIG. 34 as a model and showing the result of calculating the electrostatic force generated between the tactile electrodes 102 and the conductive elastic portion 6 while changing the thickness of the air space 21. In FIG. 35, the horizontal axis represents the thickness of the air space (μm), and the vertical axis represents the electrostatic force (F/cm$^2$).

As shown in FIG. 35, the electrostatic force increases as the thickness of the air space decreases, and the electrostatic force increases abruptly when the thickness of the air space becomes 1 μm or less. Since the tactile strength obtained increases as the electrostatic force between the tactile electrodes 102 and the conductive elastic portion 6 increases, the tactile strength increases as the thickness of the air space decreases.

Figure 36:
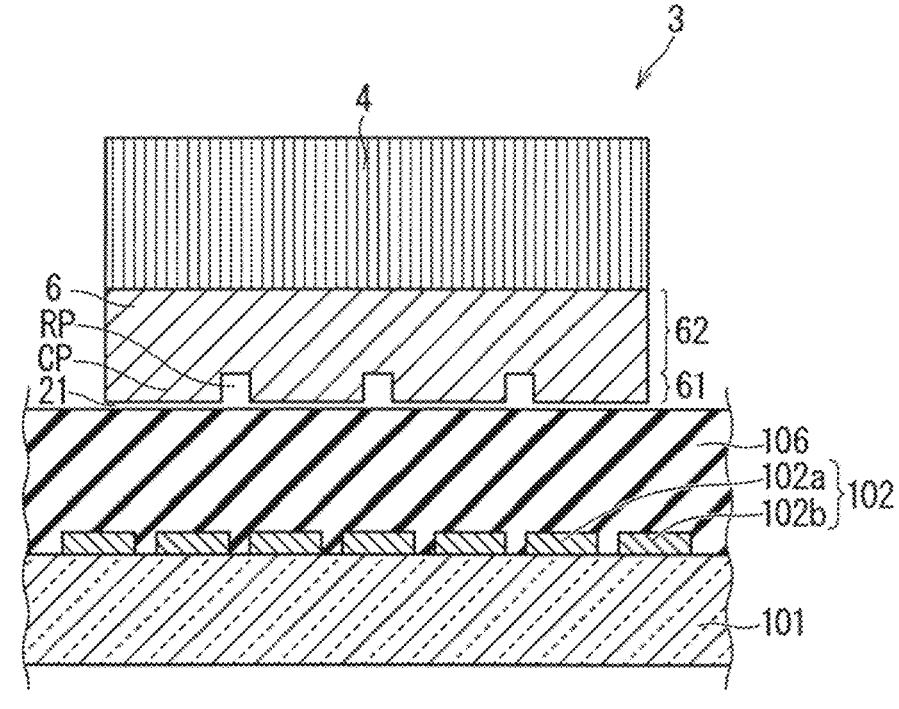
FIG. 36 is a diagram schematically showing a state in which the air space is formed between the tactile presentation knob and the tactile presentation panel according to the variation of Embodiment 1.

FIG. 36 schematically shows a state in which, in the variation of the present disclosure in which the surface layer 61 of the conductive elastic portion 6 of the tactile presentation knob 3 has an uneven shape, the air space 21 is formed between the tactile presentation panel 100 and the tactile presentation knob 3 mounted on the tactile presentation panel 100.

As shown in FIG. 36, when the surface of the conductive elastic portion 6 has an uneven shape, the area occupied by the projections CP, the depth of the depressions RP, and the thickness of the air space 21 formed between the projections CP and the tactile presentation panel 100 have influences on the electrostatic capacitance to be formed between the tactile electrodes 102 and the conductive elastic portion 6.

The air space 21 shown in FIG. 36 includes portions that correspond to the thickness of the air space 21 at the projections CP and portions that correspond to the depth of the depressions RP, and a sum of electrostatic forces between these portions and the tactile electrodes 102 acts as the tactile strength.

Figure 37:
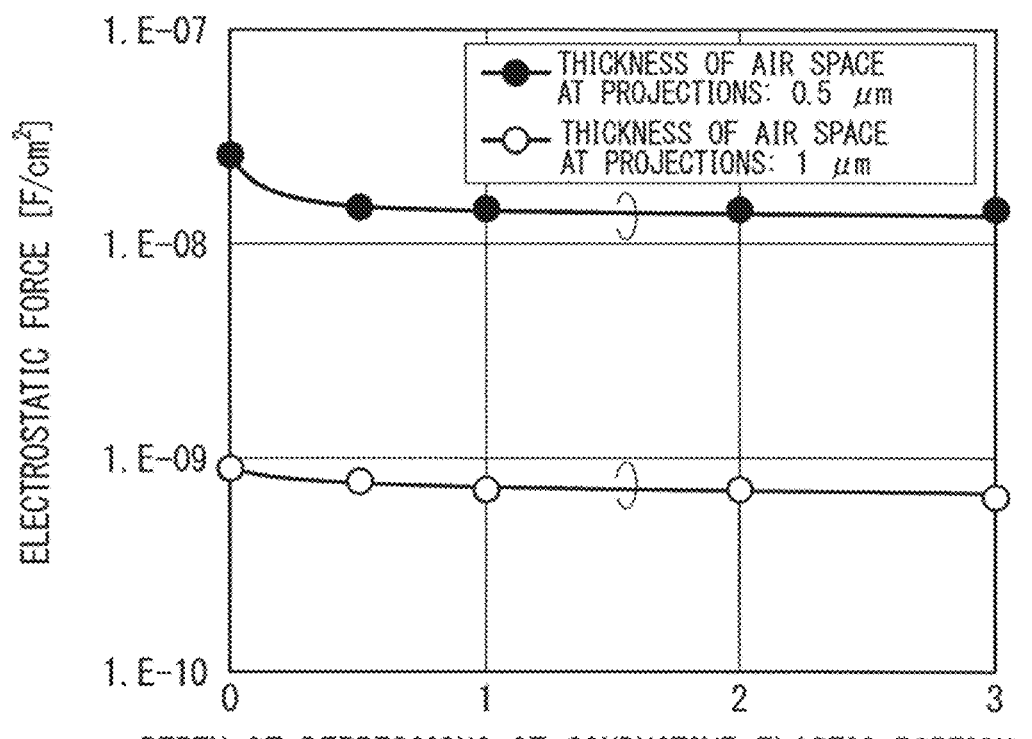
FIG. 37 is a diagram showing the relationship between the thickness of the air space formed between the tactile presentation knob and the tactile presentation panel and the electrostatic force generated between the tactile electrodes and the conductive elastic portion according to the variation of Embodiment 1.

FIG. 37 is a diagram using the state shown in FIG. 36 as a model and showing the result of calculating the electrostatic force between the tactile electrodes 102 and the conductive elastic portion 6 while changing the depth of the depressions RP of the conductive elastic portion 6. In FIG. 37, the horizontal axis presents the depth of the projections (μm), and the vertical axis represents the electrostatic force (F/cm$^2$). In FIG. 37, characteristics are shown for the case where the thickness of the air space 21 at the projections CP is 1 μm and for the case where this thickness is 0.5 μm.

Comparison is made between the characteristics for the case where the thickness of the air space 21 at the projection CP is 0.5 μm, plotted with black circles, and the characteristics for the case where the thickness of the air space 21 at the projections CP is 1 μm, plotted with white circles. When the thickness of the air space 21 is 1 μm, the electrostatic force does not increase even if the depth of the depression RP decreases. On the other hand, when the thickness of the air space 21 at the projections CP is 0.5 μm, the electrostatic force increases when the depth of the depressions RP becomes 0.5 μm or less. Thus, in the case where the conductive elastic portion 6 has an uneven shape as in the variation of the present disclosure, it is desirable that the depth of the depressions RP is set so that the sum of the air space 21 at the projections CP and the depth of the depressions RP becomes 1 μm or less.

By doing this, it is possible to suppress a decrease in the electrostatic capacitance between the conductive elastic portion 6 and the tactile electrodes 102, caused by the air space 21 between the conductive elastic portion 6 and the tactile presentation panel 100, and to produce the electrostatic force based on the amplitude modulation signal $V_N$ at all the projections CP of the conductive elastic portions 6 within the range where the tactile presentation knob 3 is placed.

In the case where there are no depressions RP, it is desirable that the thickness of the air space 21 at the projections CP may be set to 0.5 μm or less. In the case where the air space 21 is not formed at the projections CP, depressions RP may be provided to depth of 0.5 μm or less. In this case, it can be said that the depressions RP correspond to the air space.

<Tactile Strength>

More details about a tactile sense that is generated by a change in frictional force due to the production of the electrostatic force is described below.

According to Embodiment 1, as described previously, the electrostatic force corresponding to the amplitude modulation signal $V_N$ (see FIG. 7) is produced by applying the voltage signal $V_a$ (see FIG. 5) and the voltage signal $V_b$ (see FIG. 6) of different frequencies to each of the first electrodes 102a and the second electrodes 102b that are adjacent to one another. Accordingly, the frictional force between the dielectric layer 106 and the conductive elastic portion 6 changes corresponding to the beat frequency of the amplitude modulation signal $V_N$.

When the tactile presentation knob 3 is displaced in the horizontal direction by the user, the conductive elastic portion 6 becomes deformed in the horizontal direction by the frictional force between the dielectric layer 106 and itself. This deformation is hereinafter referred to as "shear deformation."

Figure 38:
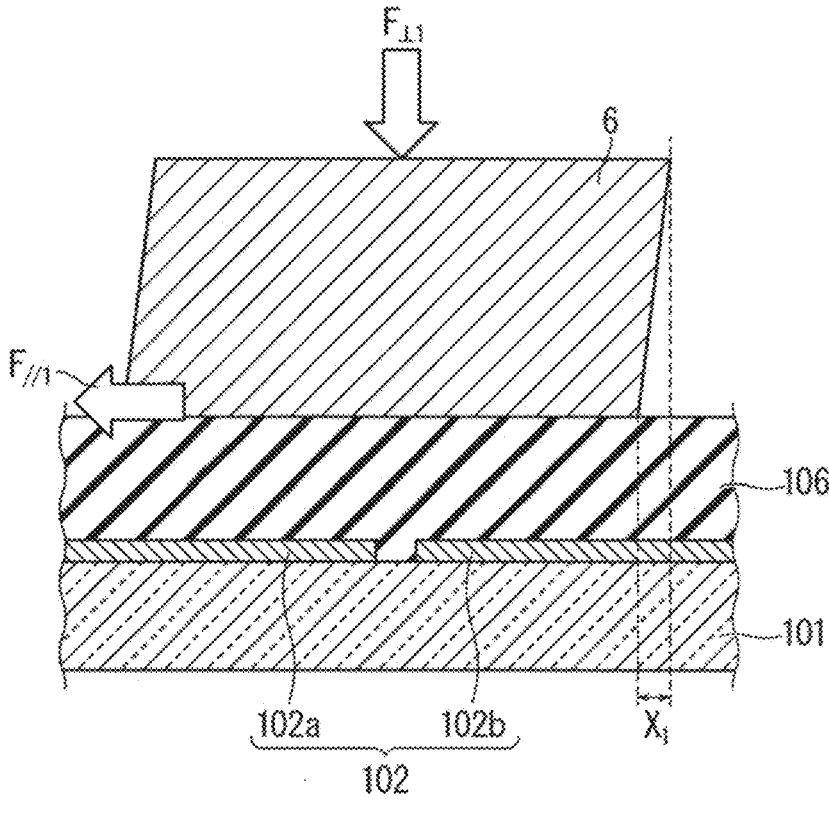
FIG. 38 is a diagram schematically showing shear deformation when the electrostatic capacitance is not formed between the tactile electrodes and the conductive elastic portion.
Figure 39:
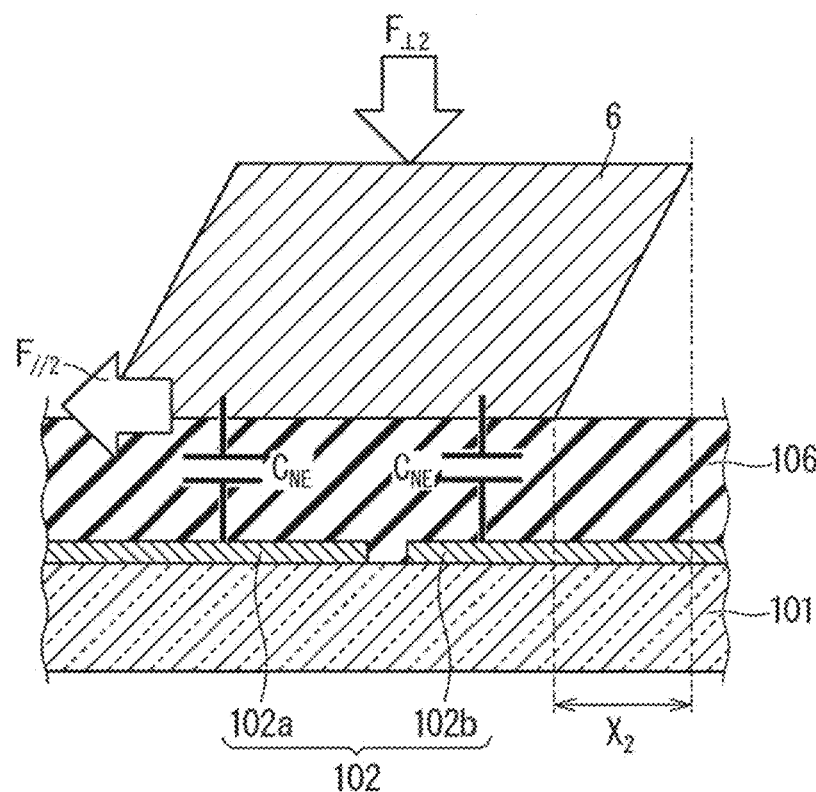
FIG. 39 is a diagram schematically showing shear deformation when the electrostatic capacitance is formed between the tactile electrodes and the conductive elastic portion.

FIG. 38 is a diagram schematically showing the shear deformation when electrostatic capacitance is not formed between the conductive elastic portion 6 and the tactile electrodes 102. FIG. 39 is a diagram schematically showing the shear deformation when electrostatic capacitance is formed between the conductive elastic portion 6 and the tactile electrodes 102.

Since the electrostatic force is produced when the electrostatic capacitance is formed, a vertical force $F_{12}$ exerted when the electrostatic capacitance is formed, shown in FIG. 39, is greater than a vertical force Fri exerted when the electrostatic capacitance is not formed, shown in FIG. 38. The intensity of each force is hereinafter represented by the size of the corresponding arrow.

Thus, a horizontal force $F_{//2}$ exerted when the electrostatic capacitance is formed, shown in FIG. 39, is greater than a horizontal force $F_{//1}$ exerted when the electrostatic capacitance is not formed, shown in FIG. 38. That is, a horizontal frictional force is large.

Accordingly, the amount of shear deformation $X_2$ caused when the electrostatic capacitance is formed is greater than the amount of shear deformation $X_1$ caused when the electrostatic capacitance is not formed. If the magnitude of the frictional force is changed by the voltage signals while the tactile presentation knob 3 is being operated by the user, the amount of shear deformation in the conductive elastic portion 6 varies between $X_1$ and $X_2$, and variations are generated in the conductive elastic portion 6. The generated vibrations are propagated to the indicator such as a finger via the operation part 4 and presented as a tactile sense to the user. The vibrations increase with increasing change in the amount of shear deformation in the conductive elastic portion 6 due to a change in frictional force, and accordingly the strength of a tactile sense perceived by the user increases.

A one method for increasing the amount of shear deformation, it is conceivable to use a material with a low modulus of elasticity that is an index indicating softness of the conductive elastic portion 6. On the other hand, a material with a low modulus of elasticity generally exhibits low vibration transmissibility, i.e., has high vibration damping, that is an index indicating the likelihood of transmitting variations. This reduces the strength of vibrations propagated to the indicator via the operation part 4.

In contrast, according to the variation of the present disclosure, it is possible to achieve both of a large amount of shear deformation and high vibration transmissibility by causing the surface layer 61 of the conductive elastic portion

Figure 40:
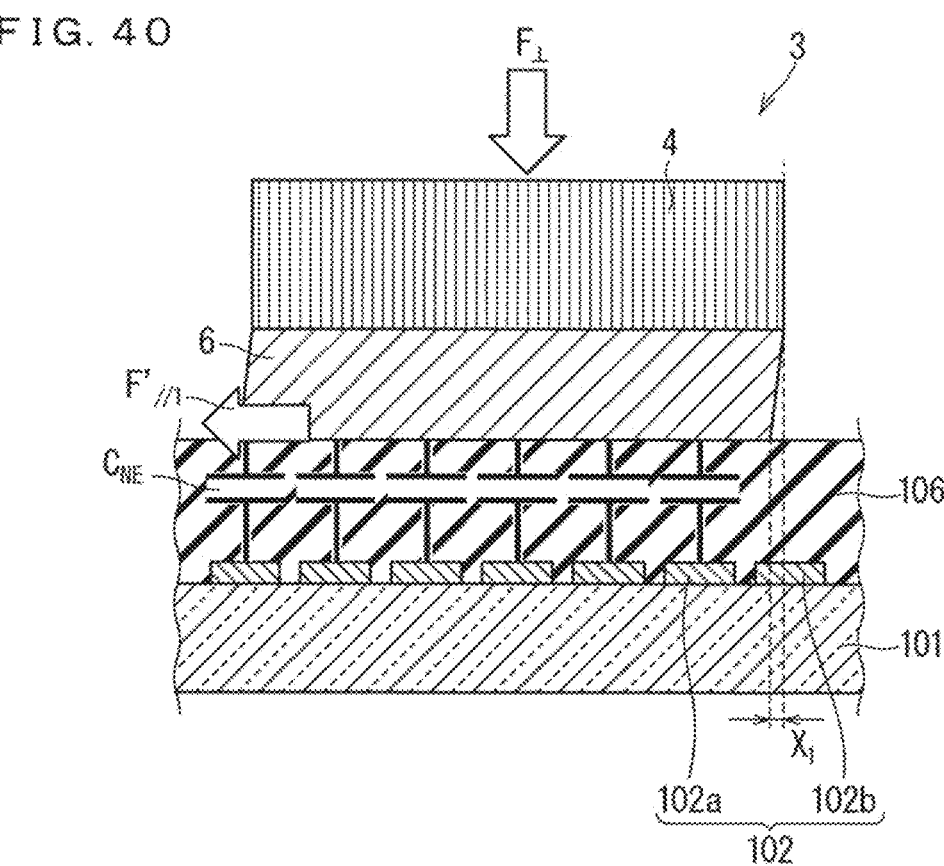
FIG. 40 is a diagram schematically showing shear deformation of the conductive elastic portion when the surface layer of the conductive elastic portion does not have an uneven shape.
Figure 41:
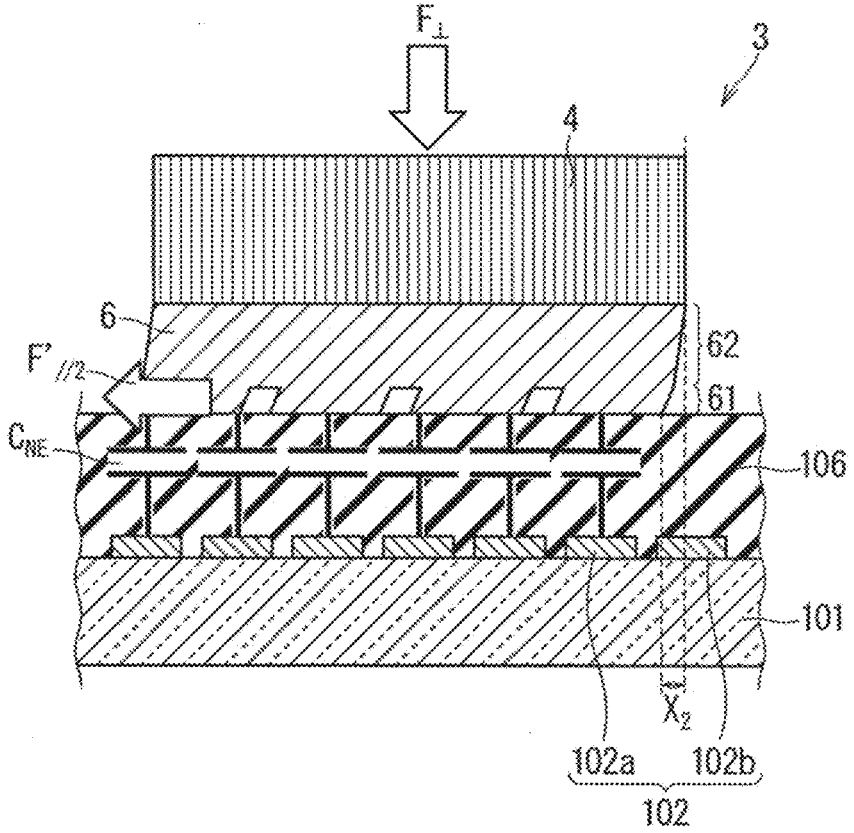
FIG. 41 is a diagram schematically showing shear deformation of the conductive elastic portion when the surface layer of the conductive elastic portion has an uneven shape.

6 to has an uneven shape. FIG. 40 is a diagram schematically showing the shear deformation of the conductive elastic portion 6 when the surface layer 61 of the conductive elastic portion 6 does not have an uneven shape, and FIG. 41 is a diagram schematically showing the shear deformation of the conductive elastic portion 6 when the surface layer 61 of the conductive elastic portion 6 has an uneven shape.

In the case with the uneven shape, the area of contact with the tactile presentation panel 100 is smaller than in the case with no uneven shape. However, when the same vertical force $F_\perp$ is applied in both of the cases, a horizontal force $F'_{//2}$ exerted in the case with the uneven shape shown in FIG. 41 is greater than a horizontal force $F'_{//1}$ in exerted in the case with no uneven shape shown in FIG. 40, i.e., the horizontal frictional force is large ($F'_{//1} < F'_{//2}$).

This means an increase in frictional force per unit area, and the amount of shear deformation increases as compared with the conductive elastic portion 6 with no uneven shape even if the same conductive elastic material is used ($X_1 < X_2$). Moreover, if the same conductive elastic material is used, the vibration transmissibility of the inner layer 62 is similar to that in the case with no uneven shape. Accordingly, with the uneven shape of the surface layer 61 of the conductive elastic portion 6, it is possible to increase the amount of shear deformation without impairing vibration transmissibility and thereby to improve the strength of vibrations that are propagated to the indicator.

<Stability of Tactile Strength>

Next, more details about the stability of tactile strength is described below. As described previously, the adhesion of the conductive elastic portion 6 to the surface of the tactile presentation panel 100 decreases due to factors such as microscopic asperities on the surface of the tactile presentation panel 100 and a reduction in the degree of flatness of the tactile presentation panel 100 resulting from the accuracy of assembly of the tactile presentation screen 150. The adhesion of the conductive elastic portion 6 to the surface of the tactile presentation panel 100 also decreases similarly when the tactile presentation knob 3 is inclined due to the accuracy of finishing of the operation part 4 and the fixed portion 5 (or the rotational shaft 5a) and imbalances in pressing force caused by the user twisting his/her wrist.

When the adhesion of the conductive elastic portion 6 to the surface of the tactile presentation panel 100 decreases, the tactile electrodes 102 and the conductive elastic portion 6 form electrostatic capacitance not only via the dielectric layer 106 but also via air with a low dielectric constant. This reduces the electrostatic capacitance formed between the tactile electrodes 102 and the conductive elastic portion 6, resulting in a reduction in tactile strength and impairing the stability of tactile strength. Meanwhile, as acceptable range increase for the degree of flatness of the tactile presentation panel 100, asperities on the tactile presentation panel 100, and the inclination of the tactile presentation knob 3, not only demands for the accuracy of assembly and finishing of those components diminish, but also there is lower necessity to increase the thickness of the dielectric layer 106 in order to reduce asperities derived from the tactile electrodes 102. That is, it is possible to reduce the thickness of the dielectric layer 106. This allows the formation of larger electrostatic capacitance between the conductive elastic portion 6 and the tactile electrodes 102 and allows the generation of a stronger tactile sense.

The conductive elastic portion 6 that has elasticity fills in interstices derived from asperities and formed between the dielectric layer 106 and the conductive elastic portion 6. This prevents a reduction in tactile strength due to degraded adhesion. When the tactile presentation knob 3 is depressed by the user, the conductive elastic portion 6 becomes deformed in the vertical direction. This deformation is hereinafter referred to as compressive deformation.

Figure 42:
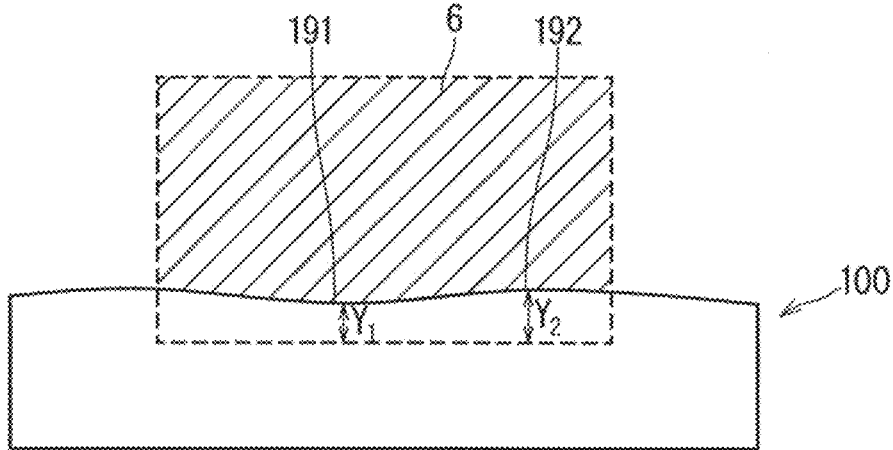
FIG. 42 is a diagram schematically showing the state of contact between the conductive elastic portion and the tactile presentation panel when the tactile presentation panel has a low degree of flatness.

FIG. 42 is a diagram schematically showing the state of contact between the conductive elastic portion 6 and the tactile presentation panel 100 when the tactile presentation panel 100 has a low degree of flatness. FIG. 42 shows a case where the tactile presentation panel 100 includes valley portions 191 serving as the projections and mountain portions 192 serving as the depressions, and the amounts of deformation of the conductive elastic portion 6 due to contact with the valley portions 191 and the mountain portions 192 are expressed by $Y_1$ and $Y_2$, respectively. It can be seen from FIG. 42 that the conductive elastic portion 6 undergoes larger compressive deformation at the surfaces of contact with the mountain portions 192 of the tactile presentation panel 100 than at the surfaces of contact with the valley portions 191 ($Y_1 < Y_2$). Accordingly, the conductive elastic portion 6 maintains adhesion even in the presence of asperities on the tactile presentation panel 100.

Figure 43:
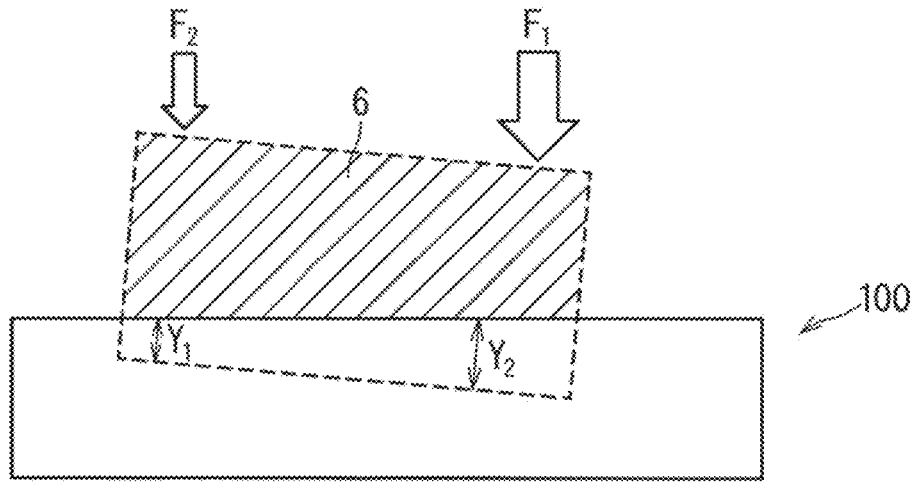
FIG. 43 is a diagram schematically showing the state of contact between the conductive elastic portion and the tactile presentation panel when the tactile presentation knob is inclined.

FIG. 43 is a diagram schematically showing the state of contact between the conductive elastic portion 6 and the tactile presentation panel 100 when the tactile presentation knob 3 is inclined. In FIGS. 43, $Y_2$ and $Y_1$ represent the amounts of deformation of the conductive elastic portion 6 when a large pressing force $F_1$ and a small pressing force $F_2$ are applied to the tactile presentation knob 3.

The conductive elastic portion 6 undergoes larger compressive deformation at the surface of contact with the tactile presentation panel 100 to which the large pressing force $F_1$ is applied than at the surface of contact with the tactile presentation panel 100 to which the small pressing force $F_2$ is applied ($Y_1 < Y_2$). Accordingly, the conductive elastic portion 6 maintains adhesion even when the tactile presentation knob 3 is inclined.

As the amount of compression deformation of the conductive elastic portion 6 at the press of the tactile presentation knob 3 increases, the adhesion to the tactile presentation panel 100 increases and the stability of tactile strength perceived by the user improves.

<Increase in Amount of Compressive Deformation>

As one method for increasing the amount of compressive deformation, it is conceivable to use a material with a low modulus of elasticity that is an index indicating softness of the conductive elastic portion 6. On the other hand, a material with a low modulus of elasticity generally exhibits low vibration transmissibility (i.e., has high vibration damping) that is an index indicating the likelihood of transmitting vibrations. This reduces the strength of vibrations propagated to the indicator via the operation part 4.

Figure 44:
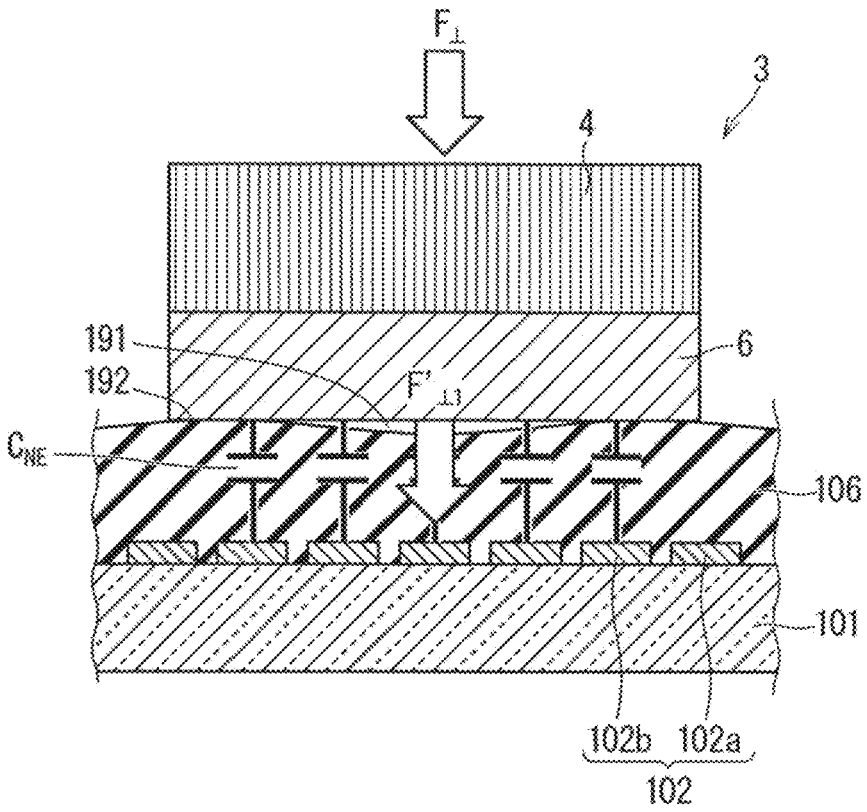
FIG. 44 is a diagram schematically showing the state of deformation of the conductive elastic portion while the surface of the tactile presentation panel undulates when the surface layer of the conductive elastic portion does not have an uneven shape.
Figure 45:
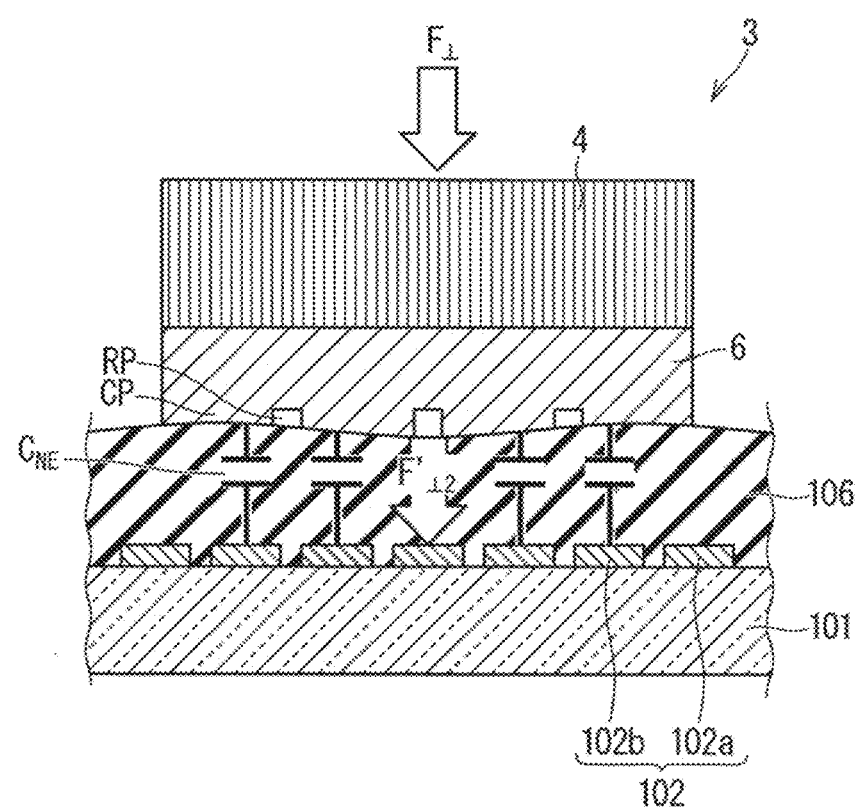
FIG. 45 is a diagram schematically showing the state of deformation of the conductive elastic portion while the surface of the tactile presentation panel undulates when the surface layer of the conductive elastic portion has an uneven shape.

In contrast, according to the variation of the present disclosure, it is possible to achieve both of a large amount of compressive deformation and high vibration transmissibility by causing the surface layer 61 of the conductive elastic portion 6 to have an uneven shape. FIG. 44 is a diagram schematically showing the state of deformation of the conductive elastic portion 6 while the surface of the tactile presentation panel 100 undulates when the surface layer 61 of the conductive elastic portion 6 does not have an uneven shape, and FIG. 45 is a diagram schematically showing the state of deformation of the conductive elastic portion 6 while the surface of the tactile presentation panel 100 undulates when the surface layer 61 of the conductive elastic portion 6 has an uneven shape. In FIGS. 44 and 45, a valley portion 191 and a mountain portion 192 of the undulations are shown.

In the case with the uneven shape, the area of contact with the tactile presentation panel 100 is smaller than in the case with no uneven shape. However, when the same vertical force $F_\perp$ is applied in both of the cases, a pressing force $F'_{\perp 2}$ exerted per unit area in the case with the uneven shape shown in FIG. 45 is greater than a pressing force $F'_{\perp 1}$ exerted per unit area in the case with no uneven shape shown in FIG. 44 ($F'_{\perp 1} < F'_{\perp 2}$).

In this way, the amount of compressive deformation in the case with the uneven shape is greater than that in the conductive elastic portion 6 of the same conductive elastic member in the case with no uneven shape. Moreover, if the same conductive elastic material is used, the vibration transmissibility of the inner layer 62 is similar to that in the case with no uneven shape. Accordingly, with the uneven shape of the surface layer 61 of the conductive elastic portion 6, it is possible to increase the amount of compressive deformation without impairing vibration transmissibility and thereby to improve the adhesion of the conductive elastic portion 6 to the surface of the tactile presentation panel 100 without impairing the strength of vibrations that are propagated to the indicator.

Figure 46:
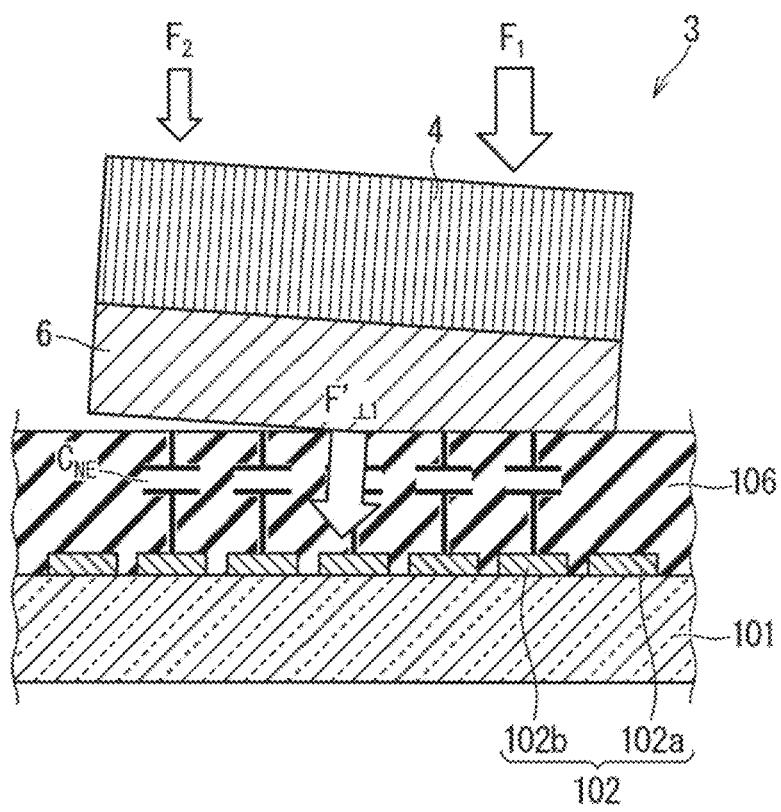
FIG. 46 is a diagram schematically showing the state of deformation of the conductive elastic portion when the surface layer of the conductive elastic portion does not have an uneven shape.
Figure 47:
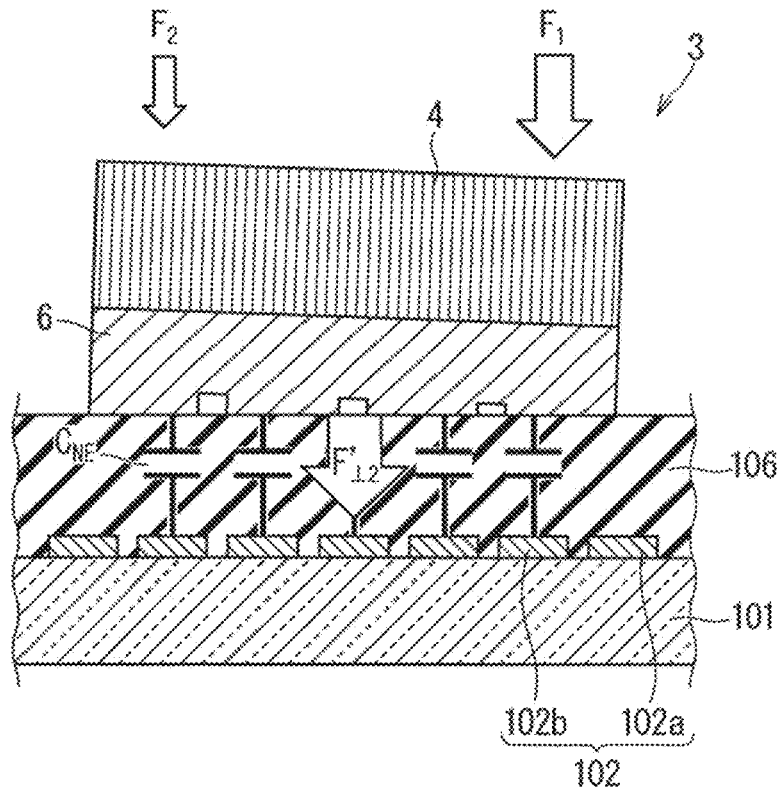
FIG. 47 is a diagram schematically showing the state of deformation of the conductive elastic portion when the surface layer of the conductive elastic portion has an uneven shape.

FIG. 46 is a diagram schematically showing the state of deformation of the conductive elastic portion 6 when the surface layer 61 of the conductive elastic portion 6 does not have an uneven shape, and FIG. 47 is a diagram schematically showing the state of deformation of the conductive elastic portion 6 when the surface layer 61 of the conductive elastic portion 6 has an uneven shape. FIGS. 46 and 47 show cases where the tactile presentation knob 3 is inclined and the large pressing force $F_1$ and the small pressing force $F_2$ are applied.

The pressing force $F'_{\perp 2}$ exerted per unit area in the case with the uneven shape shown in FIG. 47 is greater than the pressing force $F'_{\perp 1}$ exerted per unit area in the case with no uneven shape shown in FIG. 46 ($F'_{\perp 1} < F'_{\perp 2}$).

In this way, the amount of compressive deformation in the case with the uneven shape is greater than that in the conductive elastic portion 6 of the same conductive elastic member in the case with no uneven shape. Moreover, if the same conductive elastic material is used, the vibration transmissibility of the inner layer 62 is similar to that in the case with no uneven shape. Accordingly, with the uneven shape of the surface layer 61 of the conductive elastic portion 6, it is possible to increase the amount of compressive deformation without impairing vibration transmissibility and thereby to improve the adhesion of the conductive elastic portion 6 to the surface of the tactile presentation panel 100 without impairing the strength of vibrations that are propagated to the indicator.

<Effects>

As to the tactile presentation knob 3 according to the variation of Embodiment 1 described above, when a conductive elastic material with the same vibration transmissibility is used, the amount of shear deformation caused by an increase in frictional force per unit area can be increased by giving an uneven shape to the surface layer 61 of the conductive elastic portion 6, as compared to the case with no uneven shape. This increases a change in the amount of shear deformation caused by the change in frictional force and improves the strength of a tactile sense perceived by the user.

Moreover, when a conductive elastic material with the same vibration transmissibility is used, the amount of compressive deformation caused by an increase in pressing force per unit area can be increased by giving an uneven shape to the surface layer 61 of the conductive elastic portion 6, as compared to the case with no uneven shape. Accordingly, when the tactile presentation panel 100 has a small degree of flatness, when there are asperities on the surface of the tactile presentation panel, and when the pressing force exerted on the tactile presentation knob 3 is not uniform, it is possible to improve the adhesion of the conductive elastic portion 6 to the tactile presentation panel 100 and improves tactile strength as compared to the case with no uneven shape.

By setting the projection width 63a of the projections CP of the conductive elastic portion greater than the pitch $P_E$ of the tactile electrodes 102, the electrostatic force corresponding to the amplitude modulation signal $V_N$ can be generated at all the projections CP, as compared to the case where the projection width 63a of the projections CP is smaller than the pitch width of the tactile electrodes 102. Accordingly, it is possible to enable the user to feel a tactile sense irrespective of the positions of the projections of the surface layer 61 of the conductive elastic portion 6 and to set the position of the tactile presentation knob 3 at an arbitrary position.

Embodiment 2

FIG. 48 is a diagram showing one example of the uneven shape of the conductive elastic portion 6 of a tactile presentation knob according to Embodiment 2, and shows a plan view in the center, a sectional view taken along a line A-A on the upper side, and a sectional view taken along a line B-B on the right side.

The conductive elastic portion 6 shown in FIG. 48 is applied to a tactile presentation knob that is assumed to be used for slide operations. The surface layer 61 of the conductive elastic portion 6 has depressions RP formed in grid form and projections CP surrounded by the depressions RP. In the example shown in FIG. 48, the width 63a of the projection CP and the width 63b and the depression RP are made constant, and the projections CP have a prism shape; however, the configuration is not limited to this example.

FIG. 49 shows a plan view when the projections CP have a circular columnar shape, and also shows a sectional view taken along a line A-A above the plan view. The depressions RP shown in FIG. 49 occupy the entire region of the surface layer 61 of the conductive elastic portion 6, except regions corresponding to the projections CP.

FIG. 50 shows a plan view when the projection CP have a circular truncated cone shape, and also shows a sectional view taken along a line A-A above the plan view. The depressions RP shown in FIG. 50 occupy the entire region of the surface layer 61 of the conductive elastic portion 6, except regions corresponding to the projections CP.

Figure 51:
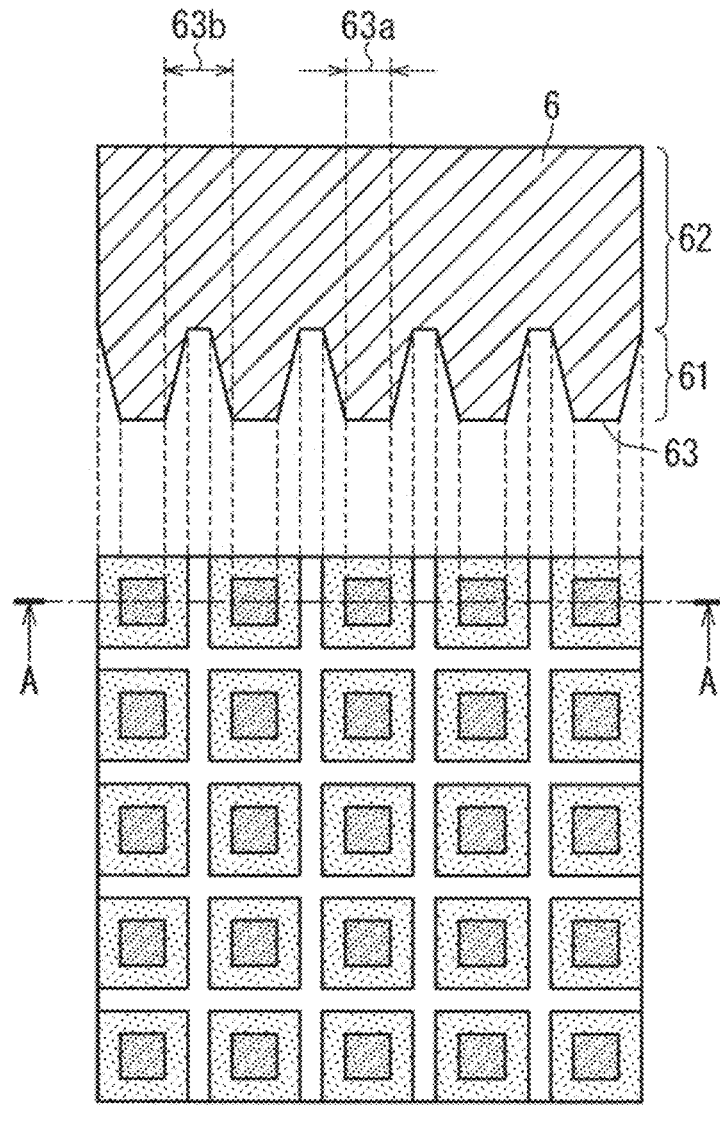
FIG. 51 is a diagram showing one example of the uneven shape of the conductive elastic portion of the tactile presentation knob according to Embodiment 2.

FIG. 51 shows a plan view when the projections CP have a truncated pyramid shape, and also shows a sectional view taken along a line A-A above the plane view. The depressions RP shown in FIG. 51 occupy the entire region of the surface layer 61 of the conductive elastic portion 6, except regions corresponding to the projections CP.

In this way, the projections CP may take a variety of shapes, but the contact surface 63 with the tactile presentation panel 100 may preferably be a flat surface in order to prevent a change in area caused by forced pressure.

As described in the variation of Embodiment 1 with reference to FIGS. 29 to 31, the sectional shape of the depressions RP may also be a trapezoidal shape, a triangular shape, or an arched shape.

In the case where the slide operation of the tactile presentation knob 3 is only in one direction, the uneven shape does not necessarily have to be formed in grid form, and may be formed in slit form in a direction at right angles to the slide direction.

As shown in FIGS. 48 to 51, it is preferable that the end face of the conductive elastic portion 6 does not impair the shape of the projections CP in the uneven shape. For example, it is preferable in terms of mechanical strength that there is no un-uniformity such as that the area of projections CP that form the end face of the conductive elastic portion 6 is smaller than the area of the other projections CP.

<Effects>

As to the conductive elastic portion 6 according to Embodiment 2 described above, since the uneven shape is formed in grid form, the amount of shear deformation becomes constant irrespective of the slide direction. This brings about the advantage that tactile strength has no directivity with respect to the slide direction of the tactile presentation knob 3.

In the case where the slide direction is fixed in one direction, the number of depressions RP that do not contribute to shear deformation is reduced by forming the uneven shape in slit form arranged in a direction at right angles to the slide direction. This increases the area of contact with the tactile presentation panel 100 as compared to the case where the uneven shape is formed in grid form, thereby increasing electrostatic capacitance and improving tactile strength.

Embodiment 3

Figure 52:
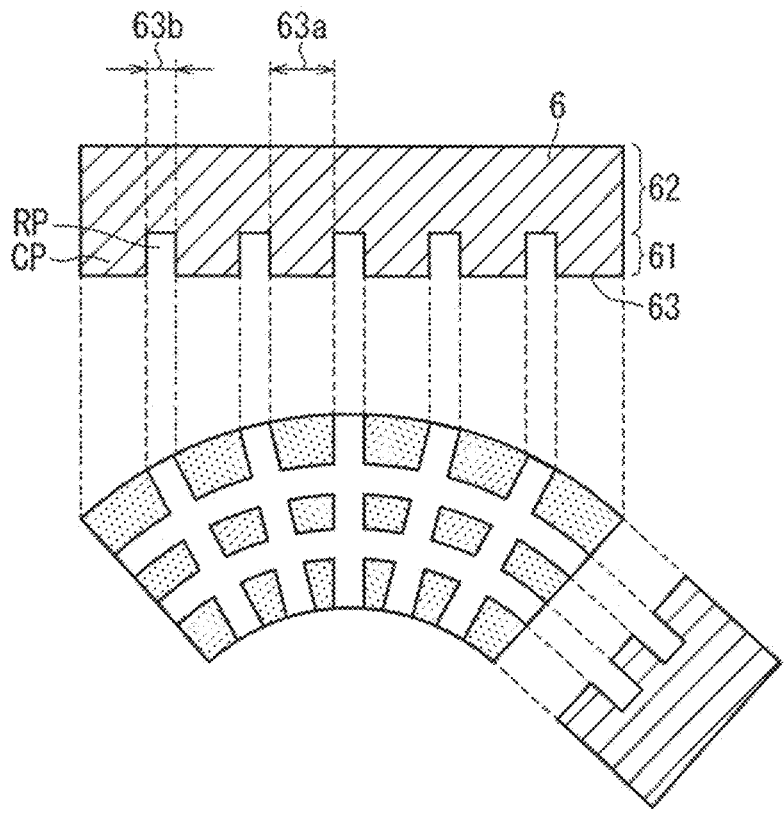
FIG. 52 is a diagram showing one example of the uneven shape of the conductive elastic portion of a tactile presentation knob according to Embodiment 3.

FIG. 52 is a diagram showing one example of the uneven shape of the conductive elastic portion 6 of a tactile presentation knob according to Embodiment 3, and shows a plan view in the center and side views as viewed from above and from the right on the upper and right sides.

The conductive elastic portion 6 shown in FIG. 52 is applied to a tactile presentation knob that is assumed to be used for rotation operations and slide operations and forms a sector in plan view. The depressions RP in the uneven shape are formed in such a shape that radial grooves intersect with annular grooves in plan view. In the example shown in FIG. 52, the width 63a of the projections CP and the width 63b of the depressions RP are constant, but the configuration is not limited to this example. As described in Embodiment 2 with reference to FIGS. 49 to 51, the shape of the projections CP may be a circular cylindrical shape, a truncated pyramid shape, or a circuit truncated cone shape, but the contact surface 63 with the tactile presentation panel 100 may preferably be a flat surface in order to prevent a change in area caused by forced pressure.

As described in the variation of Embodiment 1 with reference to FIGS. 29 to 31, the sectional shape of the depressions RP may have a trapezoidal shape, a triangular shape, or an arched shape, and the bottom surfaces of the depressions RP do not necessarily have to be flat.

In the case where the tactile presentation knob is used for only rotation operations, the uneven shape does not necessarily have to be such a shape that radial grooves intersect with annular grooves, and only the depressions RP may be provided radially.

As shown in FIG. 52, it is preferable that the end face of the conductive elastic portion 6 does not impair the shape of the projections CP in the uneven shape. For example, it is preferable in terms of mechanical strength that there is no un-uniformity such as that the area of projections CP that form the end face of the conductive elastic portion 6 is smaller than the area of the other projections CP.

<Effects>

As to the conductive elastic portion 6 according to Embodiment 3 described above, the amount of shear deformation is made constant irrespective of the rotation and slide directions of the tactile presentation knob 3 by forming the depressions RP radially or annularly in the uneven shape. This brings about the advantage that tactile strength has no directivity with respect to the operation direction of the tactile presentation knob 3.

In the case where the tactile presentation knob 3 is used for only rotation operations, the number of annular depressions RP that do not contribute to shear deformation is reduced by forming the depressions RP radially in a direction at right angles to the rotation direction in the uneven shape. This increases the area of contact with the tactile presentation panel 100 as compared to the case where the uneven shape is formed radially and annularly, thereby increasing the electrostatic capacitance and improving tactile strength.

Embodiment 4

Figure 53:
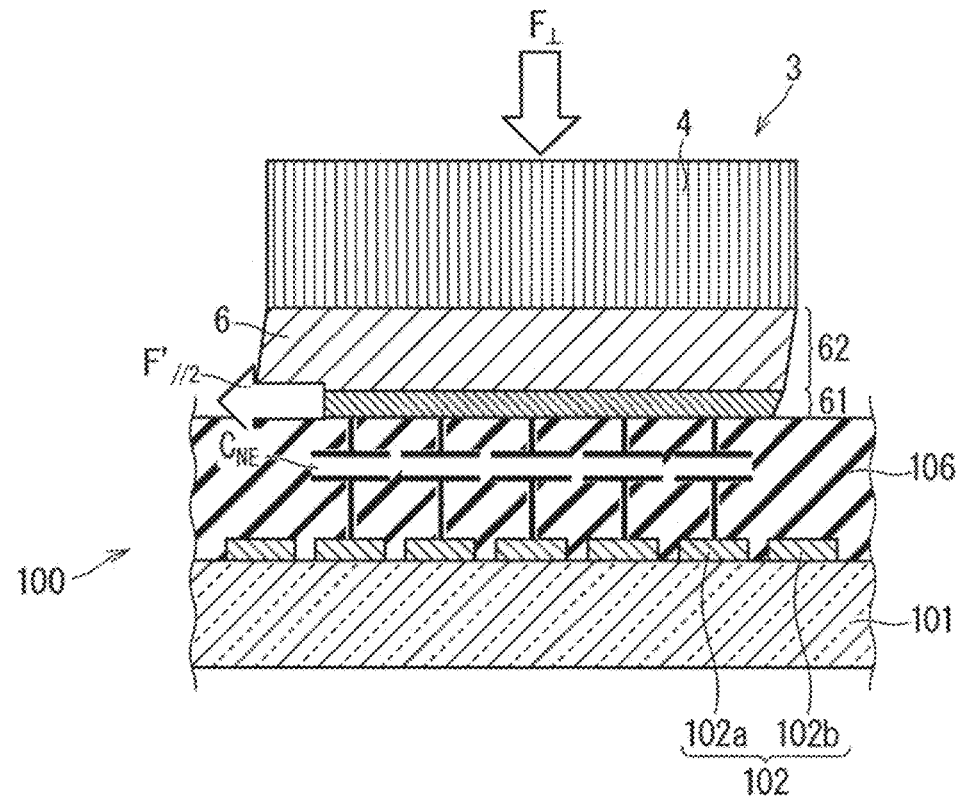
FIG. 53 is a sectional view showing a configuration of a tactile presentation knob 3 according to Embodiment 4.

FIG. 53 is a sectional view showing a configuration of the tactile presentation knob 3 according to Embodiment 4 and shows a state in which shear deformation is caused by the horizontal force $F'_{//2}$ when the vertical force $F_\perp$ is applied. As shown in FIG. 53, in the conductive elastic portion 6 of the tactile presentation knob 3, a conductive clastic material that is different from, or has a different composition from the material for the inner layer 62 is used for the surface layer 61 that comes in contact with the tactile presentation panel 100.

The material for the surface layer 61 of the conductive elastic portion 6 may preferably be a material that undergoes larger shear deformation or compressive deformation than the material for the inner layer 62, and the material for the inner layer 62 may preferably be a material that has higher vibration transmissibility than the material for the surface layer 61. More specifically, the materials suitable for the surface layer 61 and the inner layer 62 are selected from among the thermosetting elastomer and the thermoplastic elastomer shown in Embodiment 1. Even in the case where the same conductive elastic material is used, it is possible to design the conductive elastic material appropriate to shear deformation, compressive deformation, and vibration transmissibility by changing the composition of, for example, a crosslinker and a filler in the conductive elastic material in various ways.

When the tactile presentation knob 3 is operated by the user, a change in frictional force caused by voltage signals varies the amount of shear deformation of the surface layer and generates vibrations. The vibrations of the surface layer 61 are propagated through the inner layer 62 to the user's finger via the operation part 4 and perceived as a tactile sense.

The surface layer 61 of the conductive elastic portion 6 undergoes compressive deformation caused by forced pressure when the tactile presentation knob 3 is operated by the user. The surface layer 61 undergoes larger compressive deformation at the mountain portions of undulations of the tactile presentation panel 100 than at the valley portions. This allows the conductive elastic portion 6 to maintain contact with the tactile presentation panel 100 without being lifted even at the valley portions of undulations of the tactile presentation panel 100. Thus, the contact area is kept constant.

The surface layer 61 of the conductive elastic portion 6 undergoes compressive deformation by forced pressure when the tactile presentation knob 3 is operated by the user. In the case where the forced pressure is not uniform due to the way of twisting a wrist and the way of depressing the tactile presentation knob 3 when the tactile presentation knob 3 is horizontally operated by the user, the surface layer 61 undergoes larger compressive deformation at positions where the force pressure is large than at positions where the force pressure is small. This allows the conductive elastic portion 6 to maintain contact without being lifted even at positions where the forced pressure is small. Thus, the contact area is kept constant.

<Effects>

As to the tactile presentation knob 3 according to Embodiment 4, the surface layer 61 of the conductive elastic portion 6 uses a material that is easier to shear deformation than the material for the inner layer 62. This facilitates horizontal shear deformation of the surface layer 61 and increases the amount of shear deformation as compared to the case where the conductive elastic portion 6 is configured by only the inner layer 62. Moreover, the vibrations of the surface layer 61 generated by variations in frictional force caused by the voltage signals are propagated through the inner layer 62 of the conductive elastic portion 6 without attenuation. This improves the strength of a tactile sense perceived by the user as compared to the case where the conductive elastic portion 6 is configured by only the inner layer 62.

Besides, the surface layer 61 of the conductive elastic portion 6 uses a material that is easier to compressive deformation than the material for the inner layer 62. This increases the amount of compressive deformation as compared to the case where the conductive elastic portion 6 is configured by only the inner layer 62. Accordingly, when the tactile presentation panel 100 has a small degree of flatness, when there are large asperities on the surface, and when the pressing force exerted on the tactile presentation knob 3 is not uniform, a lift of the conductive elastic portion is suppressed and variations in the contact area is reduced as a result of the change in the amount of deformation of the surface layer 61. This stabilizes tactile strength as compared to the case where the conductive elastic portion 6 is configured by only the inner layer 62.

Furthermore, when a material that is difficult to asperity fining is used for the conductive elastic portion 6, it is possible to reduce cost as compared to the case where asperity finishing is performed.

Embodiment 5

Figure 54:
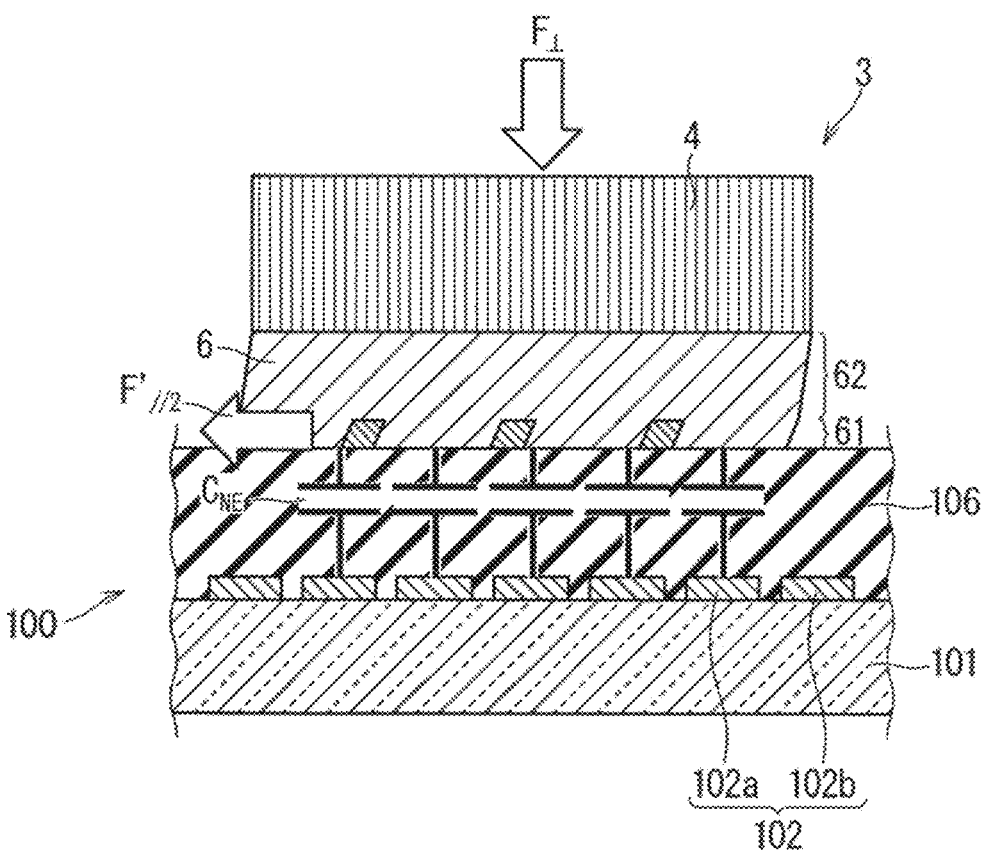
FIG. 54 is a sectional view showing a configuration of a tactile presentation knob 3 according to Embodiment 5.

FIG. 54 is a sectional view showing a configuration of the tactile presentation knob 3 according to Embodiment 5 and shows a state in which shear deformation is caused by the horizontal force $F'_{//2}$ when the vertical force $F_\perp$ is applied. As shown in FIG. 54, the surface layer 61 of the conductive elastic portion 6 of the tactile presentation knob 3 that comes in contact with the tactile presentation panel 100 has an uneven shape configured by the depressions RP and the projections CP. As in the variation of Embodiment 1, the sectional shape of the projections CP does not necessarily have to be rectangular and may be any other shape such as a trapezoidal shape, but the contact surface thereof with tactile presentation panel 100 may preferably be a flat surface in order to prevent a change in area caused by forced pressure. While the sectional shape of the depressions RP shown in FIG. 54 is rectangular, the configuration is not limited to this example. As described in the variation of Embodiment 1 with reference to FIGS. 29 to 31, the sectional shape of the depressions RP may be a trapezoidal shape, a triangular shape, or an arched shape.

The width of the projections CP in the uneven shape may preferably be set to such a size that the projections CP overlap with at least adjacent ones of the first electrodes 102*a* and the second electrodes 102*b* of the tactile presentation panel 100.

The depressions RP in the uneven shape are filled with a conductive elastic material that is different from, or has a different composition from the materials for the inner layer 62 and the projections CP. The material used to fill in the depressions RP of the surface layer 61 of the conductive elastic portion 6 may preferably be a material that undergoes larger shear deformation and larger compressive deformation than the inner layer 62 and the projections CP of the surface layer 61.

The materials used for the inner layer 62 and the projections of the surface layer 61 may preferably be materials have higher vibration transmissibility than the material used to fill in the depressions RP of the surface layer 61. More specifically, the materials suitable for the depressions RP of the surface layer 61, the inner layer 62, and the projections CP of the surface layer 61 may be selected from among the thermosetting elastomer and the thermoplastic elastomer shown in Embodiment 1. Even in the case where the same conductive elastic material is used, it is possible to design the conductive elastic material appropriate to shear deformation, compressive deformation, and vibration transmissibility by changing the composition of, for example, a crosslinker and a filler in the conductive elastic material in various ways.

When a voltage is applied to the tactile electrodes 102, the surface layer 61 of the conductive elastic portion 6 forms the electrostatic capacitance $C_{NE}$ with the tactile electrodes 102, together with the projections CP and the depressions RP. When a frictional force is changed by the voltage signals when the tactile presentation knob 3 is operated by the user, the amount of shear deformation of the surface layer 61 varies, and accordingly vibrations occur in the surface layer. The vibrations of the surface layer 61 are propagated through the inner layer 62 to the user's finger via the operation part 4 and perceived as a tactile sense.

The surface layer 61 of the conductive elastic portion 6 undergoes compressive deformation caused by forced pressure produced when the tactile presentation knob 3 is operated by the user. The surface layer 61 undergoes larger compressive deformation at the mountain portions of undulations of the tactile presentation panel 100 than at the valley portions thereof. This allows the conductive elastic portion 6 to maintain contact without being lifted even at the valley portions of undulations of the tactile presentation panel 100. Thus, the contact area is kept constant.

The surface layer 61 of the conductive elastic portion 6 undergoes compressive deformation by forced pressure produced when the tactile presentation knob 3 is operated by the user. In the case where the forced pressure is not uniform due to the way of twisting a wrist and the way of depressing the tactile presentation knob 3 when the tactile presentation knob is horizontally operated by the user, the surface layer 61 undergoes larger compressive deformation at positions where the forced pressure is large than at positions where the forced pressure is small. This allows the conductive elastic portion 6 to maintain contact without being lifted even at positions where the forced pressure is small. Thus, the contact area is kept constant.

<Effects>

As to the tactile presentation knob 3 according to Embodiment 5, the surface layer 61 of the conductive elastic portion 6 has an uneven shape, and the depressions RP are filled with a conductive material that is easier to shear deformation and compressive deformation than the inner layer 62 and the projections CP. This allows even the depressions RP to form electrostatic capacitance with the tactile electrodes 102 without losing shear deformation and compression properties of the projections CP. Accordingly, it is possible to increase the electrostatic capacitance as compared to the case where the depressions RP are not filled with a conductive material, and thereby to improve tactile strength.

Besides, by filling in the depressions RP in the uneven shape, it is possible to increase the mechanical strength of the surface layer 61 as compared with the case described in the variation of Embodiment 1.

It should be noted that the present invention can be implemented by freely combining the above embodiments or by making a modification or omission on the embodiments as appropriate without departing from the scope of the present invention.

While the invention has been shown and described in detail, the foregoing description is in all aspects illustrative and not restrictive. It is therefore to be understood that numerous modifications and variations can be devised without departing from the scope of the invention.

The invention claimed is:

1. A tactile presentation device including a tactile presentation knob placed on an operation screen and for presenting a tactile sense to a user via the tactile presentation knob, the tactile presentation device comprising:

a tactile electrode that includes a plurality of first electrodes and a plurality of second electrodes provided inside the operation screen of the tactile presentation device;

a dielectric layer that covers the tactile electrode and has one surface serving as the operation screen; and a voltage generation circuit that generates a first voltage signal of a first frequency and a second voltage signal of a second frequency different from the first frequency, the first voltage signal being applied to at least one of the first electrodes that is located in a region of at least part of the operation screen of the tactile presentation device, the second voltage signal being applied to at least one of the second electrodes that is located in a region of at least part of the operation screen, wherein the tactile sense is presented by supplying the first voltage signal and the second voltage signal to generate a frictional force between the operation screen and the tactile presentation knob, the tactile presentation knob includes:

a conductive elastic portion that includes a surface layer facing the operation screen and an inner layer located on a side opposite to the operation screen; and an operation part that fixes the conductive elastic portion, the surface layer is set to be subjected to greater shear deformation than the inner layer by an operation of the tactile presentation knob, to generate a vibration by a change in the frictional force, and to be subjected to greater compressive deformation than the inner layer by a press of the tactile presentation knob, and the inner layer is set to have higher vibration transmissibility than the surface layer.

2. The tactile presentation device according to claim 1, wherein the surface layer has an uneven shape including a projection and a depression, the operation of the tactile presentation knob includes a horizontal displacement or an in-plane rotation, the uneven shape is subjected to shear deformation by the horizontal displacement or the in-plane rotation of the tactile presentation knob and subjected to compressive deformation by a press of the tactile presentation knob to generate the vibration, and the inner layer propagates the vibration generated in the surface layer to the operation part.

3. The tactile presentation device according to claim 2, wherein a pitch of arrangement of the first electrodes and the second electrodes of the tactile electrode is set to be smaller than a width of the projection of the surface layer of the conductive elastic portion.

4. The tactile presentation device according to claim 2, wherein when the horizontal shift of the tactile presentation knob is in one direction, the depression in the uneven shape of the surface layer is provided as a slit extending in a direction at an right angle to the one direction.

5. The tactile presentation device according to claim 2, wherein when the horizontal displacement of the tactile presentation knob is in a plurality of directions, the depression in the uneven shape of the surface layer is provided as a lattice in plan view.

6. The tactile presentation device according to claim 2, wherein in the in-plane rotation of the tactile presentation knob, the conductive elastic portion forms a sector in plan view, and the depression in the uneven shape of the surface layer is formed in a shape in which a radial groove intersects with an annular groove in plan view.

7. The tactile presentation device according to claim 1, wherein the operation of the tactile presentation knob includes a horizontal displacement or an in-plane rotation, the surface layer is subjected to shear deformation by the horizontal displacement or the in-plane rotation of the tactile presentation knob and subjected to compressive deformation by a press of the tactile presentation knob to generate the vibration, the surface layer being configured by a conductive material that is more prone to the shear deformation and the compressive deformation than the inner layer, and the inner layer propagates the vibrations generated in the surface layer to the operation part.

8. The tactile presentation device according to claim 1, wherein the surface layer has an uneven shape including a projection and a depression, the operation of the tactile presentation knob includes a horizontal displacement or an in-plane rotation, the uneven shape is subjected to shear deformation by the horizontal displacement or the in-plane rotation of the tactile presentation knob and subjected to compressive deformation by a press of the tactile presentation knob to generate the vibration, the depression is filled with a conductive material that is more prone to the shear deformation and the compressive deformation than the projection and the inner layer, and the inner layer propagates the vibration generated in the surface layer to the operation part.

9. The tactile presentation device according to claim 8, wherein a pitch of arrangement of the first electrodes and the second electrodes of the tactile electrode is set to be smaller than a width of the projection of the surface layer of the conductive elastic portion.

10. The tactile presentation device according to claim 8, wherein when the horizontal shift of the tactile presentation knob is in one direction, the depression in the uneven shape of the surface layer is provided as a slit extending in a direction at an right angle to the one direction.

11. The tactile presentation device according to claim 8, wherein when the horizontal displacement of the tactile presentation knob is in a plurality of directions, the depression in the uneven shape of the surface layer is provided as a lattice in plan view.

12. The tactile presentation device according to claim 8, wherein in the in-plane rotation of the tactile presentation knob, the conductive elastic portion forms a sector in plan view, and the depression in the uneven shape of the surface layer is formed in a shape in which a radial groove intersects with an annular groove in plan view.

13. A tactile presentation device that includes a tactile presentation knob placed on an operation screen and for presenting a tactile sense to a user via the tactile presentation knob, the tactile presentation device comprising:

a tactile electrode that includes a plurality of first electrodes and a plurality of second electrodes provided inside the operation screen of the tactile presentation device:

a dielectric layer that covers the tactile electrode and that has one surface serving as the operation screen; and a voltage generation circuit that generates a first voltage signal of a first frequency and a second voltage signal of a second frequency different from the first frequency, the first voltage signal being applied to at least one of the first electrodes that is located in a region of at least part of the operation screen of the tactile presentation device, the second voltage signal being applied to at least one of the second electrodes that is located in a region of at least part of the operation screen, wherein the tactile sense is presented by supplying the first voltage signal and the second voltage signal to generate a frictional force between the operation screen and the tactile presentation knob, and the tactile presentation knob includes an air space having a thickness of less than or equal to 0.5 μm and formed between the tactile presentation knob and the operation screen during operation of the tactile presentation knob.

* * * * *